(12) United States Patent
Sikora et al.

(10) Patent No.: US 6,268,012 B1
(45) Date of Patent: *Jul. 31, 2001

(54) DRIED PRODUCT AND A DRYING PROCESS

(75) Inventors: Paul Thomas Sikora, Rosscarbery (IE); Wlodzimierz Ludwik Grocholski, Miami, FL (US)

(73) Assignee: DTL S.A. (LU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/973,359
(22) PCT Filed: Jun. 7, 1996
(86) PCT No.: PCT/IE96/00037
    § 371 Date: Feb. 2, 1998
    § 102(e) Date: Feb. 2, 1998
(87) PCT Pub. No.: WO96/39854
    PCT Pub. Date: Dec. 19, 1996

(51) Int. Cl.[7] ....................................................... A23L 3/40
(52) U.S. Cl. ........................... 426/640; 426/465; 426/520
(58) Field of Search ..................................... 426/640, 520, 426/465

(56) References Cited

U.S. PATENT DOCUMENTS

| 687,305 | 11/1901 | Hanranah . |
| 1,228,989 | 6/1917 | Tiermann . |
| 1,471,602 | 10/1923 | Hanrahan . |

(List continued on next page.)

FOREIGN PATENT DOCUMENTS

| 8908229 | 9/1989 | (EP) . |
| 0339175 | 11/1989 | (EP) . |
| 9413146 | 6/1994 | (EP) . |
| 9639854 | 12/1996 | (EP) . |
| 2661224 | 10/1991 | (FR) . |
| 0228603 | 2/1925 | (GB) . |
| 0788893 | 1/1958 | (GB) . |
| 1234696 | 6/1971 | (GB) . |
| 1316432 | 5/1973 | (GB) . |
| 2002099 | 2/1979 | (GB) . |

(List continued on next page.)

OTHER PUBLICATIONS

Arsdel, W., Food Dehydration, 2nd. ed. vol. 1, Westport, Connecticut, Avi Publishing Co., Inc. p. 22–111, 1973.*
Copson, "Microwave Heating in Freeze–Drying, Electronic Ovens, and Other Applications", published by AVI Publishing Co., Inc., 1962 (pp. 249–250).
La Couleur Des Vins Rouges, Connaissance Vigne Vin. 1984, 18, No. 4, pp. 253–271 (no translation).

*Primary Examiner*—Helen Pratt
(74) *Attorney, Agent, or Firm*—Garrison & Associates PS; David L. Garrison

(57) ABSTRACT

A dried fruit or vegetable has a water content in the range 4% to 7%, and has a water activity of 0.4. Substantially all of the cells of the dried product are undamaged. An air drying process is gentle and contains four phases, during which the temperature of the drying air is maintained at 60° C. In a first phase the relative humidity of the drying air is allowed to rise to between 50% and 55%, and is maintained substantially constant at this value during a second phase by maintaining exchange of the drying air with fresh air substantially constant. In a third phase of the process, the relative humidity of the drying medium is permitted to decrease relatively rapidly until the fourth phase commences, at which stage the relative humidity is permitted to asymptotically approach a predetermined relative humidity value. During the drying process, excessive temperature differences and relative humidity differences between the temperature and relative humidity, respectively of the drying medium and the product are avoided in order to minimize damage to the cellular structure of the product.

20 Claims, 63 Drawing Sheets

U.S. PATENT DOCUMENTS

| | | |
|---|---|---|
| 1,902,575 | 3/1933 | Nichols . |
| 2,184,473 | 12/1939 | Scanlan . |
| 2,343,346 | 3/1944 | Touton . |
| 2,418,683 | 4/1947 | Wilson . |
| 3,023,110 * | 2/1962 | Stagmeier et al. .................. 426/640 |
| 3,202,157 | 8/1965 | Touton . |
| 3,866,334 | 2/1975 | Huang ........................................ 34/93 |
| 3,973,047 | 8/1976 | Linaberry et al. ..................... 426/473 |
| 3,974,301 | 8/1976 | Luh et al. ............................... 426/640 |
| 4,153,549 | 5/1979 | Wang et al. ............................. 210/54 |
| 4,207,684 | 6/1980 | Stice ........................................ 34/93 |
| 4,207,685 | 6/1980 | Pelsue et al. ........................... 34/107 |
| 4,263,720 | 4/1981 | Bowling ................................... 34/22 |
| 4,319,409 | 3/1982 | Scholz et al. ............................ 34/58 |
| 4,334,861 | 6/1982 | Bricmont ................................. 432/30 |
| 4,335,150 | 6/1982 | Hosaka et al. ........................ 426/465 |
| 4,352,249 | 10/1982 | Rose ........................................ 34/212 |
| 4,496,597 | 1/1985 | Reges ..................................... 426/402 |
| 4,631,837 | 12/1986 | Magoon .................................... 34/9 |
| 4,734,401 | 3/1988 | Blouin ..................................... 514/14 |
| 4,790,995 | 12/1988 | Sorensen ............................... 426/302 |
| 4,820,627 | 4/1989 | McGeehan .............................. 435/4 |
| 4,835,351 | 5/1989 | Smith et al. ................. 219/10.55 R |
| 4,889,730 | 12/1989 | Roberts et al. ....................... 426/102 |
| 4,940,040 | 7/1990 | Randall et al. ..................... 126/21 A |
| 4,948,609 | 8/1990 | Nafisi-Movaghar ................. 426/321 |
| 4,949,629 | 8/1990 | Leary et al. ............................ 99/386 |
| 4,959,230 | 9/1990 | Wyss et al. ........................... 426/102 |
| 4,975,293 | 12/1990 | Hicks et al. .......................... 426/271 |
| 4,988,522 | 1/1991 | Warren ................................. 426/268 |
| 4,988,523 | 1/1991 | Gardner et al. ...................... 426/268 |
| 5,000,974 | 3/1991 | Albersmann .......................... 426/564 |
| 5,026,566 | 6/1991 | Roser .................................... 426/443 |
| 5,038,498 | 8/1991 | Woolsey ................................. 34/225 |
| 5,059,518 | 10/1991 | Kortright et al. ......................... 435/6 |
| 5,068,998 | 12/1991 | Vanysacker ............................. 47/58 |
| 5,227,183 | 7/1993 | Aung et al. ........................... 426/102 |
| 5,364,643 | 11/1994 | Morimoto et al. ................... 426/102 |

FOREIGN PATENT DOCUMENTS

| | | |
|---|---|---|
| 2053656 | 2/1981 | (GB) . |
| 361192243A * | 8/1986 | (JP) . |
| 2119744 | 5/1990 | (JP) . |
| 0296843 | 7/1994 | (PL) . |
| 8803366 | 5/1988 | (WO) . |

* cited by examiner

APPLE-SKIN AREA, 280x, FRESH

APPLE-FLESH AREA, 140x, FRESH

APPLE-SKIN AREA, 280x, INVENTION DRIED

APPLE-FLESH AREA, 140x, INVENTION DRIED

APPLE-SKIN AREA, 280x, INVENTION DRIED
REHYDRATED

APPLE-FLESH AREA, 140x, INVENTION DRIED
REHYDRATED

APPLE-SKIN AREA, 280x, FREEZE-DRIED

APPLE-FLESH AREA, 140x, FREEZE-DRIED

APPLE-SKIN AREA, 280x, FREEZE-DRIED
REHYDRATED

APPLE-FLESH AREA, 140x, FREEZE-DRIED
REHYDRATED

APPLE-SKIN AREA, 280x, STANDARD DRIED

APPLE-FLESH AREA, 140x, STANDARD DRIED

APPLE-SKIN AREA, 280x, STANDARD DRIED
REHYDRATED

APPLE-FLESH AREA, 140x, STANDARD DRIED
REHYDRATED

Fig.9 DRIED BANANA Dried by process of invention

REHYDRATED BANANA
After being dried by conventional air-flow drying process

Fig.15 IDARED APPLE Prior to drying

Fig. 21 DRIED MANGO — Dried by conventional air-flow drying process

Fig. 24 REHYDRATED MANGO
After being dried by conventional air-flow drying process REHYDRATED MANGO
After being dried by freeze drying process Fig. 26 PAPAYA Prior to drying DRIED PAPAYA
Dried by conventional air-flow drying process Fig. 30 REHYDRATED PAPAYA — After being dried by process of invention DRIED KIWI
Dried by conventional air-flow drying process DRIED KIWI
Dried by freeze drying process Fig. 40 GINGER Prior to drying Fig.43 DRIED GINGER — Dried by freeze drying process of invention Fig.46 REHYDRATED GINGER
After being dried by freeze drying process Fig. 48 DRIED PINEAPPLE Dried by process of invention Fig. 50 — DRIED PINEAPPLE, Dried by freeze drying process Fig.53 REHYDRATED PINEAPPLE
After being dried by freeze drying process Fig. 54 MARACUJA Prior to drying DRIED MARACUJA
Dried by process of invention REHYDRATED MARACUJA
After being dried by process of invention

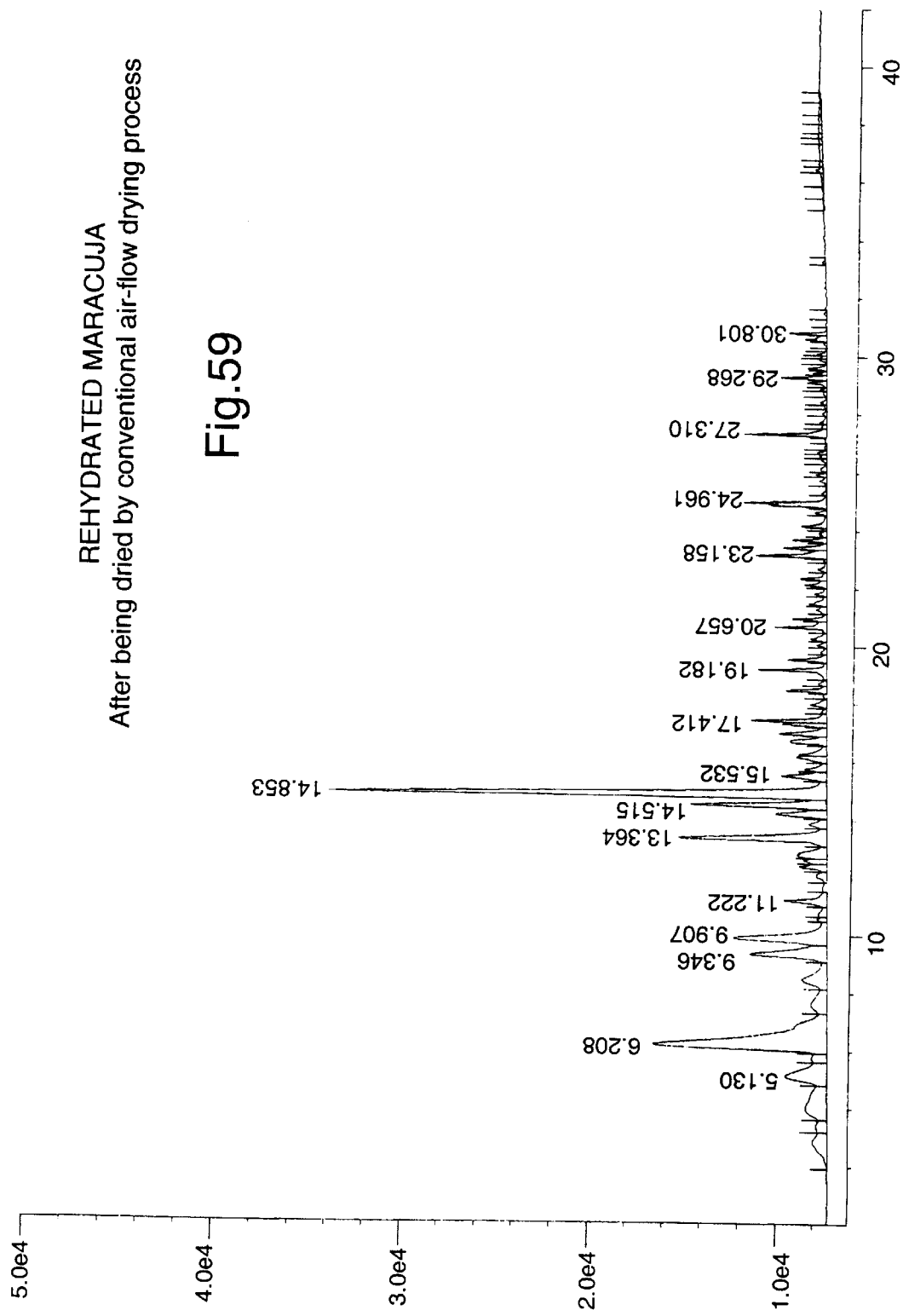

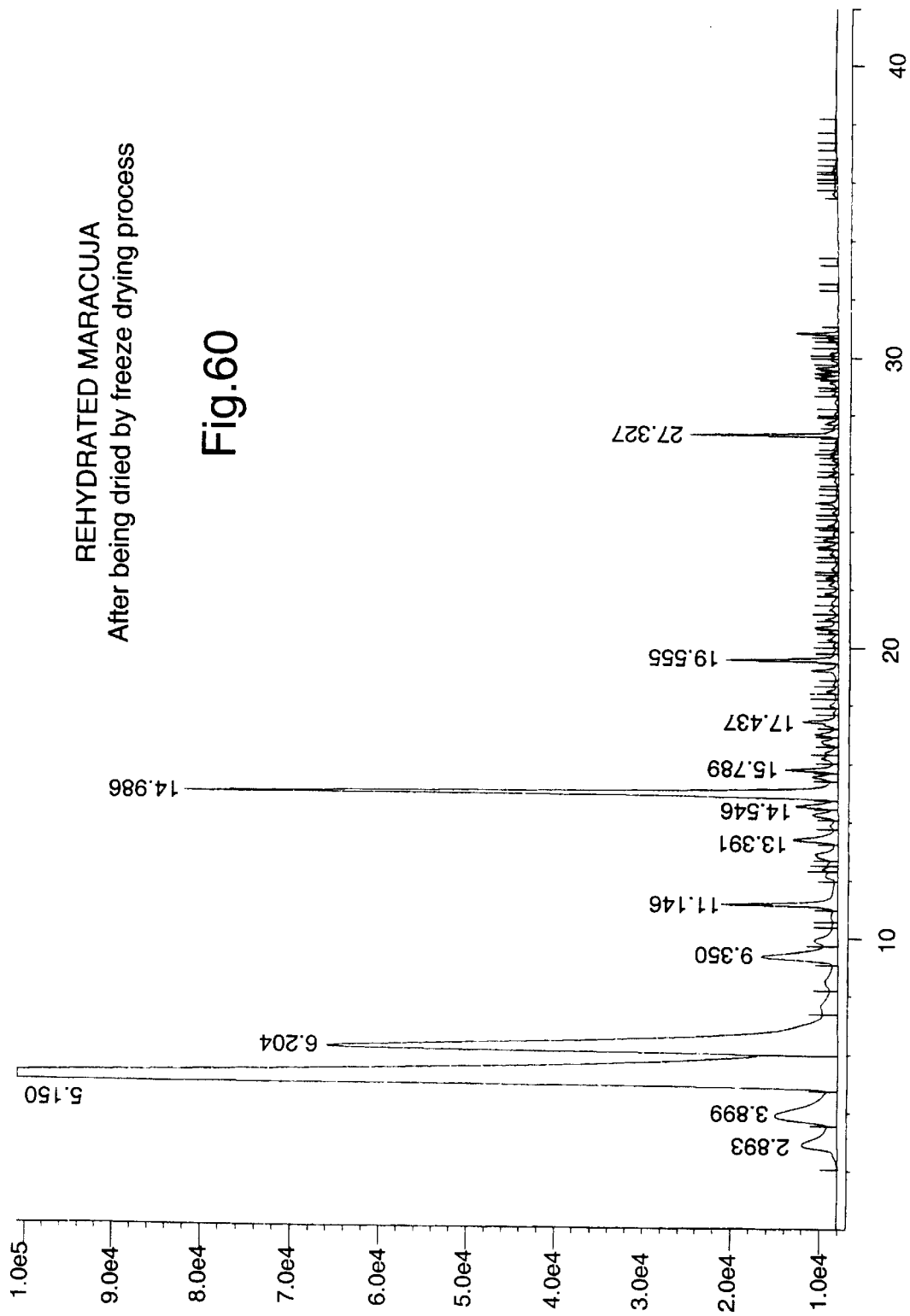

DRIED PRODUCT AND A DRYING PROCESS

FIELD OF THE INVENTION

The present invention relates to a dried product, and in particular, though not limited to a dried biological product in which the product is dehydrated to a water content of 20% or less. The invention is also directed towards a process for dehydrating a product, and in particular, though not limited to a process for dehydrating a biological product.

BACKGROUND ART

Many processes exist for drying products, such as various foods, fruits, vegetables, and other biological substances. For example WO89/08229 discloses a system and a method for drying granular material, in which the granular material is subjected to a drying agent, such as nitrogen.

It is also known to freeze-dry vegetables. Such a method is known to cause rupture of the cells and to increase the permeability of vegetables to water, see U.S. Pat. No. 4,788,072 at Column 2, Lines 15 to 20.

It is further known to dry fruit or vegetable slices by immersing said slices into a sugar solution, see for example, European Patent Specification No. EP-A-0,339,175. When using a sugar solution with a high Dextrose equivalent (DE) value, for example, a DE value of 70, low molecular weight sugars are able to penetrate into the cells, whereby a higher sugar content exists. Such dried products may not have a water activity lower than 0.4, and some of the contents of the cell, such as flavour and odour constituents, may no longer be present in the interior of the cell.

When using a sugar solution with a low DE value, for example, a DE value of 25, sugars are extracted from the product. This dried product also may not have a water activity lower than 0.4.

Furthermore, it is considered that due to the extraction of sugars, the taste and odour characteristics of the product may be altered.

The sugar osmotic drying is also considered as a pre-treatment, that is, a treatment for lowering the water content of the product before a final drying treatment, such as frying. The water content of the osmotically dried product may thus not be low enough to preclude spoilage of the product without additional measures, such as refrigeration, sterile packaging or the addition of preservatives. Due to the treatment of the product in a liquid sugar solution, sugar may completely fill the voids or spaces situated between two adjacent cell membranes.

It is further known to dry grapes by spraying them before harvesting with a composition to facilitate removal of water from the grapes, see U.S. Pat. No. 5,068,988. The dried grapes retain a sufficiently high water content so as to produce sufficient juice for making wine. The wines obtained by using such dried grapes have a high alcohol content.

It is also known to dry timber using a carefully regulated temperature and humidity regime during the drying process. The temperature and humidity regime is species- and size-specific and is selected to ensure that the drying operation does not cause warping of the product as a result of excessive moisture and temperature gradients within the material. The drying process results in a longer drying time than would result from drying without humidity regulation. Details of such drying processes are presented in a large number of standard works, for example, in the 1991 ASHRAE Handbook, HVAC Applications.

It is generally accepted in the known art that "Based on the analysis of heat and mass transfer, the most efficient dehydration systems will maintain the maximum vapour-pressure gradient and the maximum temperature gradient between the air and the interior parts of the product", see Introduction to Food Engineering, R. P. Singh and D. R. Heldman, Academic Press (1993), at Page 422.

It is also generally accepted that in known drying processes the outer layer of the product becomes essentially impermeable to aroma compounds but still transmits some water vapour to allow drying to continue, see for example, "Food Dehydration", G. V. Barbosa-Canovas and M. R. Oaks eds., A.I.Ch.E. Symposium Vol 89 (1993), Page 32.

Finally, PCT Application Specification No. WO 94/13146 of one of the co-inventors of the present invention discloses a method and an apparatus for dehydrating biological products in which a closed system is used so as to ensure the retention of the essential flavour and fragrance of the natural product.

DEFINITIONS

In this specification and in the claims, the following words and terms as used herein have the following meanings:

Water content of an undried substance, in other words, a substance prior to being dried is given as a percentage of the total weight of the undried substance.

Water content of a dried substance is given as a percentage of the total weight of dry matter only of the dried substance excluding all moisture.

A hygroscopic substance is one in which the water content tends to equilibrate with its surroundings.

Water activity of a hygroscopic substance is defined as the equilibrium relative humidity of a closed and thermally insulated system in which the substance has been placed. The measurement thereof should take place with a minimum head space and generally in conformity with recognised procedures for measurement of water activity. So in principle, the water activity is no different from equilibrium relative humidity except that it is expressed in terms of a scale from 0–1, instead of on a scale of from 0–100%. The water activity measures the degree of freedom of water, retained in various ways, in a hygroscopic substance.

The water activity directly determines the physical, mechanical, chemical and microbiological properties of a hygroscopic substance, for example, interactions such as clumping, cohesion, electrostatic charge, and so on. In the food industry, the water activity is a highly significant factor to be considered for the conservation of semifinished and finished products.

In particular, the water activity threshold for deteriorative mechanisms in a given hygroscopic food substance is defined as a level of water activity above which significant oxidation, enzymatic browning, microbiological organic activity and other deteriorative processes begin to take place to the detriment of the organoleptic and nutritional characteristics of that substance. For example, the proliferation of micro-organisms is generally considered to be suppressed at water activity levels below about 0.65. Other deteriorative processes become progressively less active as the water activity decreases toward a value between 0.2 and 0.25, that is, towards a level: approximately corresponding to the monolayer water content.

Cellular structure of a substance means the structure of the cells of the substance, and also means the general arrangement of the cells, whereby intercellular spaces, channels or passageways are defined between the cells, and reference to damage to the cellular structure, in general, refers to damage caused to the cellular structure during a dehydrating process, it being understood that the cells and cellular structure adjacent a face of the product may be damaged prior to the dehydrating process, as a result, for example, of cutting the substance or product into slices or the like.

Cellular integrity of a substance refers to the degree to which the cellular structure of the substance is unaltered or undamaged, and in particular, the degree to which the cell walls remain intact for retaining the organoleptic characteristics of the product. Reference to the maintenance of cellular integrity during a dehydrating process is defined as the maintenance of the integrity of the cellular. structure, which the substance had prior to being dried throughout the drying process so that at the end of the dehydrating process the dried product can be rehydrated to substantially its original form in substantially all respects.

Structural intearitv of a substance refers to the degree to which the structure of the substance is unaltered or undamaged, including its cellular structure. Reference to maintenance of structural integrity during a drying process is defined as the maintenance of the integrity of the structure, which the substance had prior to being dried throughout the dehydrating process so that at the end of the dehydrating process, the dried product can be rehydrated to substantially its original form in substantially all respects. In other words, in a dehydrating process which maintains the structural integrity of the substance being dried, the dehydration process is essentially reversible. For substances having cells, the maintenance of structural integrity means also the maintenance of cellular integrity, in other words, keeping cell walls substantially intact and maintaining the intercellular spaces and passageways. The purpose of maintaining structural integrity during a drying process is to help retain the initial structural characteristics of the substance, and to facilitate the mass transfer of moisture from the substance. In food and health products, for example, the initial structural characteristics include organoleptic and nutritional properties, and other qualities typical to each product in its initial form prior to being dried. It is assumed that only substances having a relatively high degree of structural integrity are submitted to the dehydrating process according to the invention, since otherwise, they could not be rehydrated to their original form.

Degradation temperature of a substance is defined as the temperature above which the structural integrity of the substance and/or some of its chemical or biochemical constituents may suffer irreversible thermal damage.

Organoleptic tests serve as a basis for a sensory analysis of the internal and external quality of a material. The external quality of a material is judged according to its optical and physical properties which are perceived by the visual and tactile senses. These properties have to do with the appearance of the material, for example, colour, size, shape, condition (uniformity, absence of defects and blemishes). Of particular importance for dried products are the hue (as it was before drying) and the lack of browning, fading or other discolouration.

The internal quality of a material is judged according to its flavour and aroma, and texture. Flavour and aroma are caused by chemical properties and perceived mainly by the senses of taste and smell which are closely interlinked. Taste is due to the sensations felt on the tongue, while aroma is perceived due to the stimulation of the olfactory senses with volatile organic compounds. For dried products, it is most desirable to retain the taste and aroma characteristic of that material in its initial state. The presence of foreign off-taste and off-aromas is most undesirable.

The chemical compounds that make up the aromatic properties of plant products need to be volatile by definition in order to be perceived at the temperature at which the product is going to be utilized. That is, they must be present in a gaseous or vapour state so that the molecules can reach the nasal passages of the persons perceiving the aromas. Generally, only a very small number of compounds impart the main characteristic aroma of a substance. Some volatile compounds may exist per se in the intact tissue, while others are formed enzymatically upon the rupture of the cells of the substance. One may measure precisely the concentration of compounds that impart the characteristic odour of a substance using gas chromatography equipment.

Texture is most often expressed as an overall assessment of the feeling that food gives in the mouth. It is a combination of sensations derived from the lips, the tongue, the walls of the mouth, the teeth, and even the ears. It is desirable for dried products to maintain their textural integrity, not to be too hard, too elastic or too brittle, during biting, chewing and swallowing.

Because the organoleptic properties of a substance are not generally equally subject to change, and are generally affected to a different degree by different stimuli, it is appropriate to examine as many of the organoleptic properties as is practicable in order to evaluate substance degradation in the most thorough manner possible.

In food products, the amount of ascorbic acid present in the dried product is a good indicator of the degree of degradation which the product has undergone from its initial state. This follows from the fact that ascorbic acid is particularly volatile, that is vulnerable to depletion, especially at higher temperatures and over time (after harvesting, during storage). The losses of ascorbic acid are greater in fruits and vegetables having a higher pH.

Monolayer water content of a hygroscopic substance is defined as that amount of water which can be retained by the substance at maximum binding energy. This water content is estimated by fitting a theoretical expression such as the BET equation for moisture sorption to the measured moisture sorption isotherm for the substance. See for example, BET Monolayer Values in Dehydrated Foods and Food Components, H. A. Iglesias and J. Chirife, Lebensm-Wiss. U.-Technol. Volume 9, (1976) at pages 107–113.

OBJECTS OF THE INVENTION

It is an object of the invention to provide a dried product, and in particular, a dried biological product, such as, for example, a dried fruit or vegetable product which on being rehydrated possesses substantially all of the properties and characteristics of the original product prior to being dried, and in particular, possesses substantially all of the organoleptic properties, and in which the structural integrity of the product is maintained. It is also an object of the invention to provide a dried product, the water content of which is 20% or less by weight.

Additionally, it is an object of the invention to provide a process for dehydrating a product, and in particular, a biological product, such as, for example, a fruit, a vegetable or the like product in which the product may be dried to a water content of 20% or less, and the structural integrity of the product prior to being dried including its cellular integrity is maintained throughout the dehydrating process.

SUMMARY OF THE INVENTION

According to the invention there is provided a dried product having a water content lower than 20%, wherein at least 50% of the cells not adjacent to a face of the product still have substantially undamaged membrane, and in which the water present in the product has a water activity not exceeding 0.7.

In one aspect of the invention the water present in the dried product has a water activity not exceeding 0.65.

In another aspect of the invention the water present in the dried product has a water activity not exceeding 0.6. In general, the water present in the dried product has a water activity of between 0.2 and 0.5, and preferably the water activity is between 0.25 and 0.45, and ideally the water activity is between 0.3 and 0.4.

In one aspect of the invention the water content of the dried product is less than 10%, and typically, the dried product has a water content in the range 4% to 7%.

Preferably, substantially all of the cells of the dried product which were not damaged prior to drying remain substantially undamaged after drying.

In one aspect of the invention the product is a biological product, for example, a dried fruit, or a dried vegetable.

Typically, the dried product is in the form of a slice, and in general, the dried product is derived from a sliced product, the thickness of the slices of the product prior to dehydration being in the range of 1 mm to 10 mm. Ideally, the thickness of the slice prior to dehydration lies in the range of 3 m to 7 m.

In one aspect of the invention the product contains compounds which are able to be eluted at different temperatures, the weight ratio fraction of compounds eluted at a temperature of between 150° C. and 200° C. to fraction of compounds eluted at a temperature of between 40° C. and 100° C. being greater than 0.3. Preferably, the weight ratio fraction of compounds eluted at a temperature of between 150° C. and 200° C. to fraction of compounds eluted at a temperature of between 40° C. and 100° C. is greater than 0.5. Ideally, the weight ratio fraction of compounds eluted at a temperature of between 150° C. and 200° C. to fraction of compounds eluted at a temperature of between 40° C. and 100° C. is greater than 0.6.

In another aspect of the invention the product contains compounds which are able to be eluted at different temperatures, the weight ratio fraction of compounds eluted at a temperature of between 150° C. and 200° C. to fraction of compounds eluted up to 200° C. is greater than 0.25.

In one aspect of the invention the product comprises cells adjacent to a face of the product, said cells defining therebetween spaces, at least 50% of the spaces not being completely or nearly completely filled with sugar. Preferably, at least 50% of the spaces contain a gaseous medium. Ideally, at least 50% of the volume of the said spaces are filled at a rate of at least 50% with the gaseous medium.

In one embodiment of the invention, the product is banana and the dried product has prominent gas chromatographic peaks at 6.1 and 7.3 minutes retention times.

In another embodiment of the invention the product is mango and the dried product has prominent gas chromatographic peaks at 6.1 and 12.8 minutes retention times.

In a further embodiment of the invention the product is pineapple and the dried product has a prominent gas chromatographic peak at 6.1 minutes retention time.

In a still further embodiment of the invention the product is kiwi and the dried product has a prominent gas chromatographic peak at 6.3 minutes retention time.

In another embodiment of the invention the product is papaya and the dried product has a prominent gas chromatographic peak at 6.2 minutes retention time.

In a further embodiment of the invention the product is ginger and the dried product has prominent gas chromatographic peaks at 6.3, 8.4 and 10.0 minutes retention times.

Additionally, the invention provides an improved food preparation having as an ingredient a dried food product wherein the dried food product has a water content lower than 20%, said dried food product being a product in which at least 50% of the cells not adjacent to a face of the product still have closed membrane, and in which the water present in the dried food product has a water activity lower than 0.7.

In one aspect of the invention the food composition is useful as a sauce composition.

Additionally, the invention provides a dried product having a water content lower than 10%, wherein at least 50% of the cells not adjacent to a face of the product still have substantially undamaged membrane, and in which the water present in the product has a water activity lower than 0.4.

In one aspect of the invention.the water content of the dried product lies in the range of 4% to 7%.

In another aspect of the invention the water present in the dried product has a water activity of between 0.15 and 0.35. Preferably, the water present in the dried product has a water activity of between 0.25 and 0.3.

In another aspect of the invention the product contains compounds which are able to be eluted at different temperatures, the weight ratio fraction of compounds eluted at a temperature of between 150° C. and 200° C. to fraction of compounds eluted at a temperature of between 40° C. and 100° C. being greater than 0.3. Preferably, the weight ratio fraction of compounds eluted at a temperature of between 150° C. and 200° C. to fraction of compounds eluted at a temperature of between 40° C. and 100° C. is greater than 0.5.

Advantageously, the weight ratio fraction of compounds eluted at a temperature of between 150° C. and 200° C. to fraction of compounds eluted at a temperature of between 400° C. and 100° C. is greater than 0.6.

In a further aspect of the invention the product contains compounds which are able to be eluted at different temperatures, the weight ratio fraction of compounds eluted at a temperature of between 150° C. and 200° C. to fraction of compounds eluted up to 200° C. is greater than 0.25.

In another aspect of the invention the product comprises cells adjacent to a face of the product, said cells defining therebetween spaces, at least 50%t of the spaces not being completely or nearly completely filled with sugar. Preferably, at least 50% of said spaces contained a gaseous medium. Ideally, at least 50% of the volume of said spaces being filled at a rate of at least 50% with a gaseous medium.

In one aspect of the invention the product is a dried vegetable or a dried fruit.

The product may also be any other dried food.

In one embodiment of the invention the product comprises cells adjacent to a face of the product, said cells defining therebetween spaces, at least 50% of said spaces containing a gaseous medium. Preferably, substantially all the cells of the dried product which were not damaged prior to drying remain substantially undamaged after drying.

Additionally, the invention provides a food composition having the improvement of containing a dried food product having a water content of between 4% and 7%, the dried product being a product in which at least 50% of the cells not adjacent to a face of the product still have closed membrane, and the water present in the dried product has a water activity lower than 0.4.

In one aspect of the invention the food composition is useful as a sauce composition.

The dried product according to the invention has many advantages. It has a sufficiently low water activity to ensure long term resistance to degradation at typical storage temperatures of about 20° C. to 30° C. A water activity in the range of 0.3 to 0.4 ensures long term resistance to degradation at such storage temperatures over a relatively long storage period. Depending on the product, at water activity levels up to 0.7, certain products are resistant to degradation and deterioration at typical storage temperatures of about 20° C. to 30° C. over relatively long storage periods.

In the case of fruits and vegetables, the product has improved organoleptic properties with respect to products dried by other known processes. This it is believed is due at least in part to the maintenance of the structural integrity, and in particular, the cellular integrity of the product. In general, it has been found that where the cellular integrity of at least 50% of the cells of the product is maintained, and in particular, 50% of the interior cells, the dried product can be rehydrated to have substantially all of the properties and characteristics which the product had prior to dehydration. Needless to say, when the cellular integrity of substantially all of the cells is maintained, the properties and characteristics of the rehydrated product even more closely approach those properties and characteristics of the product prior to being dehydrated. Where structural integrity has been maintained throughout the dehydration process, the properties and characteristics of the rehydrated product even still more closely approach those properties and characteristics of the product prior to being dehydrated.

Additionally, the invention provides a process for dehydrating a product by urging a gaseous drying medium into contact with the product in a chamber, wherein the temperature and relative humidity of the drying medium are controlled so that the rate of water removal from the product is such as to minimise damage to the cellular integrity of the product during the drying process.

Preferably, the temperature and relative humidity of the drying medium are controlled so that the cellular integrity of at least 50% of the cells of the product not adjacent to a face of the product is maintained during the drying process, and ideally, the cellular integrity of substantially the entire product is maintained during the drying process.

In one aspect of the invention the rate of water removal from the product is such as to minimise damage to the structural integrity of the product during the drying process. Preferably, the structural integrity of at least 50% of the cells of the product not adjacent to a face of the product is maintained during the drying process. Advantageously, the structural integrity of the product is substantially maintained during the drying process.

The dehydration process according to the invention establishes a gentle drying regime which maintains the optimal conditions for the mass transfer of moisture from the product being dried while substantially maintaining structural integrity substantially the entire product during the drying process. By closely controlling the temperature and relative humidity of the drying medium, the surface of the product being dried remains permeable to water, moisture and water vapour moving from the interior of the product into the drying medium.

Enhanced mass transfer of water from the product as a result of the gentle drying process of the invention results in a superior product as well as in an efficient drying process, due to the reduction in energy consumption.

The drying regime avoids subjecting the product and material being dried to thermal and pressure over-stresses, hence maintaining the structural and cellular integrity of virtually the entire product during the drying process, while maintaining optimal conditions for heat and mass transfer.

In one embodiment of the invention the relative humidity of the drying medium is controlled so that the difference between the relative humidity of the drying medium and the equilibrium relative humidity of the product does not exceed 70% relative humidity. Preferably, the relative humidity of the drying medium is controlled so that the difference between the relative humidity of the drying medium and the equilibrium relative humidity of the product does not exceed 60% relative humidity. Advantageously, the relative humidity of the drying medium is controlled so that the difference between the relative humidity of the drying medium and the equilibrium relative humidity of the product does not exceed 50% relative humidity.

In another aspect of the invention the relative humidity of the drying medium in the chamber is allowed to rise to a maximum value which lies within the range of 30% to 70%. Preferably, the maximum value of the relative humidity of the drying medium in the chamber lies in the range of 50% to 70%. Advantageously, the maximum value of the relative humidity of the drying medium in the chamber lies in the range of 50% to 55%.

In another embodiment of the invention on the value of relative humidity of the drying medium reaching the maximum value, the relative humidity of the drying medium in the chamber is maintained substantially constant at the maximum value, or is permitted to only gradually decrease by maintaining the relative humidity of the drying medium being delivered to the chamber substantially constant, until the relative humidity of the drying medium in the chamber commences to fall or commences to fall at an increasing rate.

Preferably, the relative humidity of the drying medium in the chamber is permitted to fall off relatively rapidly after the fall in relative humidity of the drying medium has commenced or the rate of fall of the relative humidity of the drying medium has commenced to increase, until the water content of the product is approaching the desired water content and the rate of evaporation of water from the product becomes substantially independent of the drying medium.

In one aspect of the invention the rate of evaporation of water from the product becoming substantially independent of the drying medium, the relative humidity of the drying medium is controlled to asymptotically approach a predetermined value of relative humidity which provides the product dried to the desired water content.

In another aspect of the invention the predetermined value of relative humidity is lower than the equilibrium relative humidity of the product which corresponds to the desired water content, and the difference between the predetermined relative humidity of the drying medium and the equilibrium relative humidity of the product corresponding to the desired water content is in the range of 20% to 40% relative humidity.

In general, the difference between the predetermined value of relative humidity and the equilibrium relative humidity of the product corresponding to the desired water content is in the range of 25% to 35% relative humidity, and in many cases the difference between the predetermined value of relative humidity and the equilibrium relative humidity of the product corresponding to the desired water content is approximately 30% relative humidity.

Depending on the product, the relative humidity of the drying medium may be maintained substantially at the predetermined value of relative humidity for a time period in the range of 30 minutes to 120 minutes.

In another embodiment of the invention the drying medium is circulated through the chamber so that the speed of the drying medium relative to the product lies in the range of 1 M per second to 3 M per second. Preferably the drying medium is circulated through the chamber so that the speed of the drying medium relative to the product lies in the range of 1.5 M per second to 2.5 M per second. Advantageously, the drying medium is circulated through the chamber so that the speed of the drying medium relative to the product lies in the range of approximately 2 M per second.

In general, it is preferably that during the period while the relative humidity of the drying medium in the chamber is being maintained substantially constant or is only gradually decreasing, the relative humidity of the drying medium in the chamber is not more than 50% relative humidity lower than the equilibrium relative humidity of the product, for minimising the damage to the cellular and structural integrity of the product. Preferably, during the period while the relative humidity of the drying medium in the chamber is being maintained substantially constant or is only gradually decreasing, the relative humidity of the drying medium in the chamber is not more than 40% relative humidity lower than the equilibrium relative humidity of the product, and is preferably not more than 30% relative humidity lower than the equilibrium relative humidity of the product.

In another embodiment of the invention during the period while the relative humidity of the drying medium in the chamber is falling relatively rapidly, the relative humidity of the drying medium is controlled so that the relative humidity of the drying medium in the chamber is not more than 70% relative humidity lower than the equilibrium relative humidity of the product, for minimising the damage to the cellular and structural integrity of the product. Preferably, during the period while the relative humidity of the drying medium in the chamber is falling relatively rapidly, the relative humidity of the drying medium is controlled so that the relative humidity of the drying medium in the chamber is not more than 60% relative humidity lower than the equilibrium relative humidity of the product, and advantageously, is not more than 50% relative humidity lower than the equilibrium relative humidity of the product.

Ideally, the drying medium is recirculated, and preferably, the relative humidity of the drying medium in the chamber is controlled by the introduction of fresh drying medium into the recirculating drying medium, and the rate at which the fresh drying medium is introduced does not exceed 21% by weight of the mass flow rate of the drying medium.

In one embodiment of the invention the rate at which the fresh drying medium is introduced does not exceed 15% by weight of the mass flow rate of the drying medium.

In another embodiment of the invention the rate at which the fresh drying medium is introduced does not exceed 10% by weight of the mass flow rate of the drying medium.

In a further embodiment of the invention the rate at which the fresh drying medium is introduced does not exceed 7% by weight of the mass flow rate of the drying medium.

In a still further embodiment of the invention the rate at which the fresh drying medium is introduced does not exceed 4% by weight of the mass flow rate of the drying medium.

In another embodiment of the invention fresh drying medium is introduced at a substantially constant rate of not more than 7% by weight of the mass flow rate of the drying medium during the period while the relative humidity of the drying medium in the chamber is being maintained substantially constant at the maximum value of relative humidity.

In another embodiment of the invention fresh drying medium is introduced at a substantially constant rate of not more than 5% by weight of the mass flow rate of the drying medium during the period while the relative humidity of the drying medium in the chamber is being maintained substantially constant at the maximum value of relative humidity.

In a further embodiment of the invention fresh drying medium is introduced at a substantially constant rate of not more than 4% by weight of the mass flow rate of the drying medium during the period while the relative humidity of the drying medium in the chamber is being maintained substantially constant at the maximum value of relative humidity.

In a still further embodiment of the invention fresh drying medium is introduced at a substantially constant rate of not more than 3% by weight of the mass flow rate of the drying medium during the period while the relative humidity of the drying medium in the chamber is being maintained substantially constant at the maximum value of relative humidity.

In another embodiment of the invention fresh drying medium is introduced at a substantially constant rate of not more than 2% by weight of the mass flow rate of the drying medium during the period while the relative humidity of the drying medium in the chamber is being maintained substantially constant at the maximum value of relative humidity.

In a further embodiment of the invention fresh drying medium is introduced at a substantially constant rate of not more than 1% by weight of the mass flow rate of the drying medium during the period while the relative humidity of the drying medium in the chamber is being maintained substantially constant at the maximum value of relative humidity.

In another embodiment of the invention during the period while the relative humidity of the drying medium in the chamber is falling relatively rapidly, fresh drying medium is introduced at a rate of not more than 21% by weight of the mass flow rate of the drying medium.

In general, fresh drying medium is introduced is increased from the beginning of the period to the end of the period during which the relative humidity of the drying medium in the chamber is falling relatively rapidly.

In practice, no fresh drying medium is introduced into the recirculating drying medium until the relative humidity of the drying medium has reached its maximum value.

In another embodiment of the invention during the period while the relative humidity of the drying medium in the chamber is asymptotically approaching the predetermined value of relative humidity fresh drying medium is introduced at a rate of not more than 5% by weight of the mass flow rate of the drying medium.

In a further embodiment of the invention fresh drying medium is introduced through an inlet opening and exhaust drying medium is exhausted through an outlet opening, the size of the inlet and outlet openings being controlled as a function of the nominal exposed surface area of the product in accordance with a Modulation Index (MI) which is defined as:

$$MI = K_p \times NSP(S_{en} + S_{ex})/(S_{en} \times S_{ex})$$

where $S_{en}$ is the cross-sectional area of the inlet opening for make-up fresh drying medium, $S_{ex}$ is the cross-sectional area of the outlet opening for exhaust drying medium, and NSP is the nominal exposed surface area of the product, and Kp is a constant whose value depends on the product being dried and the pressure/flow characteristics of the drying medium, and during the period while the relative humidity of the drying medium in the chamber is being maintained substantially constant at the maximum value, the value of the Modulation Index lies in the range of 1,000 to 10,000.

Preferably, during the period while the relative humidity of the drying medium in the chamber is being maintained substantially constant at the maximum value, the value of the Modulation Index lies in the range of 2,000 to 8,000.

Preferably, the temperature of the drying medium is controlled not to rise to or above a degradation temperature which would cause irreversible thermal damage to the product.

In general, the temperature of the drying medium does not exceed 70° C.

Typically, the drying medium is maintained at a temperature within the range 40° C. to 70° C., in general the drying medium is maintained at a temperature within the range 55° C. to 65° C.

In one embodiment of the invention on reaching its maximum, the temperature of the drying medium is maintained substantially constant thereafter.

The drying medium may be any suitable medium, however, a typical drying medium is air, or for example, the drying medium may be nitrogen, and in some cases, the drying medium may be nitrogen-enriched air.

By recirculating the drying medium, the process according to the invention attains a relatively high degree of energy efficiency. However, the energy efficiency of the process according to the invention also results from the enhanced rate of water removal from the product which is made possible by virtue of the fact that the channels and passageways adjacent the faces of the product remain undamaged during the drying process, thus, facilitating efficient water removal from the interior of the product. Accordingly, suitable control of the temperature and relative humidity of the drying medium results not only in superior product quality, but also in reduced drying time and energy requirements. By controlling the temperature and relative humidity of the drying medium in the chamber to provide a sufficiently high water vapour density in the chamber effectively regulates the rate at which water is liberated from the product by limiting the numerous gradients in temperature and humidity which occur in the removal of moisture from a hygroscopic substance. Proper regulation of these gradients serves to maintain structural integrity and in the case of biological material with cellular structure prevents the formation of an impermeable surface layer which has an adverse effect both on the dried product and also on the removal of water from the interior of the product during the latter stages of the drying process.

In addition, the invention provides a process for preparing a dried product having the following characteristics, a water content between 2% and 20%, and preferably between 2% and 10%, and advantageously less than the level corresponding to the water activity threshold at which deterioration of the dried product commences, but not less than the lower limit for monolayer water content, substantially all the cells not adjacent to an exposed face of the product still have a relatively high degree of structural integrity as demonstrated by a substantially undamaged cell membrane, and the product has a water activity lower than 0.7, preferably the water activity is lower than 0.4, and ideally is between 0.3 and 0.4, most preferably at a value which minimizes the effects of deteriorative mechanisms.

In general, cells of the product are not ruptured by the drying process according to the invention. In particular, the cell membranes of the product, in general, are not damaged. As a result of this many organoleptic compounds and nutritional elements situated in or inside the cell membrane are retained. It seems even that many of the product of the invention have membrane which is in such a state that organoleptic compounds are more perceptible than in the fresh state, that is can be more easily liberated in the mouth.

The dried product of the invention retains many of the organoleptic compounds of the product as they were prior to drying, including those comprising the bouquet and taste, and advantageously contains a substantial part of the flavour compounds in the lower boiling point fractions, typically lower than 40° C., contained in the product as they were prior to drying.

According to an embodiment of the product of the invention, said product containing compounds which are able to be eluted at different temperatures, the weight ratio fraction of compounds eluted at a temperature between 150° C. and 200° C. to fraction of compounds eluted at a temperature between 40 and 100° C. is greater than 0.3, preferably greater than 0.5, for example between 0.6 and 2. The weight ratio fraction of compounds eluted at a temperature between 150° C. and 200° C. to fraction of compounds eluted up to 200° C. is greater than 0.25, preferably greater than 0.3, for example 0.35–0.4.

Advantageously, a substantial proportion of the spaces or channels between cells adjacent to a face of the product are not filled with sugar and remain open. Preferably, a substantial proportion of the spaces or channels contain a gaseous medium, such as air, $N_2$, mixtures of $N_2+O_2$, oxygen-enriched air, water vapour, or some other. The gentle nature of the drying process of this invention minimizes cell wall degradation whereby both sugars and flavour constituents remain within the cells, rather than residing in spaces between the cells.

The dried product of the invention may be a fruit or vegetable food product such as pineapple, banana, papaya, mango, other tropical fruits, watermelon, carrots, cabbage, celery, peppers, spinach, beans, plums, apples, pears, mushrooms, grapes, oranges, lemons, limes, and other fruits and vegetables, but can also be herbs, spices, tobacco, blood, sperm, bacteria, meat, seafood, tea leaves, seaweed, algae, coffee beans, cocoa beans, nuts, eggs and other food and other biological products.

The invention relates also to a process for dehydrating other products and substances, for example, products not containing cells, such as chemical compounds, pharmaceutical compounds or preparations, as well as non-biological products and substances.

In an alternative process according to the invention a gaseous drying medium is heated and urged into contact the product being dried, the temperature of the drying medium contacting the product to be dehydrated being lower than the temperature of degradation of the product, the temperature of the product to be dehydrated being increased in a controlled manner during the drying process, the process comprising at least one step in which the temperature of the drying medium is increased from a first temperature up to a temperature which may be adjacent the maximum dehydration temperature, but lower than the degradation temperature. In one aspect of the invention the said increase of temperature to the drying medium is such that during said step a difference of temperature exists between the product and the drying medium, said difference being between 0.1° C. and 5° C., may be lower than 2.5° C., and may be lower than 1.5° C.

In another aspect of the invention, the temperature of the drying medium may be increased at a rate lower than 5° C./hour.

Before this step, the product may be submitted to another treatment, such as a treatment which does not damage cells of a product prepared according to the invention. For example, the drying medium may first be maintained at a temperature of about 40° C. up to the moment a temperature of about 40° C. is reached within the product, while thereafter the drying medium may be heated at such a rate that the difference of temperature existing between the product and the drying medium is less than about 5° C., preferably less than 2.5° C. In general, a steady and continuous increase in temperature of the drying medium minimizes damage to the cell membranes so that a high percentage thereof remain intact while the moisture within the cells migrates therethrough and is removed by the drying medium. The gentle drying regime in which a controlled temperature difference between the drying medium and the product is maintained as mentioned above, results in a process in which colour and flavour constituents are not removed, but water is removed from the cells.

According to an alternative embodiment of the process according to the invention, when the water content of the product to be dehydrated is lowered to 10%, the drying medium is heated at such a rate that the difference of temperature existing between the product and the drying medium is less than about 2.5° C. In this case, the product is pre-dried at a temperature of 40° C. to 50° C. until the product reaches a water content lower than 20%, preferably lower than 10%.

In one alternative embodiment of the invention the rate of increase in the temperature of the drying medium is such that the temperature of the drying medium reaches the maximum dehydration temperature approximately at the same time as the desired water content of the product has been attained.

In another alternative embodiment of the invention the rate of increase of the temperature of the drying medium is substantially constant.

Ideally, the maximum dehydration temperature is less than the temperature of degradation of the product.

In general, the maximum dehydration temperature does not exceed 70° C. Typically, the maximum dehydration temperature lies in the range 40° C. to 50° C.

In one aspect of the invention the product is dried to a water content lower than 20%.

In another aspect of the invention the product is dried to a water content of about 10%.

Preferably, the drying medium is recycled. Preferably, during the end of the dehydration process less than 4% by volume of fresh drying medium is added to the drying medium. Advantageously, towards the end of the dehydration process not more than 1% of the humidity of the recirculated drying medium is condensed from the drying medium as it is being recirculated.

In another embodiment of the invention the product is dried to a water content below about 10%, and the relative humidity of the drying medium during the period while the water content of the product is being reduced below about 20% lies in the range between 10% and 20%.

In a further embodiment of the invention the product is dried to a water content of less than 7%.

Further, the invention provides a dried product dried according to the process according to the invention.

BRIEF DESCRIPTION OF THE DRAWINGS

The invention will be more clearly understood from the following descriptions of some non-limiting examples and embodiments thereof which are given by way of example only with reference to the accompanying drawings in which:

FIGS. 8 to 60 show gas chromatograph traces of products before being dried and after being dried using the dehydrating process according to the invention, and also show gas chromatograph traces of all but one of the products after having been rehydrated subsequent to being dried using the dehydrating process according to the invention and other dehydrating processes.

DETAILED DESCRIPTION OF THE INVENTIONl

Figure 1:
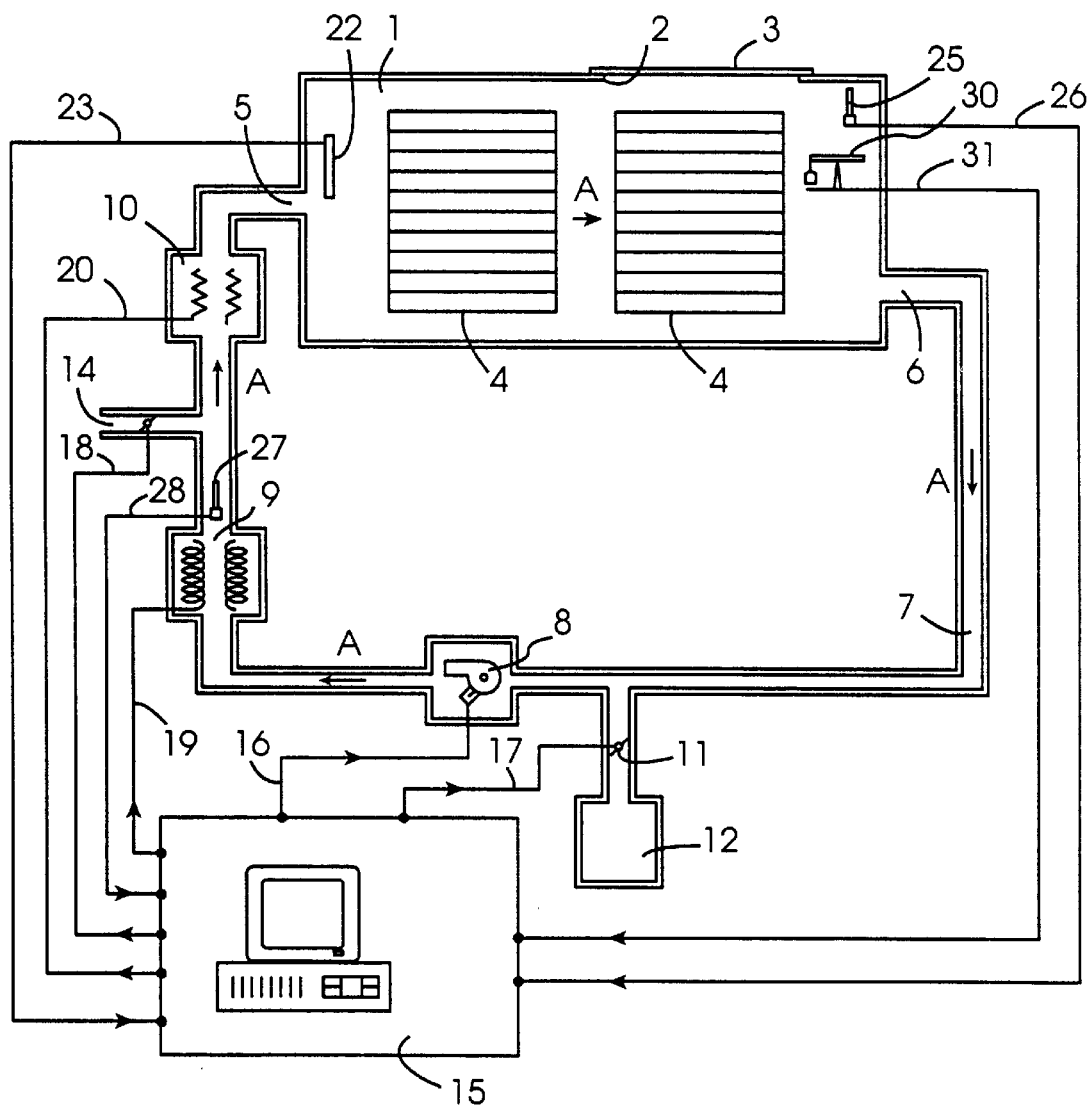
FIG. 1 is a schematic view of an apparatus suitable for carrying out a dehydrating process according to the invention.

Before describing examples of the dehydration process according to the invention, a drying apparatus which is suitable for carrying out the dehydration process will first be described with reference to FIG. 1. It will of course be appreciated that the dehydration process is not limited to being carried out in the apparatus of FIG. 1, and many other different types of apparatus may be used. The drying apparatus of FIG. 1 comprises an enclosed insulated drying chamber 1 having an access opening 2 which is closed by a door 3 for accommodating trays 4 on which products to be dehydrated are placed into the chamber 1. An inlet opening 5 is provided to the chamber 1 for introducing gaseous drying medium to the chamber 1, and an outlet opening 6 provides for removal of the drying medium from the chamber 1. A duct 7 extends from the outlet 6 to the inlet 5 for recirculating drying medium back to the chamber 1. A fan 8 in the duct 7 circulates drying medium through the duct 7 in the direction of the arrow A, and In turn through the drying chamber 1 also in the direction of the arrow A. A heater 9 located in the duct 7 between the fan 8 and the inlet 5 heats the drying medium as it is being returned to the drying chamber 1. A condenser 10 which may be operated for condensing some of the water out of the drying medium is located in the duct 7 between the fan 8 and the heater 9.

An inlet valve 11 for introducing fresh drying medium into the duct 7 is located upstream of the fan 8. The inlet valve 11 may communicate directly with ambient air for introducing fresh air into the duct 7, or alternatively may introduce fresh drying medium from a drying medium source 12, for example, nitrogen contained in a gas bottle or other suitable container. An outlet valve 14 for exhausting part of the recirculated drying medium from the duct 7 is located between the condenser 10 and the heater 9.

A control means, namely, a central programmable logic controller which is computer controlled controls the apparatus in response to signals received from sensors which are described below and which are located at appropriate locations in the apparatus. A control link 16 activates and deactivates the fan 8 under the control of the central controller 15. The inlet valve 11 and the outlet valve 14 are controlled by the central controller 15 through control links 17 and 18, respectively. Control links 19 and 20 control the heater 9 and the condenser 10, respectively.

A temperature sensor 22 located at the inlet 5 to the drying chamber 1 monitors the temperature of the drying medium being introduced to the drying chamber I. Signals from the temperature sensor 22 are relayed to the controller 15 through a link 23. A humidity sensor 25 is located in the drying chamber 1, and in this case is provided by a psychometric device for monitoring the relative humidity of the drying medium in the drying chamber 1. The humidity sensor 25 is located in the drying chamber 1 away from the outlet 6 but towards the outlet 6. A link 26 relays signals from the humidity sensor 25 to the controller 15. A humidity sensor 27 is located in the duct 7 downstream of but adjacent the condenser 10 for monitoring the relative humidity of the drying medium as it exists the condenser to. The humidity sensor 27 is also provided by a psychometric device. A link 28 relays signals from the humidity sensor 27 to the controller 15.

A product water loss sensor 30 which is provided by a load cell device is located in the drying chamber 1 for monitoring the total weight of the product being dried for determining the current water content of the product as the dehydration process proceeds. In the examples described below the water loss sensor 30 was not used, rather as will be discussed below, the equilibrium relative humidity of the product was monitored, since water content is a function of equilibrium relative humidity. The product water loss sensor 30 is located in the drying chamber 1 so that the trays 4 with the product thereon are supported on the product water loss sensor 30. A link 31 relays signals from the product water loss sensor 30 to the controller 15. During the dehydration process the weight of the product on the trays 4 changes, whereby the loss of water from the product can be estimated. As the dry matter content of the product can be estimated by heating a sample of the product at a temperature of about 100° C. in a laboratory test for a time specified in a recognised test procedure, the water content of the product can be determined from the weight of the product which is monitored by the water loss sensor 30 as the drying process proceeds.

Accordingly, in response to signals received from the temperature sensor 22, the humidity sensors 25 and 27 and the product water loss sensor 30 the controller 15 controls the operation of the fan 8, the heater 9 and the inlet and outlet valves 11 and 14, respectively. Should it be desired to operate the condenser 10, the condenser 10 is also controlled by the controller 15 in response to the signals received from these sensors.

In controlling the inlet and outlet valves, 11 and 14, respectively, the cross-sectional area of the opening presented to the fresh drying medium and the exhausted drying medium is controlled. The cross-sectional area is the area of the opening presented to the medium at right angles to the flow of medium. The cross-sectional area of the opening defined by the inlet valve 11 is hereinafter represented by $S_{en}$, and the cross-sectional area of the opening defined by the outlet valve 14 is hereinafter represented by $S_{ex}$. In certain cases, the inlet and outlet valves 11 and 14, respectively, may remain closed during all or part of the process. The combination of the pressure drop across the fan 8 together with minute holes and cracks which in general, would naturally occur in the duct 7 and the drying chamber 1 may provide sufficient exchange of drying medium, namely, drying air with fresh air for efficient operation of the dehydration process in the drying apparatus of FIG. 1, without the need to open the inlet and outlet valves 11 and 14, respectively. The significant ability of air to carry water vapour at elevated temperatures also accounts for the ability to operate the apparatus to carry out a dehydration process according to the invention with little or no fresh air added, and little egress of moisture laden drying air from the apparatus.

Examples of the dehydration process according to the invention for drying fruit and vegetable products will now be described using the apparatus of FIG. 1. However, it will be readily apparent to those skilled in the art that the dehydration processes may be carried out on any other suitable apparatus. In the examples of the dehydration process, unless otherwise stated, the drying medium is air. The dehydration processes may be carried out at pressures lower or higher than atmospheric pressure, however, it is preferable that the dehydration processes are carried out at substantially atmospheric pressure, or at a pressure just above atmospheric pressure, for example, up to $1.2 \times 10^5$ Pa. In the examples of the dehydration processes described herein, the pressure of the drying medium in the drying chamber 1 is maintained slightly above atmospheric pressure.

In a preferred dehydration process according to the invention the process proceeds sequentially through four phases, namely, Phase 1—a rising temperature phase,
Phase 2—a high humidity phase,
Phase 3—a declining humidity phase, and
Phase 4—an asymptotic phase.

Figure 6:
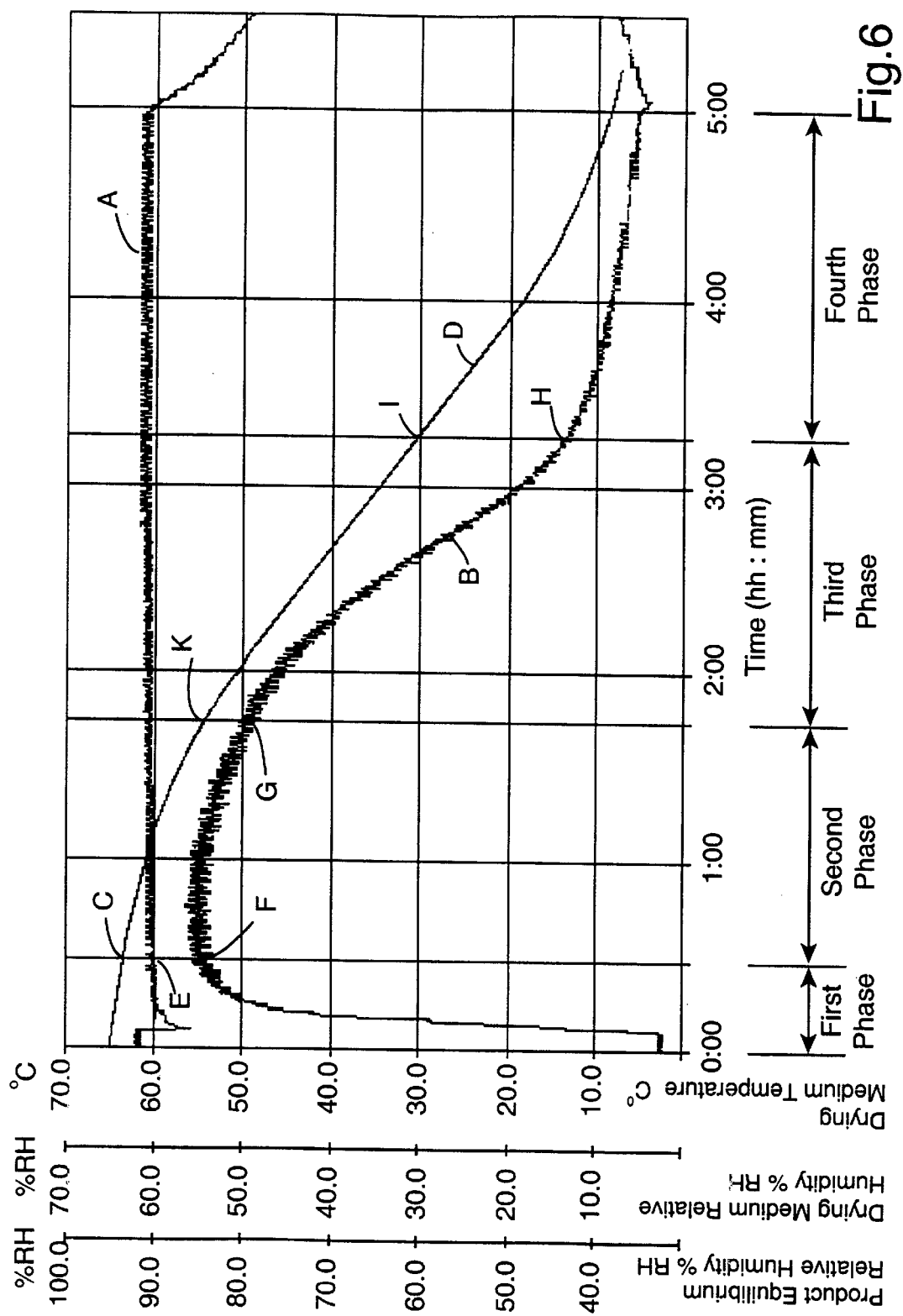
FIG. 6 shows plots of the relative humidity and the temperature of the drying medium, and the equilibrium relative humidity of product against time during an example of the dehydrating process according to the invention.

There is no sharp cut off point between the respective phases, rather, the phases merge gradually from one phase into the next. For ease of understanding this dehydration process according to the invention, the four phases will now be described under separate headings, and with reference to FIG. 6. FIG. 6 illustrates the parameters, namely, temperature and relative humidity, of the drying medium which were monitored during a dehydration process according to the invention in which IDARED apples were dehydrated. FIG. 6 also illustrates the equilibrium relative humidity of the apples during the dehydration process. Graph A is a plot of the temperature of the drying medium against time. Graph B is a plot of the relative humidity of the drying medium against time. Graph D is a plot of the equilibrium relative humidity of the apples against time. Graph A was plotted from the signals received from the temperature sensor 22 in the drying chamber 1. The relative humidity of the drying medium illustrated in Graph B was obtained from the humidity sensor 25 in the drying chamber. The equilibrium relative humidity of the apples illustrated in Graph D was determined at half-hourly intervals during the drying process. At each half-hourly interval a sample of the apples was removed and its equilibrium relative humidity was determined. The IDARED apples were sliced into slices of approximately 3 m thickness and loaded into the drying chamber 1 on the two trays 4 as illustrated in FIG. 1.

Phase 1—Rising Temperature Phase

In Phase 1 the drying medium is circulated by the fan 8, and exchange of drying medium with the surrounding atmosphere is minimised. In other words, the inlet and outlet valves 11 and 14 are closed, and the only exchange of drying medium with the surrounding atmosphere takes place through cracks, and imperfections in the sealing of the duct 7 and the drying chamber 1. Heat is applied to the drying medium for raising the temperature of the drying medium to a first set point, which although below, is relatively close to the maximum dehydration temperature at which the dehydration process is carried out. The maximum dehydration temperature should never exceed, and preferably, should be less than the degradation temperature of the product being dried. Phase 1 essentially commences when the product to be dried has been placed in the drying. chamber 1 and the door 3 has been closed. The temperature difference between the drying medium and the product should not result in damage to At the structural integrity of the product as a result of excessive thermal stress. Typically, the product is introduced into the drying chamber 1 when the temperature of the drying medium is approximately 40° C. Phase 1 continues until the temperature of the drying medium reaches the first set point, and the relative humidity of the drying medium reaches a first set point which will be the maximum value of relative humidity to which the drying medium is allowed to rise. The first set points of the temperature and the relative humidity of the drying medium depend on the product being dried. The first set point temperature may range from 50° C. to 70° C., and the first set point of the relative humidity of the drying medium of the drying medium may range from 30% to 70%.

In the example illustrated in FIG. 6, the first temperature set point which is indicated by the letter E is approximately 60° C. and the first relative humidity set point which is indicated by the letter F is approximately 55%. Thus, on the temperature of the drying medium and the relative humidity of the drying medium reaching 60° C. and 55% respectively the first phase ends, and the process moves into the second phase which will be described below.

During the first phase when the temperature of the drying medium reaches the first set point, the heater 9 is controlled for maintaining the temperature of the drying medium substantially at the first set point. Additionally, during the first phase the relative humidity of the drying medium may fluctuate, however, it is not permitted to exceed the first set point, and if necessary this may be achieved by providing sufficient exchange of drying medium with the atmosphere through the inlet and outlet valves 11 and 14, respectively. On the temperature and relative humidity of the drying medium in the drying chamber 1 reaching the respective first set points, the heater 9 and the inlet and outlet valves 11 and 14 are adjusted for maintaining the temperature and the relative humidity of the drying medium substantially at the first set points as the process moves into the second phase. The value of the equilibrium relative humidity of the product at the end of the first phase is indicated by the letter C on the Graph D of FIG. 6, which is approximately 93%.

As discussed above the pressure of the drying medium in the drying chamber 1 is maintained at a pressure slightly above atmospheric pressure, and should there be any tendency towards a build-up of over-pressure of drying medium in the drying chamber 1 correction is made through the use of a pressure release valve (not shown).

The first phase of the drying process of the example illustrated in FIG. 6 took approximately 30 minutes.

Phase 2—High Humidity Phase

During the second phase, in general, the flow rate of the drying medium is maintained constant and similar to the flow rate during the first phase so that the speed of the drying medium over the exposed surface of the product is maintained at a similar speed to that during the first phase. The temperature and relative humidity of the drying medium are maintained substantially constant at the respective first set points. This is achieved by maintaining the setting of the heater 9 and the inlet and outlet valves 11 and 14, respectively, at their respective settings to which they were set at the end of the first phase. The second phase is completed when there is insufficient moisture available in the product to maintain the relative humidity of the drying medium substantially constant without altering the flow rate of the drying medium or the rate of exchange of drying medium with the atmosphere. The end of the second phase is determined as being the point in the process at which the relative humidity of the drying medium commences to decrease rapidly, or if the relative humidity of the drying medium has comenced to decrease, the end of the second phase is the point at which the rate at which the relative humidity of the drying medium is decreasing commences to significantly increase. In Graph B of FIG. 6 the end of the second phase is indicated by the point G. At this stage, the second phase is complete.

In general, the product being dried will contain a quantity of free water, and the end of the second phase, in general, is determined when this free water has been exhausted. In general, it is at this stage that the evaporation rate of water from the product falls below the rate of vapour removal which had been substantially maintained during the second phase. The value of the equilibrium relative humidity of the product at the end of the second phase is indicated by the point K on the Graph D of FIG. 6.

During the second phase, the relative humidity of the drying medium may not remain entirely constant. However, as can be seen in FIG. 6 the relative humidity during the second phase remains substantially constant for the initial part of the second phase and gradually begins to decrease during the latter part of the second phase. However, in such cases, as discussed above, the end of the second phase is determined when the rate of decrease of relative humidity of the drying medium commences to increase significantly.

If desired, a number of set points of both temperature and relative humidity may be set during the second phase, and when there is insufficient moisture available in the product to maintain the relative humidity of the drying medium at the last of the set points, that is determined as being the point of completion of the second phase.

As discussed above the relative humidity of the drying medium is maintained substantially constant at about the maximum value of relative humidity during the second phase, namely, the high humidity phase. This is achieved by setting the inlet and outlet valves 11 and 14 for controlling the exchange of drying medium with the atmosphere at the end of the first phase. It has been found that a relationship exists between the area through which drying medium is exchanged with the atmosphere and the nominal exposed surface area of the product which is exposed to the drying medium in the drying chamber for maintaining the relative humidity substantially constant during the second phase. This relationship may be expressed in terms of a Modulation Index MI. The Modulation Index is equal to a constant multiplied by the nominal surface area of the product divided by the area S.

In the present case, assuming no leakages in the duct 7 and the drying chamber 1 the area S through which drying medium is exchanged with the atmosphere is equal to $(S_{en} \times S_{ex})/(S_{en}+S_{ex})$. The Modulation Index can thus be expressed by the following formula:

$$MI = K_p \times NSP/S$$

$$= K_p \times NSP(S_{en}+S_{ex})/S_{en} \times S_{ex}$$

where $K_p$ is a constant whose value depends on the particular type of product being dried and the pressure/flow characteristics of the drying medium, and of the fan 8, NSP is the nominal surface area of product exposed to the drying medium.

The value of the Modulation Index during the second phase of the dehydration process is preferably maintained within the range $$1{,}000 < MI < 10{,}000$$

and more preferably is maintained within the range $$2{,}000 < MI < 8{,}000$$

The purpose of establishing control over the evaporation rate is to achieve the most rapid possible removal of water consistent with maintaining structural integrity, and achieving optimum retention of the initial structural properties of the product being dried.

Instead of or as well as controlling the relative humidity of the drying medium being returned to the drying chamber 1, by controlling the exchange of drying medium with fresh drying medium, the relative humidity of the drying medium may be controlled by the condenser 10.

In the example of FIG. 6 the second phase took approximately seventy-five minutes.

Phase 3—Declining Humidity Phase

The third phase of the dehydration process commences at the end of the second phase, in other words, when the rate at which the relative humidity of the drying medium within the drying chamber commences to decrease significantly, while both the temperature of the drying medium in the drying chamber and the rate of drying medium exchange are held substantially constant. In the third phase the relative humidity of the drying medium in the drying chamber is allowed to continue to decrease. However, the rate at which the relative humidity is allowed to decrease is controlled so that the rate of evaporation of water from the product does not exceed an evaporation rate which would result in damage to the structural integrity of the product. The rate at which the relative humidity of the drying medium is allowed to decrease during the third phase is controlled by regulating the exchange of drying medium with atmosphere by the inlet and outlet valves 11 and 14, respectively. Concurrently, in some cases the temperature of the drying medium may be varied during the third phase, provided it does not exceed the degradation temperature of the product being dried.

During the third phase the evaporation rate of moisture from the product is preferably modulated in order to maintain the gradients in temperature and relative humidity between the drying medium and the product within limits that will maximise the rate of moisture evaporation from the product, while at the same time avoiding damage to the structural integrity of the product. These limits vary from species to species, and also vary depending on the method of preparation of the product for drying, and the final desired characteristics of the dried product. However, the limits are identifiable for each species. In general, the rate of introduction of fresh drying medium to the recirculating drying medium is increased as the third phase progresses.

It is important that the temperature of the drying medium should be closely monitored during the third phase, since the evaporative cooling effect decreases as the dehydration process continues. In order to prevent undesired temperature rises during the third phase, the heat provided to the drying medium, in general, is reduced, and the circulating rate of the drying medium may be reduced.

The third phase continues until the rate of water evaporation from the product decreases virtually irrespective of the rate of drying medium exchange with fresh drying medium. In the example of FIG. 6 the end of the third phase is identified by the point H on the Graph B of relative humidity. The point I on the Graph D indicates the equilibrium relative humidity of the product at the end of the third phase.

The third phase of the example of FIG. 6 took approximately one and a half hours.

Phase 4—Asymptotic Phase

The fourth phase begins at the end of the third phase. During the fourth phase the relative humidity of the drying medium is allowed to asymptotically approach a predetermined value which is below the equilibrium relative humidity of the product which corresponds to the desired final water content of the product. Typically, the difference between the value of predetermined relative humidity of the drying medium and the final equilibrium relative humidity of the product at the process temperature is in the order of 30% relative humidity, although this value will vary from product to product, and will also vary depending on the final water content to which the product is to be dried. The equilibrium relative humidity of the product during the fourth phase is increasingly dictated by the temperature of the drying medium within the drying chamber, and the monolayer water content of the product, and is increasingly independent of the rate of exchange of drying medium with atmosphere. The end of the fourth phase occurs when the equilibrium relative humidity of the product reaches the equilibrium relative humidity which corresponds to the desired final value of water content of the product, provided the value of water content of the product is uniform throughout the product.

The fourth phase of the example of FIG. 6 took approximately one and three quarter hours minutes.

There is a minimum water content which may be attained for products during the fourth phase, the level of which depends on factors which include the monolayer water content of the product being dried, the relative humidity of the drying medium entering the drying chamber 1, and the temperature of the drying medium within the drying chamber 1.

Even though the process of the invention may yield a lower rate of moisture removal from the product in the initial portion of the dehydration cycle, the total drying time to reach a stated final moisture content is in most cases significantly shorter than for conventional forced flow warm air drying processes. It has been found that the drying process of the invention may be completed in a time period which may be as short as one tenth of the time it takes to dry product by freeze-drying processes.

Dehydration processes according to the invention whereby the process comprises the above four phases have been carried out using the apparatus of FIG. 1. In all cases two trays 4 carrying respective loads of the product were introduced into the drying chamber 1 through the access opening 2 and the door 3 was securely closed. The fan 8 was activated to circulate the drying medium through the drying chamber 1 at a mass flow rate sufficient to urge the drying medium over the exposed surface of the product at a speed of approximately 2 M per second. This speed was maintained during all four phases of the drying processes. The inlet valve 11 and the outlet valve 14 were closed to confine the drying medium within the duct 7 and the drying chamber 1. The heater 7 was activated to raise the temperature of the drying medium to the first set point temperature. The relative humidity of the drying medium in the drying chamber 1 was allowed to rise to the first relative humidity set point. At this stage the first phase was completed, and the second phase commenced. Immediately upon commencement of the second phase the inlet valve 11 and outlet valve 14 were operated so as to maintain the relative humidity of the drying medium in the drying chamber 1 substantially constant at the first set point, and the heater was controlled to maintain the temperature of the drying medium in the drying chamber substantially constant for the duration of the second phase. The settings of the valves 11 and 14 were determined initially using the Modulation Index formula. Once the inlet and outlet valves 11 and 14, respectively were set at the beginning of the second phase, no further adjustment was necessary, and the relative humidity of the drying medium in the drying chamber tended to remain substantially constant.

The process moved from the second to the third phase when the relative humidity of the drying medium in the drying chamber 1 commenced to decrease, or commenced to decrease more rapidly than it had been decreasing during the latter part of the second phase.

During the third phase the inlet and outlet valves 11 and 14 were controlled for maintaining the relative humidity gradient between the drying medium in the drying chamber 1 and that of the product such that the difference between the relative humidity of the drying medium and the product did not exceed a value which would result in damage to the structural integrity of the product as already described. This was achieved by continuously varying the settings of the inlet and outlet valves 11 and 14 for increasing the rate at which fresh drying medium is added to the recirculating drying medium.

During the fourth phase as the relative humidity of the drying medium in the drying chamber commenced to asymptotically approach the predetermined value of relative humidity for the drying medium, the inlet and outlet valves 11 and 14, and the heater 9 were controlled and set for maintaining the rate at which fresh drying medium was added to the recirculating drying medium and heat was added to the drying medium, for maintaining the relative humidity of the drying medium substantially at the predetermined relative humidity value. The relative humidity of the drying medium was maintained at the predetermined relative humidity value for a sufficient period until the equilibrium relative humidity of the product being dried was at a value which corresponded with the desired final water content of the product.

Returning now to FIG. 6 which illustrates the parameters of the drying medium during the four phase drying process in which apple slices were dried to a final water content of approximately 5.5% by weight. The water activity of the dried apples was 0.272. The apples which were dried in the process illustrated in FIG. 6 were of the IDARED variety, and had been removed from cold storage in which they had been for approximately six months. The apples were sliced into slices of approximately 3 mm thickness and were loaded into the drying chamber on the two trays 4. The total nominal surface area of the product exposed to the drying medium was 19 $M^2$. The loads of product on the two trays were arranged so that the length of the loads in the direction of air flow through the drying chamber 1, namely, in the direction of the arrow A was as short as possible for minimising the relative humidity gradient of the drying medium across the product. The drying medium was circulated through the drying chamber 1 at a mass flow rate sufficient to cause the drying medium to pass over the exposed surface area of the product at a speed of approximately 2 M per second.

A more detailed discussion of the dried apple slices is given below with reference to Table 1. Briefly, the temperature of the drying medium during the first phase of the drying process was allowed to rise to a first temperature set point of approximately 60° C. The relative humidity of the drying medium was allowed to rise to a first set point of approximately 55%. At the end of the first phase the equilibrium relative humidity of the product was approximately 93%. During the second phase of the process, the temperature was maintained substantially constant at the first set point, and for the majority of the second phase the relative humidity of the drying medium was maintained substantially constant approximately 55%. At the end of the second phase the relative humidity of the drying medium had fallen to approximately 50%, and the equilibrium relative humidity of the apples was approximately 84%. During the second phase, the drying medium was exchanged with the atmosphere and the rate at which fresh air was added to the drying medium was approximately 2% of the mass flow rate of the drying medium. During the second phase, the difference between the relative humidity of the drying medium and the equilibrium relative humidity of the product did not exceed 35% relative humidity.

During the third phase of the drying process, the relative humidity of the drying medium was allowed to drop at a rate such that the difference between the relative humidity of the drying medium and the equilibrium relative humidity of the apples did not exceed 47% relative humidity. In order to achieve this the rate of exchange of drying medium with the atmosphere was gradually increased during the third phase so that at the end of the third phase fresh air was being added to the drying medium at the rate of approximately 3.5% of the mass flow rate of drying medium. During the third phase, the temperature of the drying medium remained substantially constant at approximately the value of the first set point, namely, approximately 60° C., and rose gradually towards the end of the third phase to a temperature of approximately 61° C. At the end of the third phase the relative humidity of the drying medium was approximately 13%, and the equilibrium relative humidity of the apple slices was approximately 60%.

During the fourth phase the relative humidity of the drying medium was allowed to drop, and to asymptotically approach a predetermined value of 7% approximately. The relative humidity of the drying medium was retained substantially at the predetermined value of 7% for a period of approximately 40 minutes. This finally yielded dried apple slices with an equilibrium relative humidity value of approximately 38% which corresponds with the desired final water content of approximately 5.5%, and a water activity of approximately 0.272%. During the fourth phase, the temperature remained substantially constant at approximately 61° C. The fall in temperature in the Graph A at the end of the fourth phase is as a result of the door 3 of the drying chamber 1 being opened for the removal of the dried apples. At the end of the fourth phase, the difference the relative humidity of the drying medium and the equilibrium relative humidity of the product was approximately 30% relative humidity.

Figure 7:
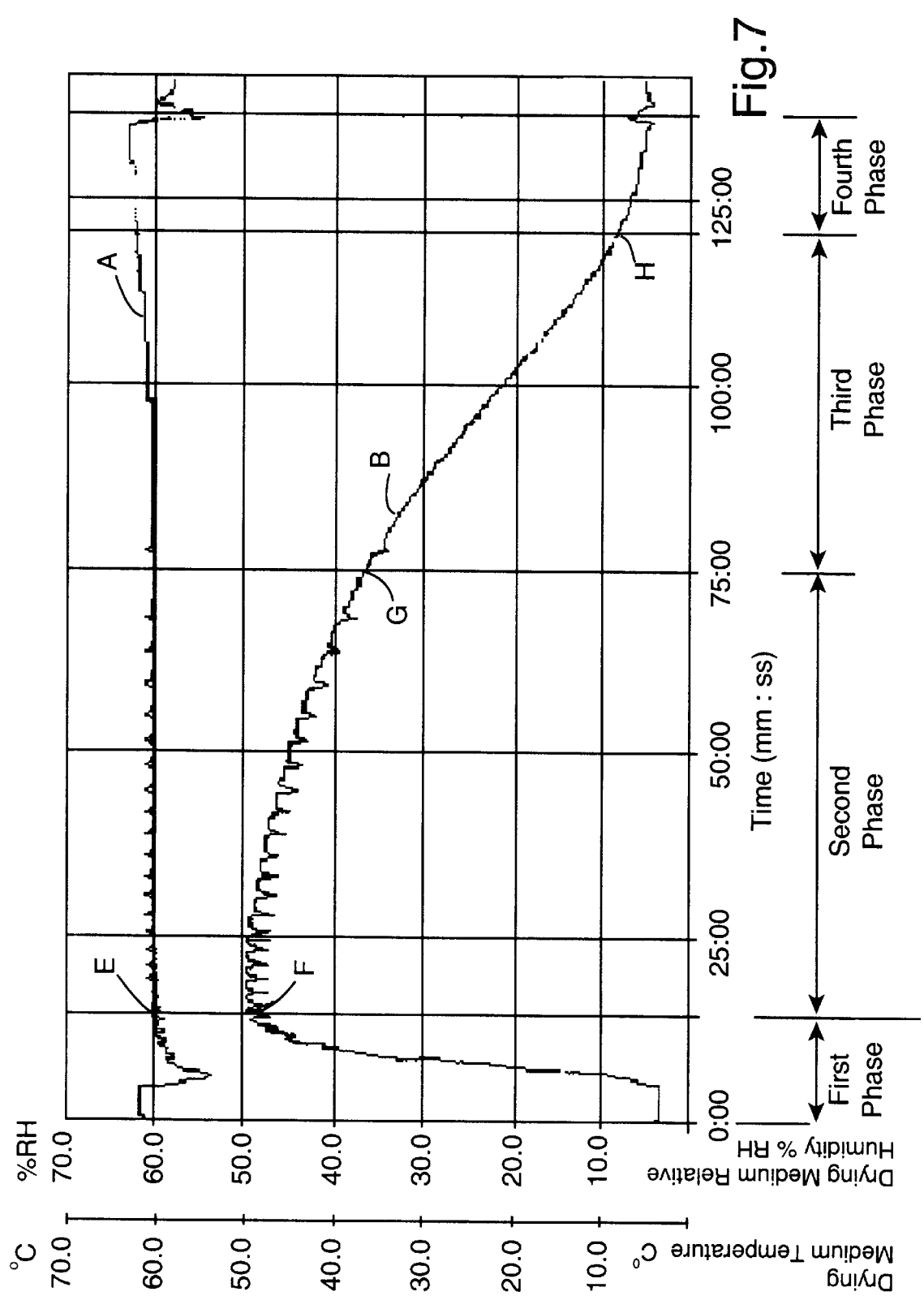
FIG. 7 shows plots of the relative humidity and the temperature of the drying medium against time during another example of the dehydrating process also according to the invention.

FIG. 7 illustrates two graphs, namely, the Graph A of temperature, and the Graph B of relative humidity of the drying medium of another example of the four phase dehydrating process according to the invention, in which apple slices (Cultivar Jonagold) of 3 mm thickness were dried. Although the apple slices dried in this embodiment of the invention are of a different variety to the IDARED apples which were dried in the example of the process according to the invention described with reference to FIG. 6, the general cell structure and other structural characteristics of the two types of apples are substantially similar. As can be seen from FIG. 7 the time period for the drying process according to this example of the invention was approximately 2¼ hours. This was significantly less than the approximately 5 hours taken by the process described with reference to FIG. 6. The reason for the shorter drying time in the process of FIG. 7 is largely accounted for by the fact that the rate of exchange of drying medium with fresh drying medium was approximately doubled throughout the process. Another contributory factor to the reduced drying time was the fact that the temperature of the drying medium was allowed to rise gradually from 60° C. to approximately 64° C. during the latter half of the third phase, and the fourth phase of the process. Because of the increase in drying medium exchange with fresh drying medium the relative humidity of the drying medium only reached a maximum value of approximately 49%. Although the maximum value of relative humidity, at 49% is less than the maximum value of approximately 55% of the process of FIG. 6 the lower value of maximum relative humidity was still sufficient to avoid damage to the cellular and structural integrity of the product, and also had the effect of accelerating the rate of water removal from the product in both the second and third phases. However, experiments which have been carried out indicate that any significant reduction of the maximum value of relative humidity much below 49% does not reduce the drying time of the process further. In fact, the drying time at lower maximum values of relative humidity may be either similar to that of FIG. 7, or may increase. Most significantly at values of maximum relative humidity much below 49%, damage to the cellular and structural integrity of the product will become increasingly apparent. This, it is believed is caused by excessive differences between the relative humidity of the drying medium and the equilibrium relative humidity of the product. Thus, in general, it has been found advisable to carry out the processes according to the in venti on with a maximum value of relative humidity of the drying medium in the range of 50% to 60%, and preferably in the range of 50% to 55%.

In the example of the process described with reference to FIG. 7, the equilibrium relative humidity of the apple slices was not monitored. However, it is believed that the curve of the equilibrium relative humidity of the product would substantially follow the curve of the product equilibrium relative humidity of FIG. 6, but modified appropriately to take account of the shorter drying time.

Graphs of the drying medium temperature and relative humidity and equilibrium relative humidity of the product during drying processes on fruits and vegetables other than apples using the four phase drying process according to the invention, although not shown are substantially similar to those illustrated in FIGS. 6 and 7. In general, the only differences are in the drying times, and the maximum values of temperature and relative humidity, which are dependent on the product being dried and on the treatment to which the products are subjected to prior to drying, as well as the final desired water content of the product. However, in general, the maximum value of relative humidity of the drying medium would lie within the range of 50% to 55%, and the initial maximum value of the temperature of the drying medium, would, in general, be in the range of 60° C. to 70° C., and in the latter part of the drying cycle, typically, towards the end of the third phase, and during the fourth phase, the temperature may be allowed to rise to a maximum of approximatelyy 65° C.

In order to make a comparison between the product of the invention and other dried product, which were dried by other known techniques, the apple slices which were dried using the four phase process described with reference to FIG. 6 were compared with similar apple slices which had been dried by freeze-drying and conventional forced air drying.

Table 1 sets out the results of the analysis which have been carried out on the products dried by the three dehydration processes as follows:

the water content of the apple product (W % by weight), the dry content of the apple product (including flavouring compound) (100[|m]-W %), the water activity (A), ascorbic acid (vitamin C) content % by weight, the results of a visual inspection of the cell structure of the product, the fraction (F) of compounds eluted in a range of temperature from 0 to 200° C., the ratio ($R_1$) of compounds eluted between 0 to 40° C. for an amount of dried product corresponding to 100 g of dry matter, to compounds eluted between 0 to 40° C. for an amount of the initial apple corresponding to lOOg of dry matter, the ratio ($R_2$) of compounds eluted between 100 and 150° C. for an amount of dried product corresponding to 100 g of dry matter, to compounds eluted between 100 to 150° C. for an amount of the initial apple corresponding to 100 of dry matter, the ratio ($R_3$) of compounds eluted between 150 and 200° C. for an amount of dried product corresponding to 100 g of dry matter, to compounds eluted between 150 and 200° C. for an amount of the initial apple corresponding to 100 g of dry matter, the ratio (R) of compounds other than water eluted between 0 to 200° C. for an amount of dried product corresponding to 100 g of dry matter, to compounds other than water eluted between 0 to 200° C. for an amount of the initial apple corresponding to 100 g of dry matter, and the ratio $R_3/R_1$.

TABLE 1

IDARED APPLES FROM STORAGE

| | Fresh apples | Invention dried product | Freeze dried product | Air drying not invention |
|---|---|---|---|---|
| Water content W % | 88 | 5.5 | 2.8 | 18.6 |
| (100-W) % | 15 | 94.5 | 97.2 | 81.4 |
| Water activity | 1.0 | 0.272 | 0.191 | 0.641 |
| ascorbic acid % | 100 | 55 | 47 | 11 |
| cells | not damaged | not damaged | damaged | damaged |
| F 40° C. (%) | 1.3 | 4.8 | 1.8 | |
| F 40–100° C. (%) | 94.0 | 53.9 | 70.3 | |
| F 100–150° C. (%) | 2.5 | 6.8 | 13.8 | |
| F 150–200° C. (%) | 2.1 | 34.5 | 14.1 | |
| F 150–200° C./F 40–100° C. | 0.02 | 0.64 | 0.2 | |
| $R_1$ (%) | 100 | 94.5 | 14.6 | |

TABLE 1-continued

IDARED APPLES FROM STORAGE

|  | Fresh apples | Invention dried product | Freeze dried product | Air drying not invention |
|---|---|---|---|---|
| $R_2$ (%) | 100 | 65.6 | 55 | |
| $R_3$ (%) | 100 | 388 | 66.7 | |
| R (%) | 100 | 132 | 56 | |
| $R_3/R_1$ | 1 | 4.1 | 4.6 | |

It can be seen from Table 1 that the product dried in accordance with the invention retains a higher level of ascorbic acid (vitamin C) content and a higher content of low temperature eluted compounds. These low temperature eluted compounds, in general, are aromatic compounds. In addition as discussed below with reference to FIGS. 2 to 5, little or no cell damage was detected in the product dried according to the invention, while cell damage was clearly visible in the products which were freeze-dried and forced air dried. The colour and texture of the product dried in accordance with the dehydration process of the invention matched more closely the colour and texture of the product prior to being dried, than did the colour and texture of the products dried using the other two drying processes.

FIGS. 2 to 5 show on an enlarged scale the results of microscopic analysis of the cells of the apple slices prior to drying and after drying using the three drying processes discussed with reference to Table 1. FIGS. 2(a) and 2(b) illustrate portions of an apple slice prior to being dried. FIG. 2(a) illustrates the cellular structure at a skin area of the apple slice, while FIG. 2(b) illustrates the cellular structure of the flesh area of the apple slice, in other words, an interior portion of the apple slice. FIGS. 3(a) and 3(b) illustrate portions of the apple slice at the skin area and the flesh area, respectively, after drying by the four phase drying process according to the invention. FIGS. 3(c) and 3(d) illustrate portions of the skin area and flesh area, respectively, of apple slices which had been dried using the four an phase process according to the invention and had subsequently been rehydrated. FIGS. 4(a) and 4(b) illustrate portions of the skin area and flesh area, respectively, of apple slices which had been freeze-dried. FIGS. 4(c) and 4(d) illustrate portions of the skin area and flesh area, respectively of apple slices, which had been freeze-dried, and subsequently rehydrated. FIGS. 5(a) and 5(b) illustrate portions of the skin area and flesh area, respectively, of apple slices which had been dried using the standard forced air drying process. FIGS. 5(c) and 5(d) illustrate portions of the skin area and flesh area, respectively, of apple slices which had been dried by the standard forced air drying process and subsequently rehydrated. All the microscopic analysis on the skin area of the apple slices were carried out at a magnification factor of 280×. All the microscopic analysis on the flesh area of the apple slices were carried out at a magnification factor of 140×. It should be noted that the analysis were carried out on different slices. However, a valid comparison between the slices can still be made.

Figure 2A:
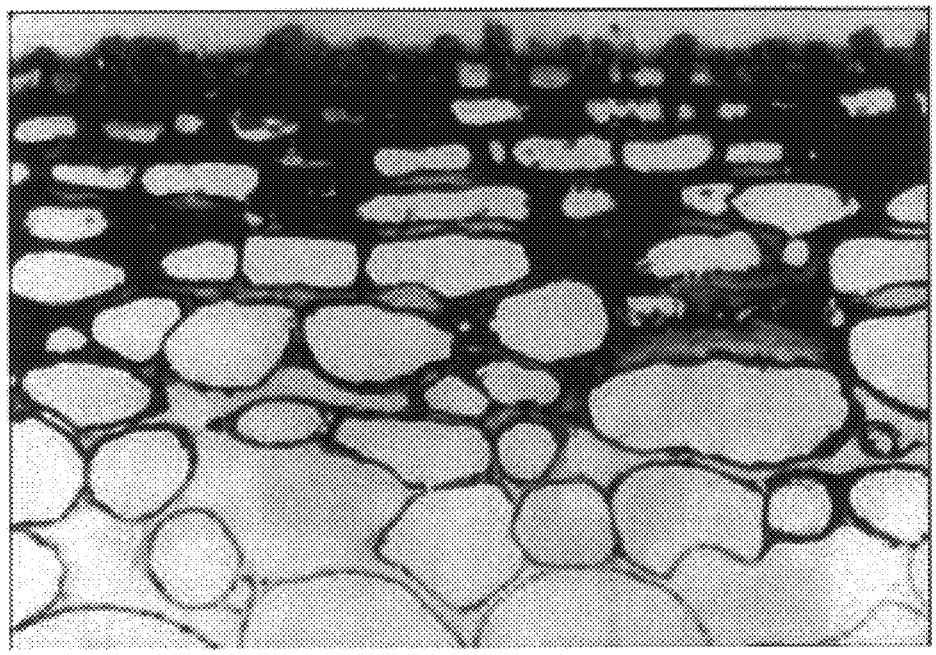
FIGS. 2 to 5 are enlarged views of parts near the skin and parts in the interior of apple slices before drying and after drying, respectively using the process according to the invention and known processes.
Figure 3A:
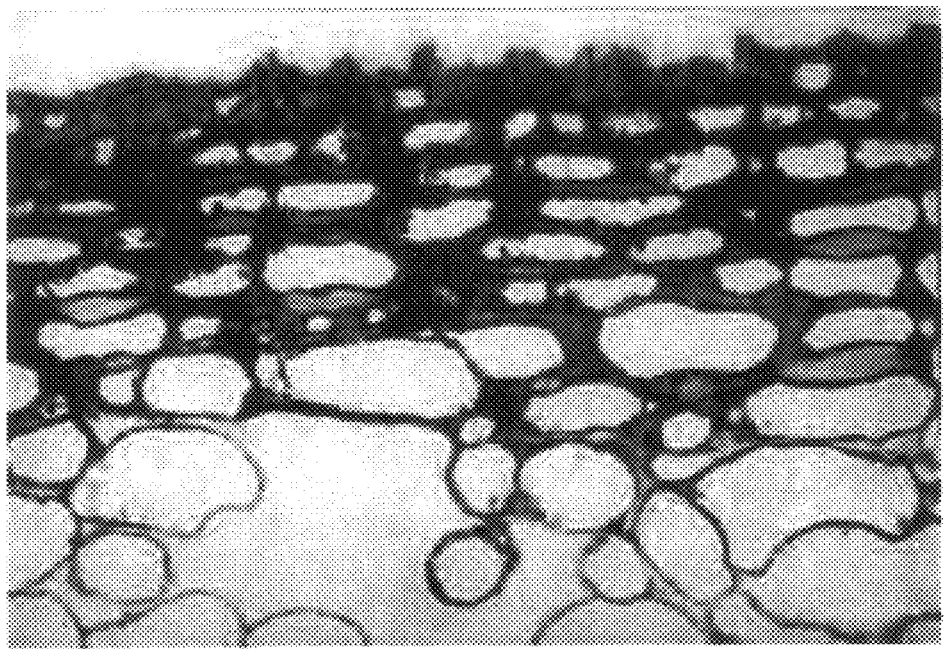

By comparing the skin area of the apple slices before and after drying using the process according to the invention, namely, the illustrations of FIGS. 2(a) and 3(a), it can be seen that little or no cell damage occurred to the cellular structure of the apple slices in the skin area during the drying process according to the invention. Furthermore, by comparing the skin area of the apple slice as illustrated in FIG. 3(c) which had been dried by the process according to the invention and subsequently rehydrated, it can be seen that the cellular structure after rehydration returns substantially to its structure prior to being dried. The cell walls have a substantially normal convex shape, and the cell membrane of each cell in general, is in its normal position adjacent the cell wall. Moreover, a waxy layer at the skin surface and colour components visible within several of the cells adjacent the skin are substantially undisturbed, while significant disturbance can be detected in the corresponding areas of product dried by the air-flow and freeze-drying processes.

The continuous lines in the FIGS. 2 to 5 illustrate the walls of the cells, and the partly broken lines illustrate the membrane of each cell. In FIGS. 2(a) and 2(b), only the cell walls illustrated by the continuous line are visible. The reason for this is that the membrane in any fresh product, or a product prior to dehydration, in general will be adjacent the cell wall. Thus, in the portions of the apple slices illustrated in FIGS. 2(a) and 2(b), the membrane being adjacent the cell wall is not visible in these two illustrations. Ideally if a product is to be rehydrated to its form prior to being dried, the membrane and cell wall of each cell should coincide.

While part of the membrane of some of the cells of the skin area of the rehydrated apple slices of FIG. 3(c) have not entirely returned to the cell wall, in general, the membrane and the cell wall in the majority of cells do coincide.

Figure 2B:
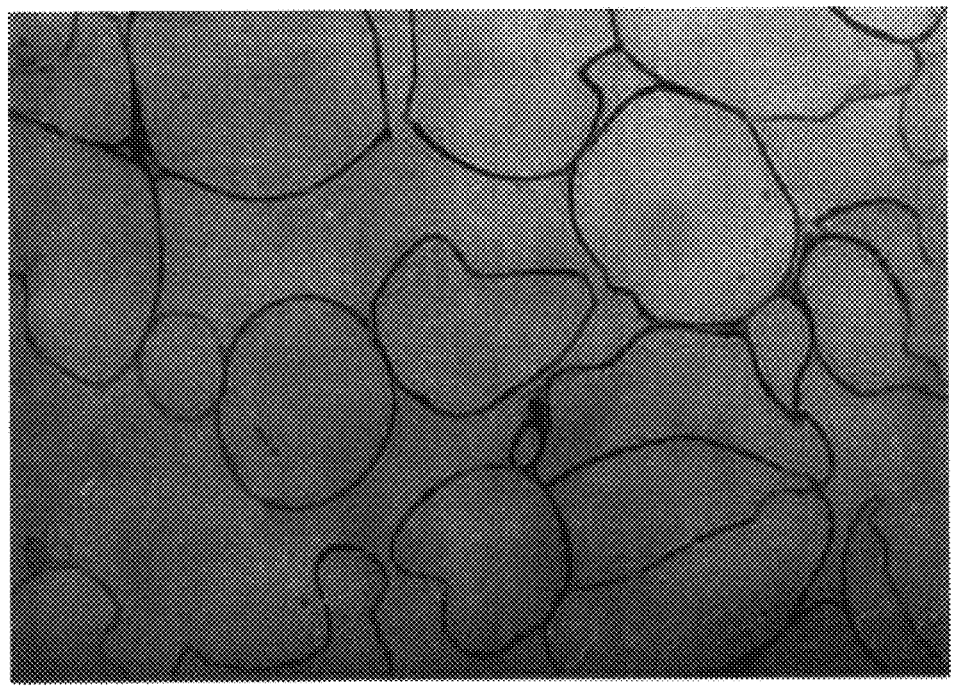
Figure 3B:
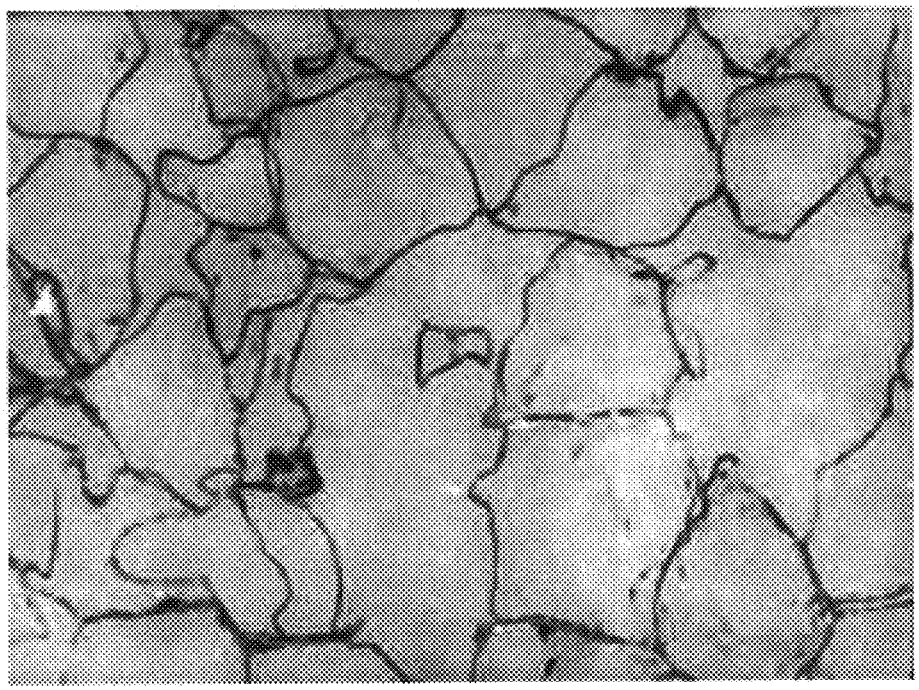
Figure 3C:
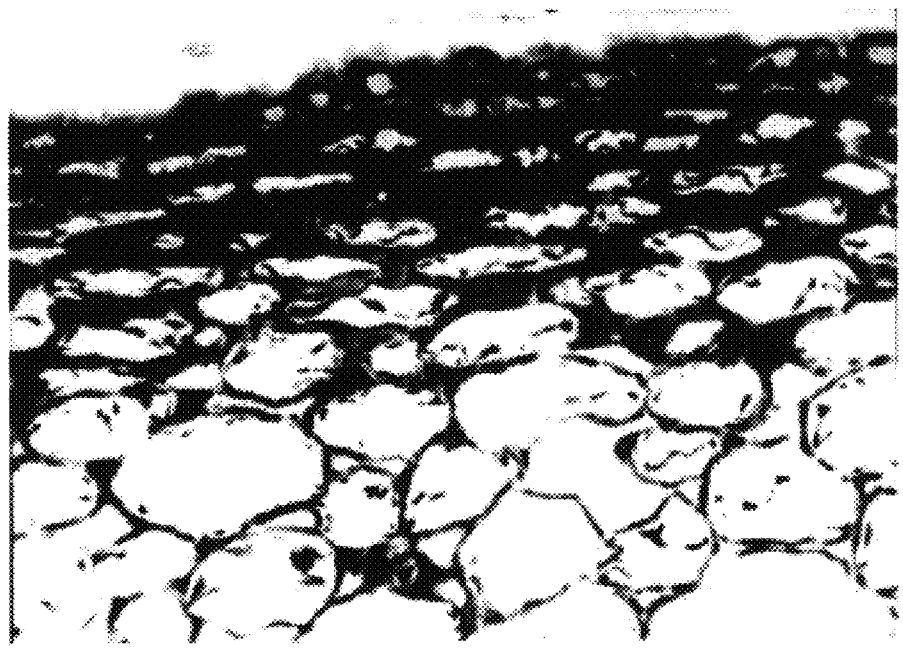
Figure 3D:
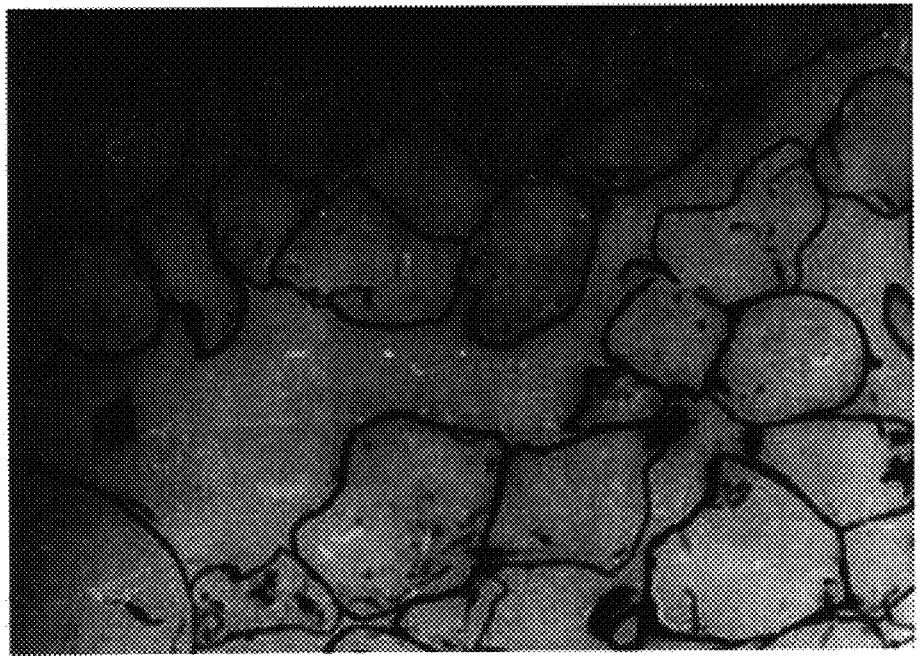

Similarly, much the same conclusion can be drawn from a comparison between FIGS. 2(b), 3(b) and 3(d). In FIG. 3(b), it can be seen that little or no damage has occurred to the cellular structure of the flesh area of the apple slice after being dried according to the invention, and after rehydration, the flesh area of the apple slice substantially returns to normal. In general, in the majority of cells virtually the entire membrane returns to the cell walls.

Figure 4A:
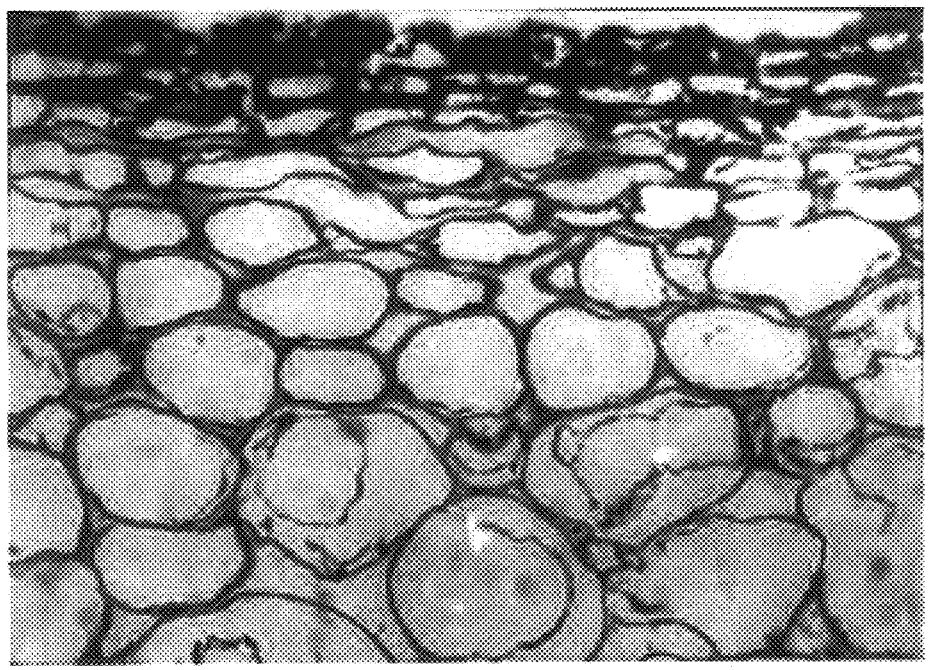
Figure 4B:
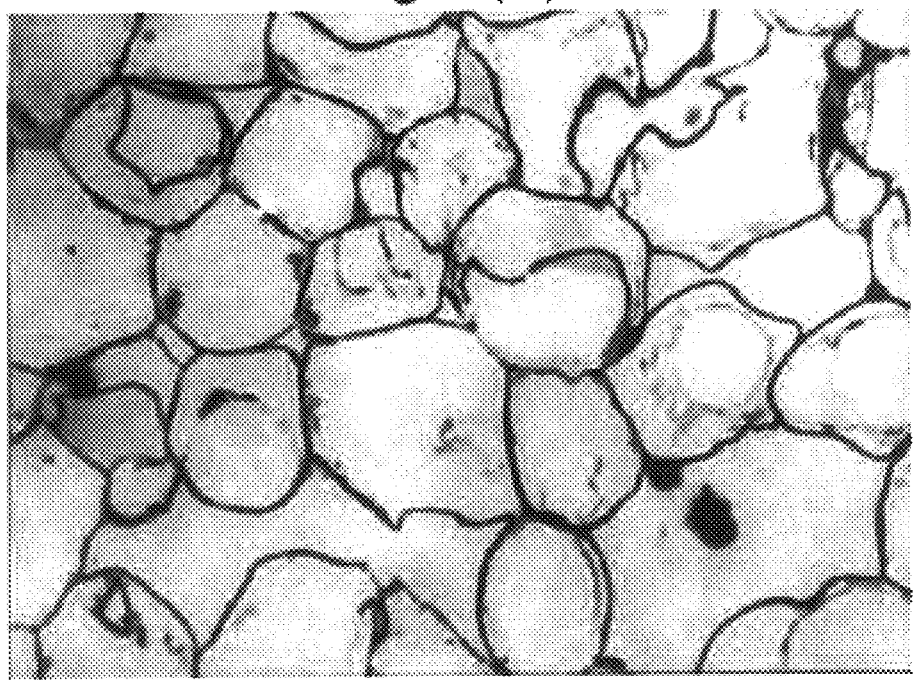
Figure 4C:
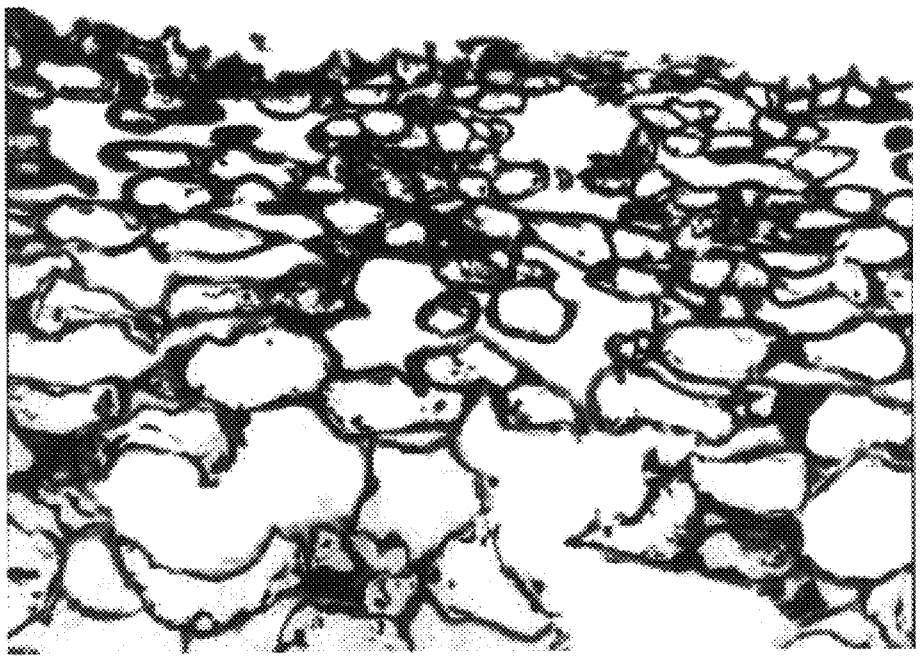
Figure 4D:
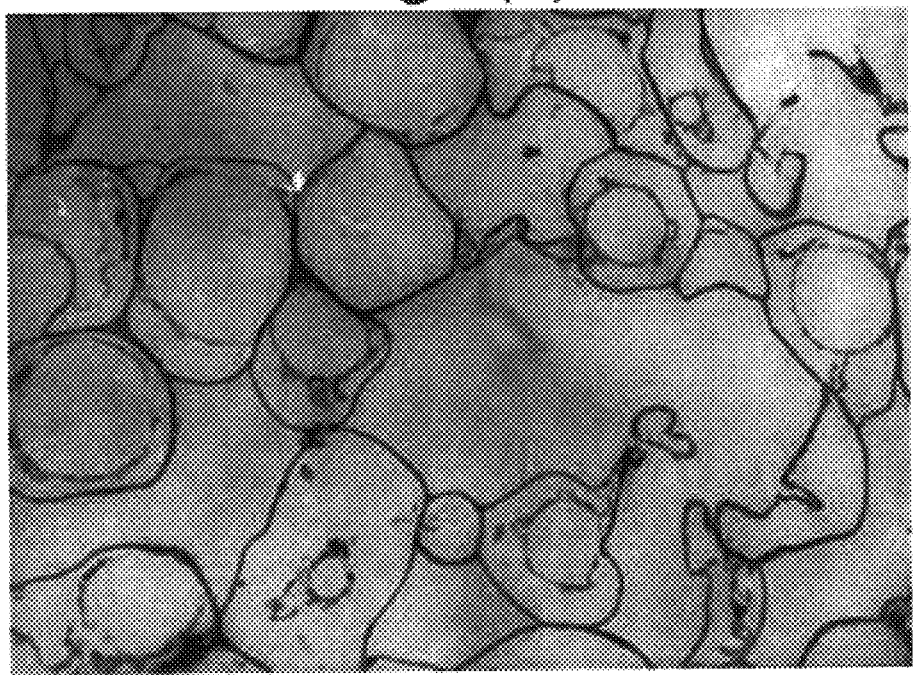

A comparison between FIGS. 2(a) and 2(b) on the one hand, and FIGS. 4(a) to 4(d) on the other hand shows that as a result of freeze-drying significant damage occurs to the cells both in the skin area and the flesh area as a result of freeze-drying. Not only are the cells damaged, but the membranes of the cells are also dislocated during freeze drying. The extend of the damage can clearly be seen in FIGS. 4(c) and 4(d) where after rehydration the cells in the skin area fail to return to normal. In FIG. 4(d), it can be seen that while some of the cell walls partly take up the convex shape which they had prior to being freeze-dried, in virtually all cells the membrane fails to return to normal, and remains substantially shrivelled up within the cell. In addition, the intercellular spaces are generally enlarged in the freeze dried material as a consequence of the freezing process.

Figure 5A:
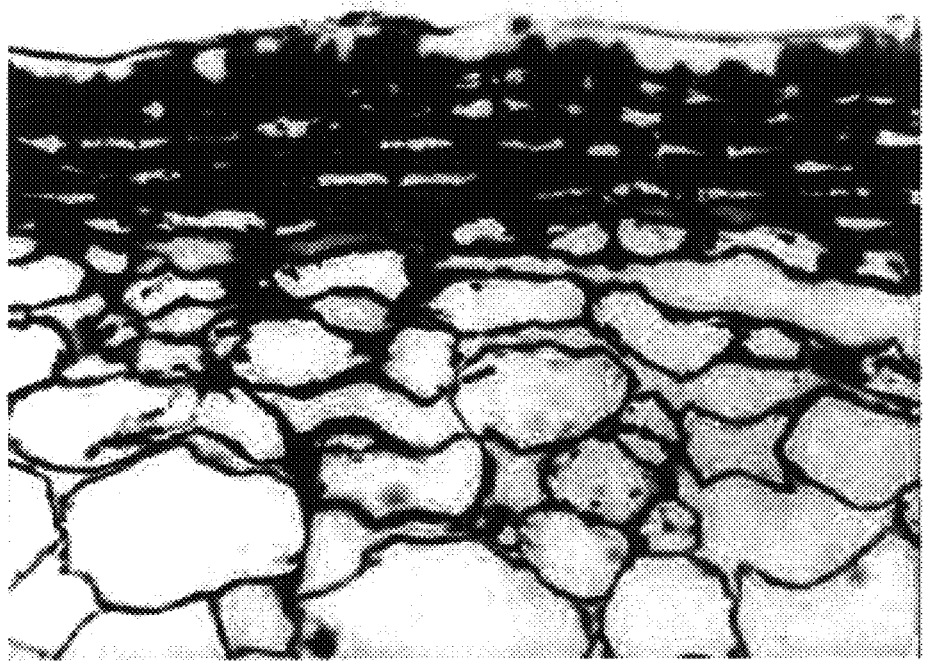
Figure 5B:
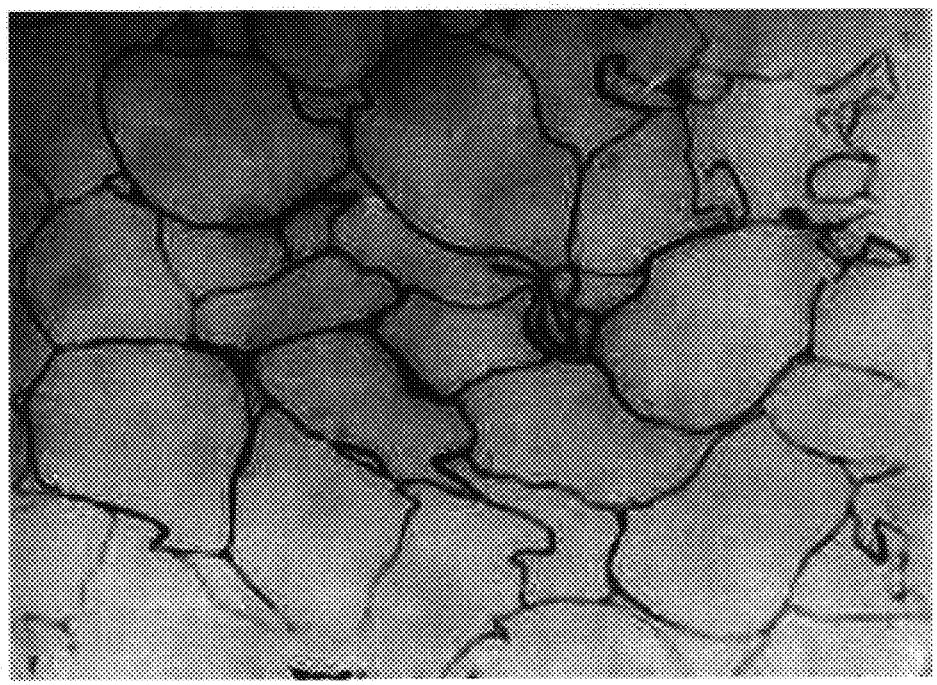
Figure 5C:
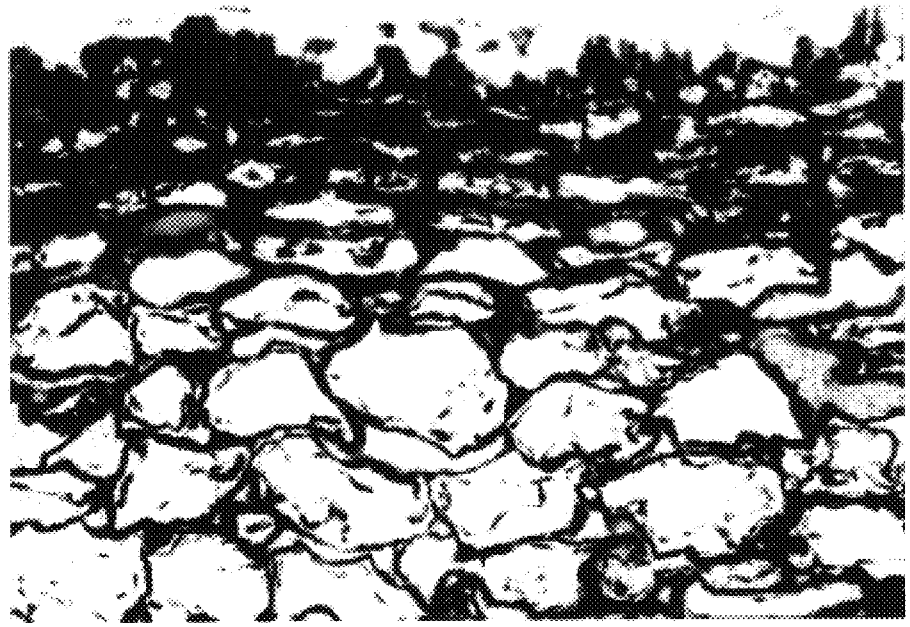
Figure 5D:
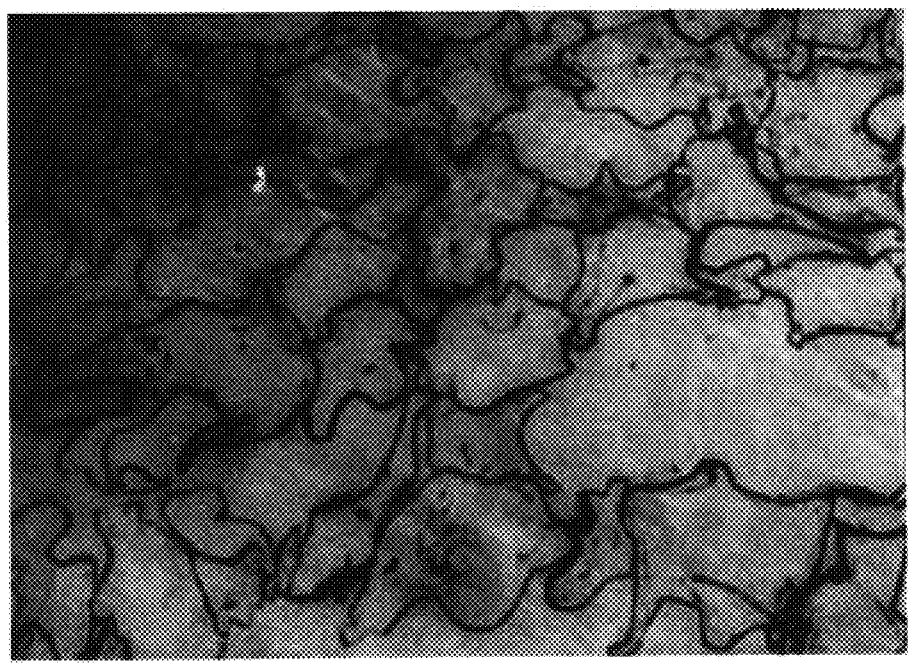

Comparisons between FIGS. 2(a) and 2(b) on the one hand, and FIGS. 5(a) to 5(d) on the other hand show a somewhat similar result as that from a comparison of FIGS. 2 and 4. As can be seen from FIG. 5(a) a substantial amount of damage has occurred to the cells in the skin area of the apple slice as a result of the standard forced air drying process. Broken cell walls are clearly visible in several locations of the forced air dried product. This is further emphasised in FIG. 5(c) after rehydration where the cells in the skin area of the apple slice have failed to return to normal, and furthermore, in all cases the membrane has failed to return to the cell wall, and remains substantially shrivelled up within the cell. In FIG. 5(b) cell damage to the flesh area of the apple slice after the standard forced air drying process is less evident. However, after rehydration of the flesh area the cells in the apple slice failed to return to normal, since as can be seen in FIG. 5(d) in virtually all cases the membrane fails to return to the cell wall, and furthermore, the cell walls fail to regain their normal convex shape. This failure of the cells to reassume their original convex shape shows that the turgor of the fresh product has been irreversibly damaged.

Dried tropical fruit materials obtained using three technologies were tested. The dried tropical fruits which were dried in accordance with the invention were dried using a four phase dehydration process, which is substantially similar to that described with reference to FIG. 6. The other two drying technologies were freeze-drying and conventional air-flow drying which is identical to the standard forced air drying process to which the apple slices referred to in Table 1 were subjected. The freeze-drying process is also identical to the freeze-drying process to which the apple slices referred to in Table 1 were subjected. Dried materials including banana, mango, pineapple, kiwi, papaya, and ginger were prepared according to the four phase dehydration process of the invention, air-flow dried material prepared in ISK (Institute of Pomology and Floriculture) of Skierniewice, Poland, and freeze-dried material produced in ISK. The dried products were subjected to organoleptic and physical and chemical analyses.

A sensory analysis was carried out of the slices of fresh fruits, and dried fruits dried according to the invention, dried by conventional air-flow drying and freeze-drying, and of rehydrated slices of the fruits with the use of a scaling method. The method for the tests—an unstructured linear scale (a segment on a straight line, of length 100 mm, with the proper descriptions at the edges, defining unequivocally the subject of the evaluation). The persons performing the test marked onto the scale their ratings, correspondingly to the sensation experienced; next, the results of the test were converted to numeric values, assuming the whole range of the scale to be 10 imaginary units. Tables 2a–2f show the results obtained based upon averages for 10 persons, each of whom received samples coded in a different order.

TABLE 2a

Banana-a summary of average organoleptic ratings

| Banana | Characteristics | | | | | | | |
|---|---|---|---|---|---|---|---|---|
| | 1 | 2 | 3 | 4 | 5 | 6 | 7 | 8 |
| Fresh fruit | 7.98 | 0.18 | 0.46 | 3.44 | 3.16 | 8.27 | 0.55 | 8.40 |
| Invention dried material | | | | | | | | |
| in a dry condition | 4.03 | 1.56 | 0.37 | 7.16 | 1.98 | 3.88 | 2.21 | 4.00 |
| following hydration | 1.99 | 4.65 | 7.90 | 1.44 | — | 1.09 | 4.16 | 1.17 |
| Air-flow dried fruit (not invention) | | | | | | | | |
| in a dry condition | 3.98 | 1.52 | 3.97 | 7.77 | 6.25 | 3.91 | 1.61 | 4.32 |
| following hydration | 1.84 | 4.87 | 6.46 | 2.02 | — | 1.19 | 3.19 | 1.36 |
| Freeze-dried material | | | | | | | | |
| in a dry condition | 3.05 | 2.44 | 0.78 | 5.51 | 8.13 | 5.80 | 1.42 | 5.15 |
| following hydration | 1.96 | 3.13 | 6.79 | 1.19 | — | 0.90 | 3.36 | 1.20 |

Quality Characteristics

1. Banana small (0-imperceptible, 10-intense)
2. Foreign small (0-imperceptible, 10-intense)
3. Hue—degree of brown (0-light, no brown hue, 10-brown)
4. Hardness (0-soft, 10-hard)
5. Brittleness (0-elastic, 10-brittle)
6. Banana taste (0-imperceptible, 10-intense)
7. Foreign taste (0-imperceptible, 10-intense)
8. General impression (0-low quality, 10-high quality)

TABLE 2b

Mango-a summary of average organoleptic ratings

| | Characteristics | | | | | | | |
|---|---|---|---|---|---|---|---|---|
| | 1 | 2 | 3 | 4 | 5 | 6 | 7 | 8 |
| Fresh fruit | 7.38 | 0.16 | 0.46 | 3.68 | 3.73 | 8.64 | 0.27 | 8.51 |
| Invention dried material | | | | | | | | |
| in a dry condition | 3.28 | 0.87 | 1.76 | 7.42 | 1.25 | 4.10 | 0.39 | 4.29 |
| following hydration | 1.63 | 1.95 | 1.39 | 0.49 | — | 1.96 | 1.71 | 2.23 |
| Air-flow dried fruit (not invention) | | | | | | | | |
| in a dry condition | 4.62 | 0.33 | 0.87 | 7.69 | — | 4.83 | 0.34 | 5.11 |
| following hydration | 1.94 | 2.88 | 0.95 | 1.52 | — | 1.86 | 2.60 | 2.04 |
| Freeze-dried material | | | | | | | | |
| in a dry condition | 3.04 | 0.75 | 0.50 | 6.02 | 5.16 | 5.08 | 0.38 | 5.92 |
| following hydration | 0.98 | 4.89 | 0.59 | 0.84 | — | 1.62 | 3.42 | 1.20 |

Quality Characteristics

1. Mango small (0-imperceptible, 10-intense)
2. Foreign small (0-imperceptible, 10-intense)
3. Hue—degree of brown (0-light, no brown hue, 10-brown)
4. Hardness (0-soft, 10-hard)
5. Brittleness (0-elastic, 10-brittle)
6. Mango taste (0-imperceptible, 10-intense)
7. Foreign taste (0-imperceptible, 10-intense)
8. General impression (0-low quality, 10-high quality)

TABLE 2c

Pineapple-a summary of average organoleptic ratings

| | Characteristics | | | | | | | |
|---|---|---|---|---|---|---|---|---|
| | 1 | 2 | 3 | 4 | 5 | 6 | 7 | 8 |
| Fresh fruit | 7.89 | 0.95 | 0.99 | 3.43 | 2.43 | 8.78 | 0.25 | 7.66 |
| Invention dried material | | | | | | | | |
| in a dry condition | 6.41 | 0.24 | 2.91 | 7.42 | 2.27 | 5.30 | 0.33 | 4.82 |
| following hydration | 0.65 | 3.48 | 1.04 | 3.44 | — | 0.86 | 3.42 | 1.20 |
| Air-flow dried fruit (not invention) | | | | | | | | |
| in a dry condition | 4.29 | 0.55 | 3.35 | 7.02 | 6.51 | 5.21 | 0.53 | 5.79 |
| following hydration | 1.10 | 3.46 | 0.46 | 4.59 | — | 0.43 | 3.16 | 1.13 |

TABLE 2c-continued

Pineapple-a summary of average organoleptic ratings

| | Characteristics | | | | | | | |
|---|---|---|---|---|---|---|---|---|
| | 1 | 2 | 3 | 4 | 5 | 6 | 7 | 8 |
| Freeze-dried material | | | | | | | | |
| in a dry condition | 3.33 | 0.66 | 0.05 | 4.51 | 9.46 | 5.29 | 0.72 | 6.78 |
| following hydration | 0.66 | 5.83 | 0.61 | 3.34 | — | 0.32 | 5.08 | 0.83 |

Quality Characteristics

1. Pineapple small (0-imperceptible, 10-intense)
2. Foreign small (0-imperceptible, 10-intense)
3. Hue—degree of brown (0-light, no brown hue, 10-brown)
4. Hardness (0-soft, 10-hard)
5. Brittleness (0-elastic, 10-brittle)
6. Pineapple taste (0-imperceptible, 10-intense)
7. Foreign taste (0-imperceptible, 10-intense)
8. General impression (0-low quality, 10-high quality)

TABLE 2d

Kiwi-a summary of average organoleptic ratings

| | Characteristics | | | | | | | |
|---|---|---|---|---|---|---|---|---|
| Kiwi | 1 | 2 | 3 | 4 | 5 | 6 | 7 | 8 |
| Fresh fruit Invention dried material | 7.96 | 0.25 | 5.05 | 3.06 | 3.42 | 8.26 | 0.48 | 8.39 |
| in a dry condition | 4.38 | 1.33 | 8.12 | 8.13 | 3.26 | 5.01 | 1.05 | 4.60 |
| following hydration | 3.50 | 2.14 | 6.70 | 0.71 | — | 2.57 | 2.49 | 2.60 |
| Air-flow dried fruit (not invention) | | | | | | | | |
| in a dry condition | 3.82 | 0.56 | 5.96 | 7.43 | 3.76 | 5.12 | 1.07 | 5.35 |
| following hydration | 3.55 | 1.73 | 4.77 | 1.03 | — | 2.87 | 1.63 | 3.59 |
| Freeze-dried material | | | | | | | | |
| in a dry condition | 4.30 | 0.83 | 0.35 | 4.79 | 8.37 | 6.35 | 0.76 | 6.50 |
| following hydration | 3.19 | 2.71 | 3.24 | 0.42 | — | 2.09 | 2.89 | 2.15 |

Quality Characteristics

1. Kiwi small (0-imperceptible, 10-intense)
2. Foreign small (0-imperceptible, 10-intense)
3. Hue—degree of brown (0-light, no brown hue, 10-brown)
4. Hardness (0-soft, 10-hard)
5. Brittleness (0-elastic, 10-brittle)
6. Kiwi taste (0-imperceptible, 10-intense)
7. Foreign taste (0-imperceptible, 10-intense)
8. General impression (0-low quality, 10-high quality)

TABLE 2e

Papaya-a summary of average organoleptic ratings

| | Characteristics | | | | | | | |
|---|---|---|---|---|---|---|---|---|
| | 1 | 2 | 3 | 4 | 5 | 6 | 7 | 8 |
| Fresh fruit Invention dried material | 5.96 | 1.27 | 1.43 | 1.88 | 2.62 | 7.02 | 1.37 | 6.14 |
| in a dry condition | 4.31 | 1.72 | 1.96 | 7.17 | 4.98 | 4.74 | 0.57 | 4.64 |
| following hydration | 5.00 | 1.39 | 2.00 | 1.51 | — | 2.49 | 1.44 | 2.67 |
| Air-flow dried fruit (not invention) | | | | | | | | |
| in a dry condition | 3.97 | 1.08 | 1.30 | 6.93 | 3.62 | 4.89 | 0.98 | 4.91 |
| following hydration | 3.40 | 2.31 | 1.36 | 1.81 | — | 2.20 | 1.93 | 2.09 |
| Freeze-dried material | | | | | | | | |
| in a dry condition | 2.33 | 3.49 | 0.047 | 3.92 | 8.81 | 5.21 | 1.29 | 5.90 |
| following hydration | 2.11 | 4.84 | 2.48 | 0.82 | — | 1.44 | 2.41 | 1.73 |

Quality Characteristics

1. Papaya small (0-imperceptible, 10-intense)
2. Foreign small (0-imperceptible, 10-intense)
3. Hue—degree of brown (0-light, no brown hue, 10-brown)
4. Hardness (0-soft, 10-hard)
5. Brittleness (0-elastic, 10-brittle)
6. Papaya taste (0-imperceptible, 10-intense)
7. Foreign taste (0-imperceptible, 10-intense)
8. General impression (0-low quality, 10-high quality)

TABLE 2f

Ginger-a summary of average organoleptic ratings

| | Characteristics | | | | |
|---|---|---|---|---|---|
| Ginger | 1 | 2 | 3 | 4 | 5 |
| Fresh fruit Invention dried material | 8.25 | 1.30 | 2.80 | 3.88 | 7.12 |
| in a dry condition | 8.50 | 0.58 | 8.10 | 8.40 | 6.44 |
| following hydration | 6.41 | 1.45 | 3.04 | — | 4.71 |
| Air-flow dried fruit (not invention) | | | | | |
| in a dry condition | 8.15 | 0.78 | 7.10 | 8.20 | 6.89 |
| following hydration | 6.55 | 1.53 | 2.60 | — | 4.55 |
| Freeze-dried material | | | | | |
| in a dry condition | 8.26 | 0.40 | 2.25 | 9.54 | 8.09 |
| following hydration | 6.21 | 1.49 | 2.38 | — | 4.53 |

Quality Characteristics

1. Ginger small (0-imperceptible, 10-intense)
2. Foreign small (0-imperceptible, 10-intense)
3. Hue—degree of brown (0-light, no brown hue, 10-brown)

4. Brittleness (0-elastic, 10-brittle)

5. General impression (0-low quality, 10-high quality)
Note: Because the ginger is spicy, the organoleptic ratings of ginger taste and foreign taste were not determined.

A numerical comparison of the level of chromatographic traces for volatile compounds produced by the above six fruits and tubers, and maracuja (passion fruit), in the temperature ranges indicated is shown in Table 3a. The data is given in integrated units per 100 g of tested material and per litre of air. The results are an average taken from three measurements. This analysis was performed on gas chromatography HP equipment with an FID sensor.

TABLE 3a

| Species of fruits | Material for testing | Integration units/100 g. of material/1 liter of air | | | | |
|---|---|---|---|---|---|---|
| | | up to 40° C. | 40–100° C. | 100–150° C. | 150–200° C. | Sum |
| Banana | Fresh fruit Invention dried material | 26748 | 829266 | 104988 | 1800 | 992803 |
| | dry | 5790 | 536595 | 30498 | 1604 | 575487 |
| | rehydrated | 32627 | 210881 | 37764 | 1882 | 283133 |
| | Air-flow dried fruit (not invention) | | | | | |
| | dry | 9651 | 166922 | 16646 | 1251 | 194470 |
| | rehydrated | 37002 | 169846 | 19130 | 2201 | 228179 |
| | Freeze-dried material | | | | | |
| | dry | 10791 | 175815 | 25596 | 1870 | 214072 |
| | rehydrated | 53361 | 194544 | 28346 | 2227 | 278478 |
| Mango | Fresh fruit Invention dried material | 30409 | 2187960 | 67388 | 11173 | 2297230 |
| | dry | 24853 | 1115610 | 38929 | 2612 | 1180031 |
| | rehydrated | 15652 | 486410 | 18351 | 17608 | 538021 |
| | Air-flow dried fruit (not invention) | | | | | |
| | dry | 10092 | 389620 | 18861 | 1214 | 419788 |
| | rehydrated | 20810 | 485008 | 21882 | 21427 | 549117 |
| | Freeze-dried material | | | | | |
| | dry | 11647 | 83841 | 19425 | 1329 | 11642 |
| | rehydrated | 221021 | 813584 | 17517 | 31151 | 1083544 |
| Pineapple | Fresh fruit Invention dried material | 2652388 | 1409435 | 13954 | 988 | 410??65 |
| | dry | 35784 | 266918 | 29059 | 962 | 332724 |
| | rehydrated | 37455 | 167733 | 12614 | 3404 | 221406 |
| | Air-flow dried fruit (not invention) | | | | | |
| | dry | 4324 | 77395 | 24119 | 1483 | 107321 |
| | rehydrated | — | — | — | — | — |
| | Freeze-dried material | | | | | |
| | dry | 12382 | 223756 | 49663 | 1875 | 287876 |
| | rehydrated | 845643 | 1225238 | 23128 | 23005 | 2117014 |
| Papaya | Fresh fruit Invention dried material | 44241 | 115873 | 9723 | 10568 | 180505 |
| | dry | 65224 | 1225642 | 117337 | 116037 | 1524240 |
| | rehydrated | 37984 | 236664 | 66855 | 27728 | 369231 |
| | Air-flow dried fruit (not invention) | | | | | |
| | dry | 91344 | 38998 | 26840 | 44398 | 552580 |
| | rehydrated | 20834 | 309857 | 22096 | 26266 | 37905 |
| | Freeze-dried material | | | | | |
| | dry | 210815 | 1292847 | 101984 | 188552 | 1794298 |
| | rehydrated | 40767 | 873458 | 71271 | 100297 | 1085793 |
| Kiwi | Fresh fruit Invention dried material | 25177 | 522458 | 78069 | 38821 | 664125 |
| | dry | 41937 | 838027 | 84701 | 48206 | 1012871 |
| | rehydrated | 20994 | 302139 | 85783 | 80773 | 490689 |
| | Air-flow dried fruit (not invention) | | | | | |
| | dry | 7166 | 133374 | 39127 | 31099 | 210766 |
| | rehydrated | 17637 | 190287 | 37391 | 16393 | 261708 |

TABLE 3a-continued

| Species of fruits | Material for testing | Integration units/100 g. of material/1 liter of air | | | | |
|---|---|---|---|---|---|---|
| | | up to 40° C. | 40–100° C. | 100–150° C. | 150–200° C. | Sum |
| | Freeze-dried material | | | | | |
| | dry | 65379 | 809322 | 172824 | 60241 | 110776 |
| | rehydrated | 33167 | 380260 | 98544 | 90943 | 602914 |
| Ginger | Fresh fruit | 81457 | 2868454 | 186263 | 143744 | 3279918 |
| | Invention dried material | | | | | |
| | dry | 35410 | 6415835 | 547090 | 130020 | 7128155 |
| | rehydrated | 22259 | 2382750 | 326543 | 87831 | 2821383 |
| | Air-flow dried fruit (not invention) | | | | | |
| | dry | 35797 | 981063 | 83339 | 74943 | 1175142 |
| | rehydrated | 25714 | 1424850 | 160946 | 18462 | 1629972 |
| | Freeze-dried material | | | | | |
| | dry | 38034 | 1753864 | 203369 | 161739 | 2157006 |
| | rehydrated | 28157 | 1551262 | 190494 | 72531 | 1842444 |
| Maraouja | Fresh fruit | 60421 | 4039152 | 126841 | 29330 | 4255744 |
| | Invention dried material | | | | | |
| | dry | 30273 | 908475 | 83137 | 22088 | 1043973 |
| | rehydrated | 8543 | 104654 | 38850 | 21001 | 171048 |
| | Air-flow dried fruit (not invention) | | | | | |
| | dry | 29449 | 155702 | 40386 | 27165 | 252702 |
| | rehydrated | 11751 | 144101 | 38612 | 9248 | 202712 |
| | Freeze-dried material | | | | | |
| | dry | 60623 | 1580407 | 138764 | 69129 | 1828923 |
| | rehydrated | 94142 | 1325725 | 91805 | 39018 | 1550690 |

Another numerical comparison of the level of chromatographic traces for volatile compounds produced by the same materials is shown in Table 3b. The data in integration units per 100 g of tested material per litre of air passed through has been recalculated in terms of 100 g of dry mass of the tested material. The results are averages for three measurements.

TABLE 3b

| Species of fruits | Material for testing | Integration units/100 g. of material/1 liter of air | | | | |
|---|---|---|---|---|---|---|
| | | up to 40° C. | 40–100° C. | 100–150° C. | 150–200° C. | Sum |
| Banana | Fresh fruit | 106731 | 3492957 | 426781 | 7316 | 4035765 |
| | Invention dried material | | | | | |
| | dry | 7320 | 576477 | 32879 | 1729 | 620405 |
| | rehydrated | 315236 | 2037302 | 364869 | 18179 | 2735586 |
| | Air-flow dried fruit (not invention) | | | | | |
| | dry | 10210 | 176599 | 17611 | 1324 | 205744 |
| | rehydrated | 227563 | 1044564 | 117650 | 13539 | 1403316 |
| | Freeze-dried material | | | | | |
| | dry | 11086 | 180619 | 26295 | 1921 | 219921 |
| | rehydrated | 340312 | 1240714 | 180777 | 14202 | 1776005 |
| Mango | Fresh fruit | 160896 | 11576507 | 358551 | 60703 | 12154657 |
| | Invention dried material | | | | | |
| | dry | 26678 | 1197552 | 39641 | 2801 | 1266675 |
| | rehydrated | 178273 | 5539982 | 309008 | 200544 | 6127807 |
| | Air-flow dried fruit (not invention) | | | | | |
| | dry | — | 415861 | 70131 | 1296 | 448060 |
| | rehydrated | 305898 | 7132463 | 321795 | 315097 | 8075253 |
| | Freeze-dried material | | | | | |
| | dry | 12242 | 88124 | 20417 | 1397 | 122180 |
| | rehydrated | 3139509 | 11560122 | 248822 | 442190 | 15391243 |

TABLE 3b-continued

| Species of fruits | Material for testing | Integration units/100 g. of material/1 liter of air | | | | |
|---|---|---|---|---|---|---|
| | | up to 40° C. | 40–100° C. | 100–150° C. | 150–200° C. | Sum |
| Pineapple | Fresh fruit | 20402988 | 10841808 | 338105 | 7596 | 31590497 |
| | Invention dried material | | | | | |
| | dry | 38239 | 285230 | 31053 | 1028 | 355550 |
| | rehydrated | 682321 | 3100427 | 236853 | 62928 | 4092529 |
| | Air-flow dried fruit (not invention) | | | | | |
| | dry | 4548 | 81418 | 25373 | 1560 | 112899 |
| | rehydrated | 522149 | 4240161 | 369343 | 388692 | 5520345 |
| | Freeze-dried material | | | | | |
| | dry | 13086 | 236478 | 52698 | 1982 | 304244 |
| | rehydrated | 15047029 | 21801390 | 411524 | 409343 | 37669292 |
| Papaya | Fresh fruit | 456560 | 1195797 | 100342 | 110098 | 1862797 |
| | Invention dried material | | | | | |
| | dry | 70627 | 1327170 | 127057 | 125649 | 1650503 |
| | rehydrated | 703408 | 4382660 | 1238057 | 513475 | 6387600 |
| | Air-flow dried fruit (not invention) | | | | | |
| | dry | 97704 | 417154 | 28709 | 47490 | 591057 |
| | rehydrated | 481145 | 7156053 | 510350 | 606602 | 8754150 |
| | Freeze-dried material | | | | | |
| | dry | 222028 | 1361608 | 107408 | 198685 | 1889729 |
| | rehydrated | 779481 | 15700926 | 1362733 | 1717725 | 20760885 |
| Kiwi | Fresh fruit | 118287 | 2360859 | 355488 | 166386 | 3001020 |
| | Invention dried material | | | | | |
| | dry | 45415 | 907544 | 91727 | 62205 | 1096891 |
| | rehydrated | 168626 | 2426819 | 697051 | 648776 | 3941274 |
| | Air-flow dried fruit (not invention) | | | | | |
| | dry | 7635 | 142099 | 41686 | 33133 | 224553 |
| | rehydrated | 158321 | 1708139 | 335644 | 147158 | 2349262 |
| | Freeze-dried material | | | | | |
| | dry | 67800 | 839284 | 179223 | 62471 | 1148778 |
| | rehydrated | 270093 | 3096582 | 802476 | 740576 | 4909727 |
| Ginger | Fresh fruit | 276031 | 9720277 | 631185 | 487101 | 11114594 |
| | Invention dried material | | | | | |
| | dry | 37479 | 6790489 | 579053 | 137616 | 7544617 |
| | rehydrated | 108582 | 11623169 | 1602646 | 428442 | 13762839 |
| | Air-flow dried fruit (not invention) | | | | | |
| | dry | 38434 | 1053320 | 89477 | 80463 | 1261694 |
| | rehydrated | 133370 | 7390301 | 834784 | 95757 | 8454212 |
| | Freeze-dried material | | | | | |
| | dry | 39365 | 1815219 | 210483 | 167397 | 2232464 |
| | rehydrated | 165436 | 9114347 | 1119234 | 426153 | 10825170 |
| Maraouja | Fresh fruit | 273027 | 18251931 | 573165 | 132533 | 19230656 |
| | Invention dried material | | | | | |
| | dry | 32863 | 986186 | 90248 | 23977 | 1133274 |
| | rehydrated | 46454 | 565394 | 199082 | 113460 | 924390 |
| | Air-flow dried fruit (not invention) | | | | | |
| | dry | 31067 | 164260 | 42606 | 28658 | 266591 |
| | rehydrated | 59197 | 725948 | 189479 | 46590 | 1021214 |
| | Freeze-dried material | | | | | |
| | dry | 63975 | 1646694 | 146438 | 72951 | 1930058 |
| | rehydrated | 383627 | 5402303 | 374101 | 158997 | 6319028 |

Gas chromatographic (GC) traces illustrated in FIGS. 8 to 11 were prepared of banana slices prior to and after drying using the three drying processes discussed with reference to Table 1. Gas chromatographic traces illustrated in FIGS. 12 to 14 were also prepared of the banana slices after they had been subsequently rehydrated. The gas chromatographic traces were prepared on a HP gas chromatograph with an FID sensor in the range of temperature from room temperature up to 200° C. The time period of each test for preparing the corresponding trace is plotted on the x-axis in units of minutes. During the test period the temperature of the sample slices were raised in a controlled manner from room temperature to 200° C. The y-axis is a measure of the chromatographic response measured by the gas chromatograph. The scale of this response is in machine units, and the scale is adjusted for each test to accommodate the most prominent peak measured. The numbers associated with the peaks in the traces are the retention times in minutes for the release of the respective volatile compounds. These retention times in conjunction with the temperature profile used for the tests make it possible to associate each peak unambiguously with a specific molecular volatile compound.

Figure 8:
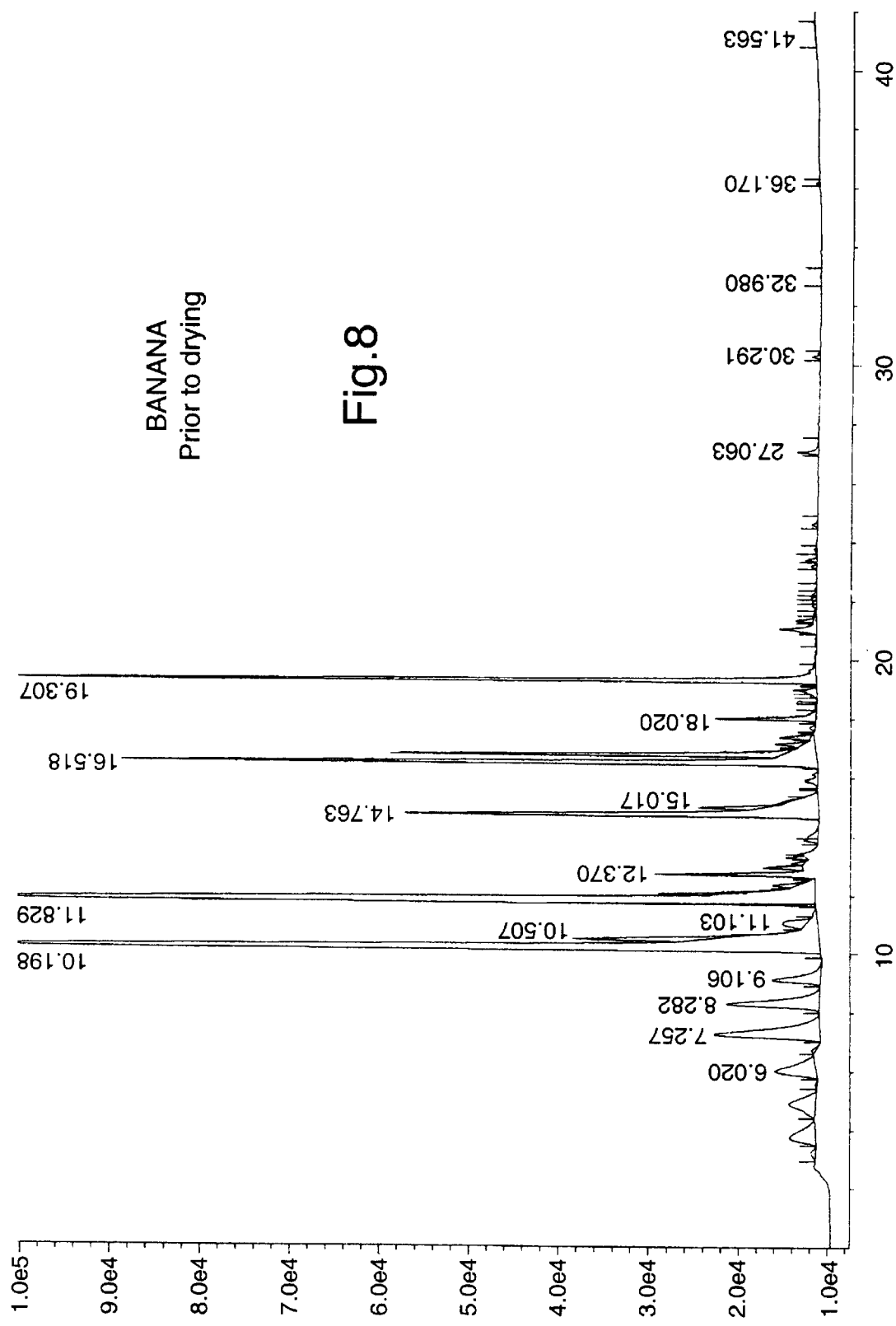
Figure 9:
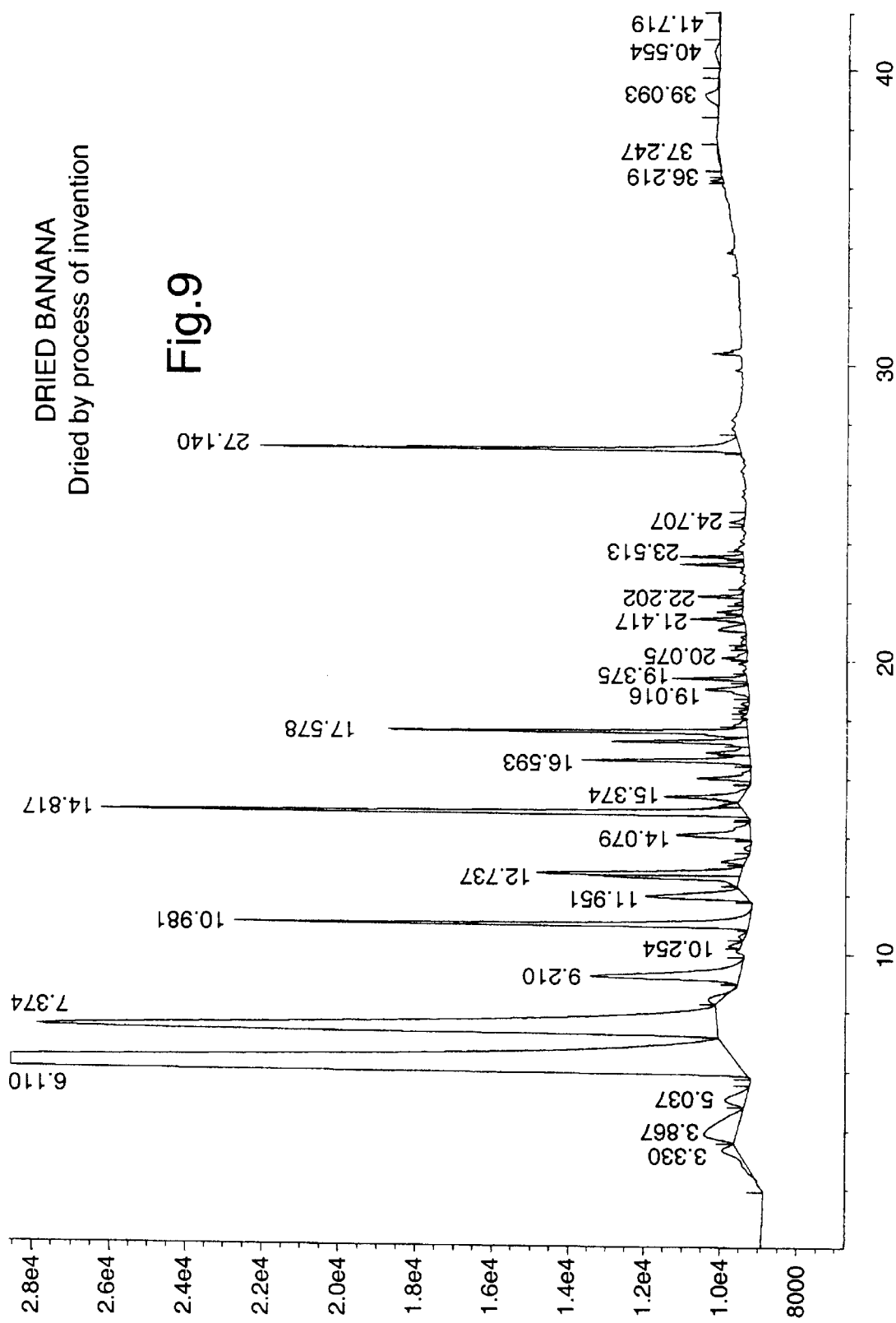
Figure 10:
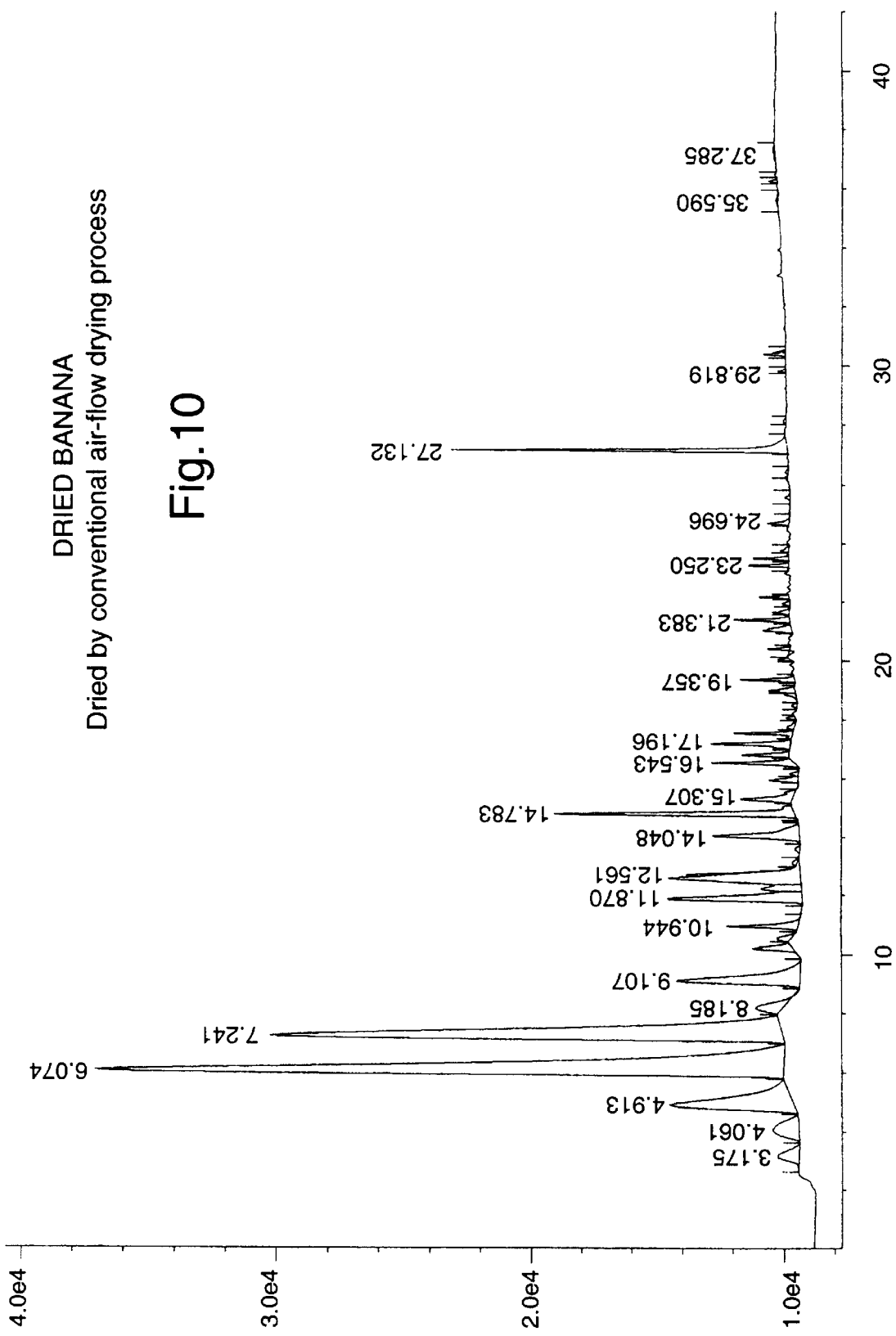
Figure 11:
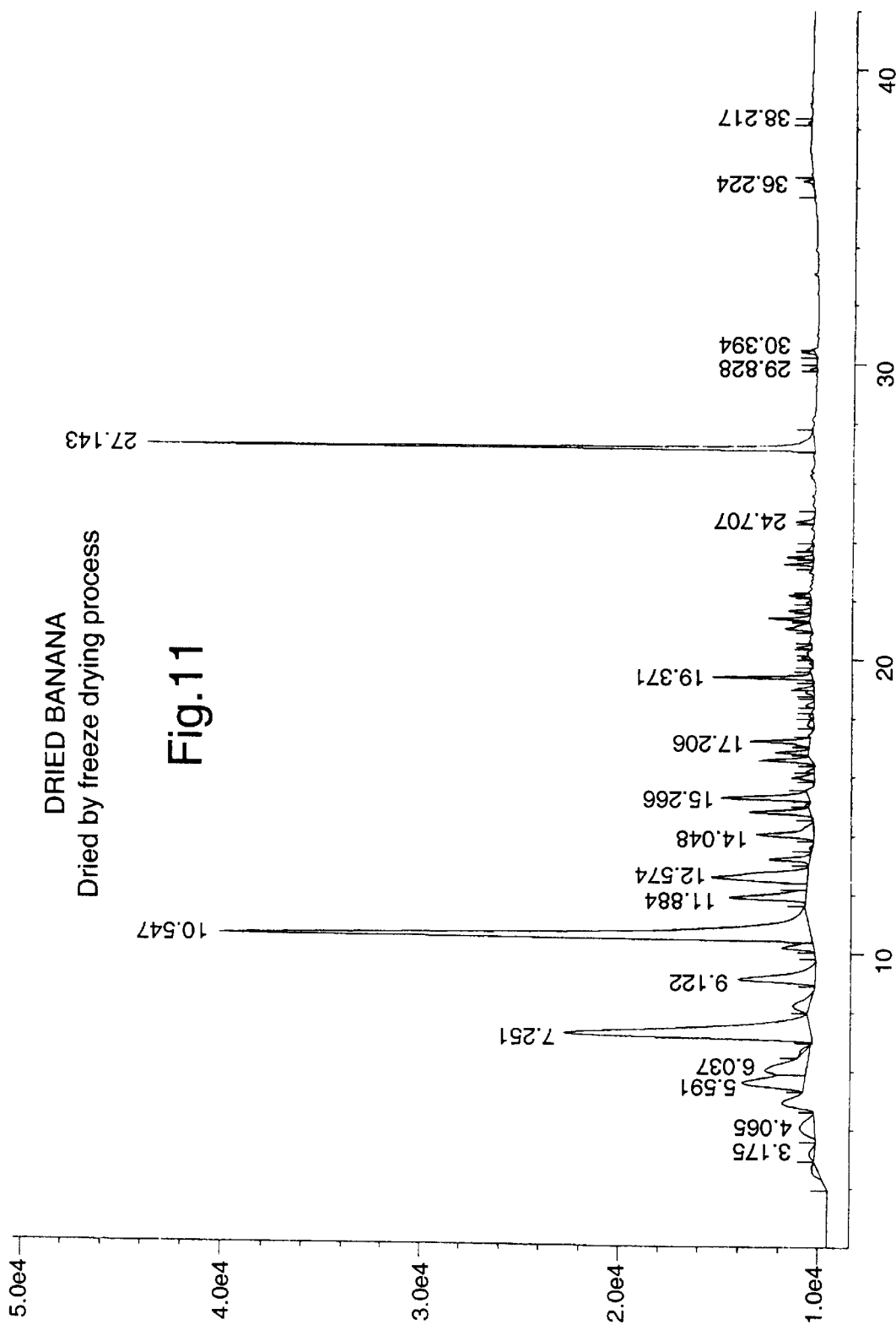
Figure 12:
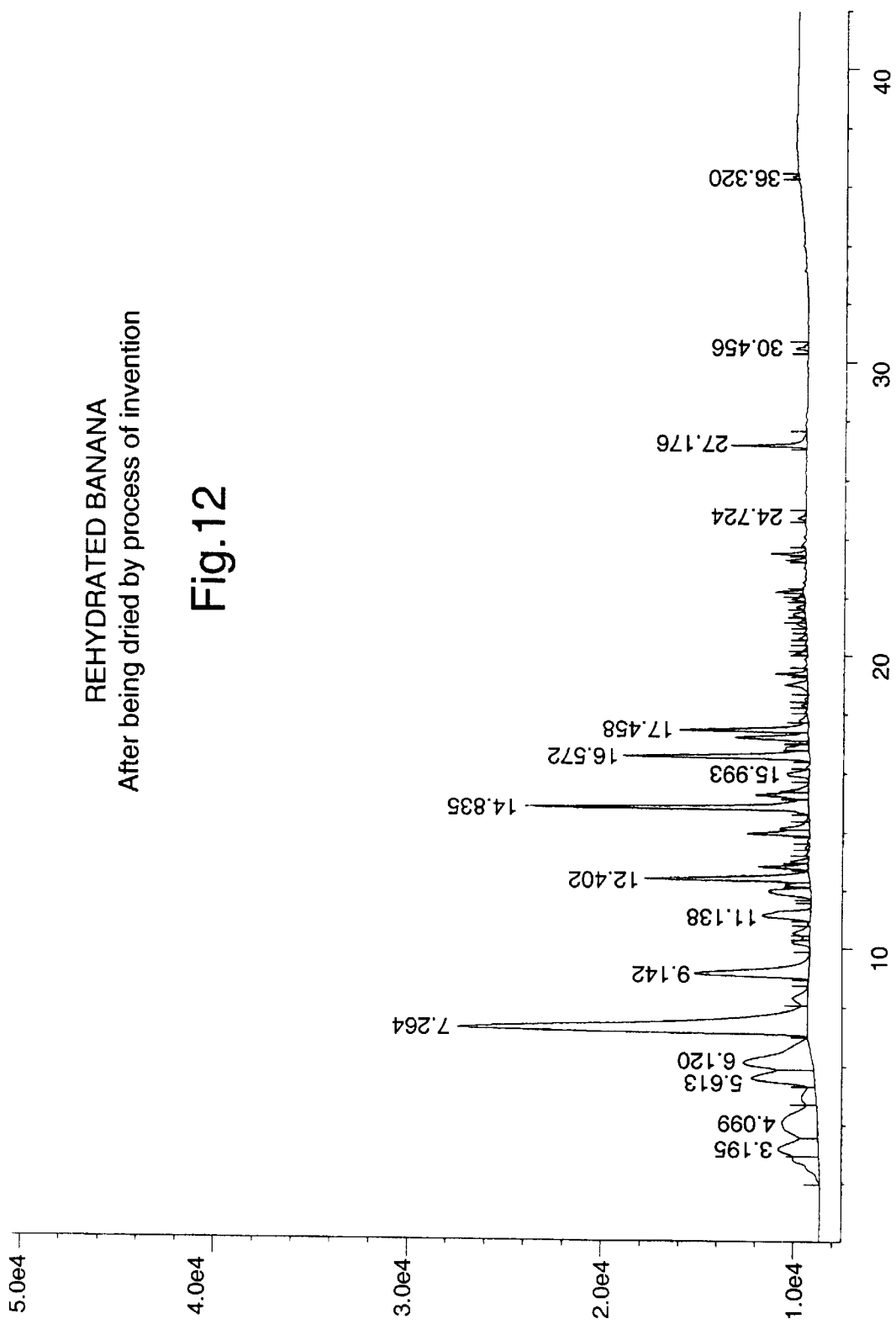
Figure 13:
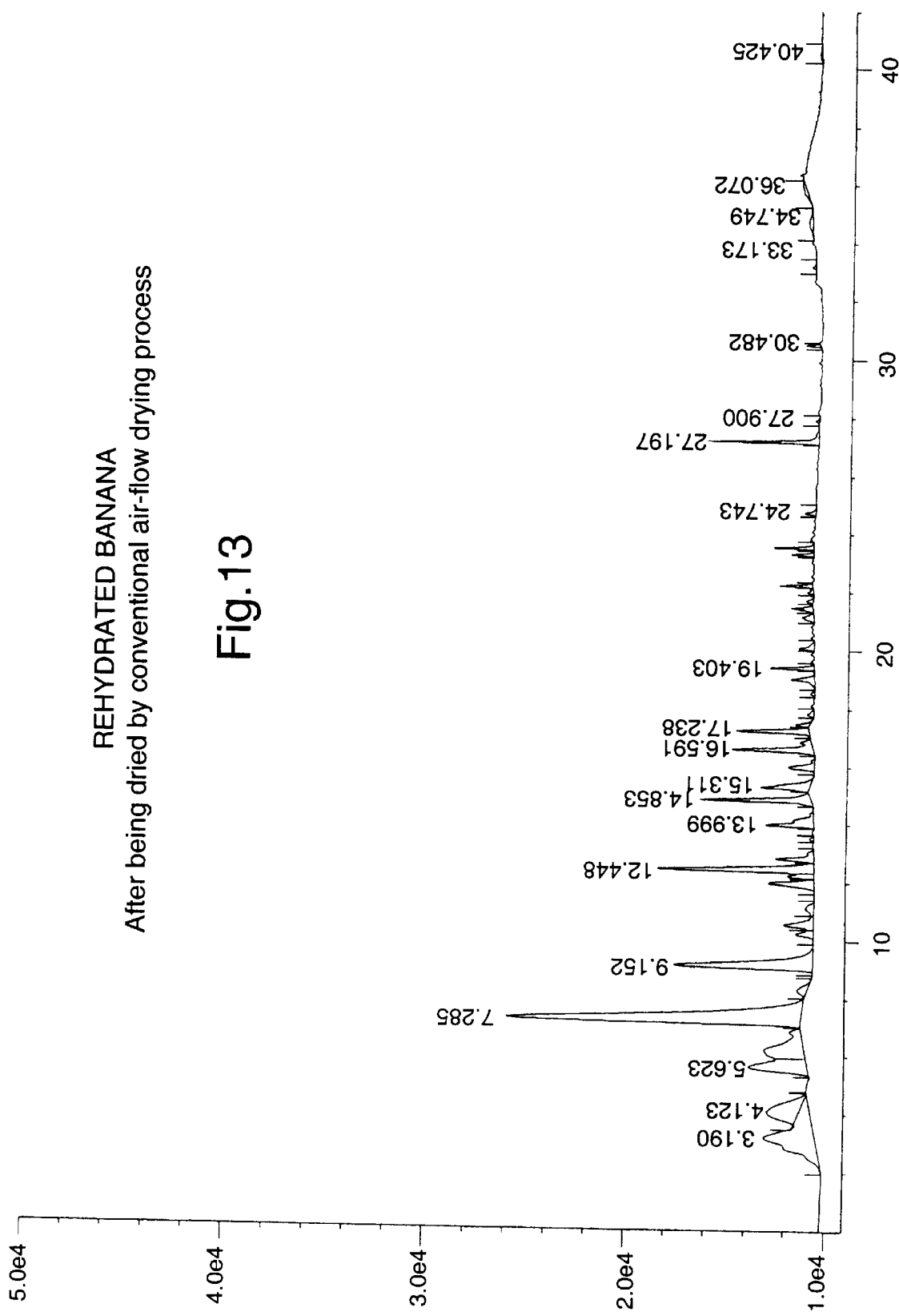
Figure 14:
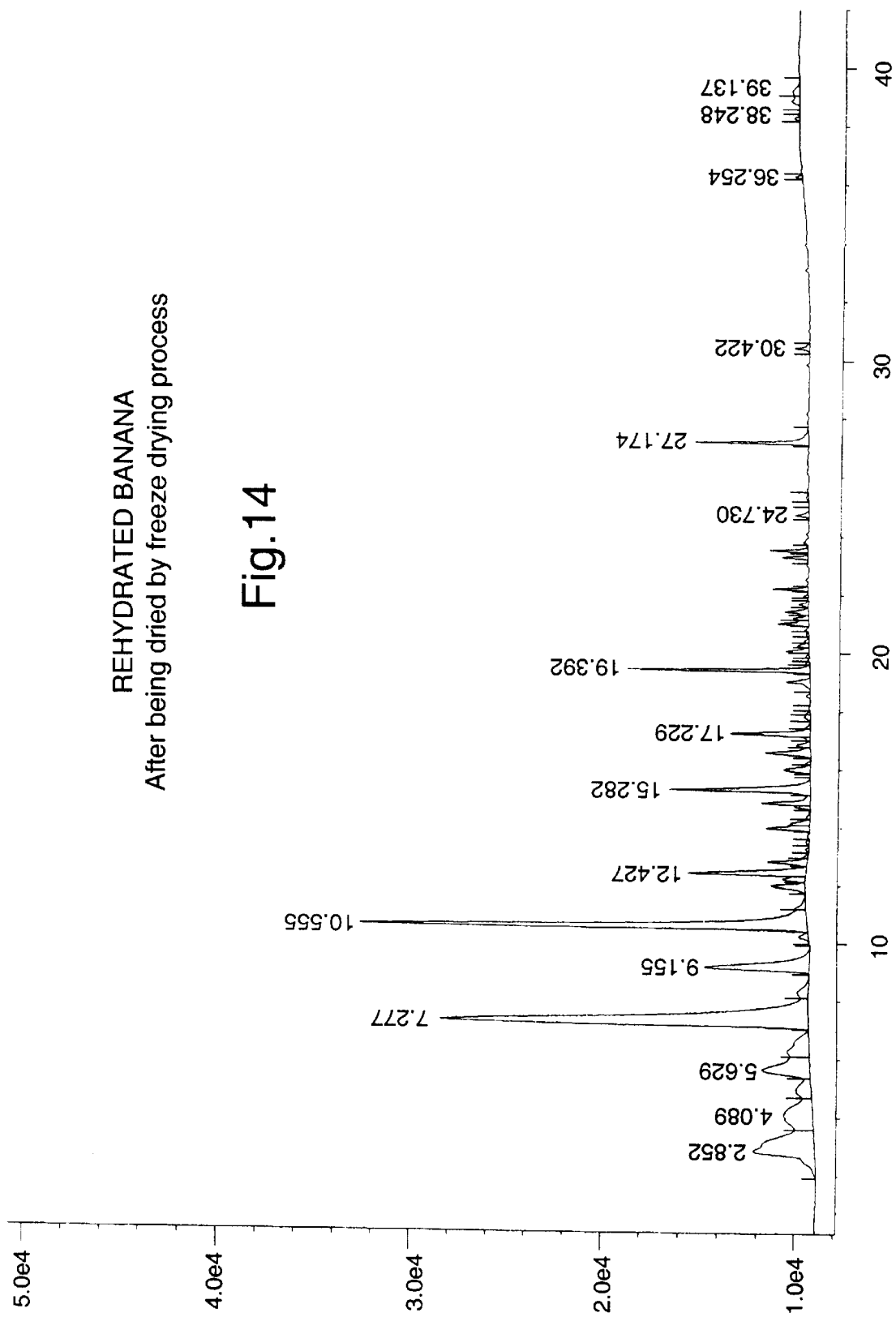

FIG. 8 illustrates the gas chromatographic trace for a banana slice prior to dehydration. FIG. 9 illustrates the gas chromatographic trace for a banana slice having been dried by the four phase process according to the invention. FIG. 10 illustrates the gas chromatographic trace for a banana slice which has been dried by the conventional air-flow process. FIG. 11 illustrates the gas chromatographic trace for a banana slice which has been dried by the freeze drying process. FIG. 12 illustrates the gas chromatic trace of a banana slice which has been rehydrated after having been dried by the four phase process according to the invention. FIG. 13 illustrates the gas chromatographic trace for a banana slice which has been rehydrated after having been dried by the conventional air-flow drying process. FIG. 14 illustrates the gas chromatographic trace for a banana slice which has been rehydrated after having been dried by the freeze drying process.

The flavour and bouquet or characteristic aroma of foods eaten in their raw state are dominated by volatile compounds which are eluted, namely, liberated or activated at temperatures up to 40° C., in other words, up to normal body temperature. Accordingly, the similarity between the elution chromatographic signature of a fresh fruit or vegetable, in other words, a fruit or vegetable which has not been dried, and the dried product is a strong indication of how well the fresh fruit taste and aroma is retained during a drying process. A comparison between the gas chromatographic trace of FIG. 8, namely, the trace of the fresh banana with the gas chromatographic trace of FIG. 9 of the banana dried by the process of the invention illustrates that the banana dried by the process according to the invention retains substantially all of the compounds which are eluted at temperatures of up to 40° C. Furthermore, it can be seen from the trace of FIG. 12 that the rehydrated banana which had been dried by the process according to the invention also retains substantially all of the compounds which are eluted at temperatures up to 40° C. On the other hand, a comparison of the traces of FIGS. 10 and 11 which illustrate the traces of the banana which had been dried by the conventional air-flow drying process and the freeze-drying process, respectively, and the trace of FIG. 8, shows that after conventional air-flow drying and freeze-drying a significant number of the compounds which are eluted at temperatures of up to 40° C. which were present in the banana prior to being dried are absent in the product after drying. Similarly, a comparison between the trace of FIG. 8, and FIGS. 13 and 14 which illustrate the banana having been rehydrated after conventional air-flow drying and freeze drying, respectively, shows a somewhat similar result to that of the comparison of the traces of FIG. 8 on the one hand, and FIGS. 10 and 11 on the other hand.

Additionally, it can be seen from the trace of FIG. 9 that the dried banana which was dried by the process according to the invention has prominent gas chromatographic peaks at 6.110 and 7.374 minutes retention times.

The main fraction of volatile compounds were compounds evaporating in the range of temperatures of 40° C. to 100° C. In the fresh fruits, this fraction contained predominantly: butanoic acid methyl ester (RT=7.3); an unidentified compound with RT=10.2; butanoic acid propyl ester (RT= 11.9); 2-methyl butanol and/or 3-methyl butanol (RT=14.8); ethanoic acid hexil ester (RT=16.5). Nexanol (RT=19.3) was the main constituent of the 100° C. to 150° C. fraction. In the dried banana which were dried by all three drying processes, the main constituents of the 40° C. to 100° C. fraction were: ethanol (RT=6.1); butanoic acid methyl ester and 2-methyl butanol and/or 3-methyl butanol. In the dried banana which was dried by the drying process of the invention the main components of the above mentioned fraction were a compound with RT=11.0 (probably isobutanoic acid isobutyl ester) and an unidentified compound with RT=17.6. In the dried banana which was dried by the freeze-drying process, in the 40° C. to 100° C. fraction butanoic acid methyl ester (RT=7.3) and an unidentified compound with RT=10.5 dominated. Following rehydration of the banana which had been dried by all three drying processes, a drop in the level of ethanol in the aroma was detected, the dominating compound was still the butanoic acid methyl ester (RT=7.3). Overall, the proportion of the low-boiling fraction (up to 40° C.) rose in the aroma of both the rehydrated banana which had been both dried by the process according to the invention and the freeze-drying process.

Figure 15:
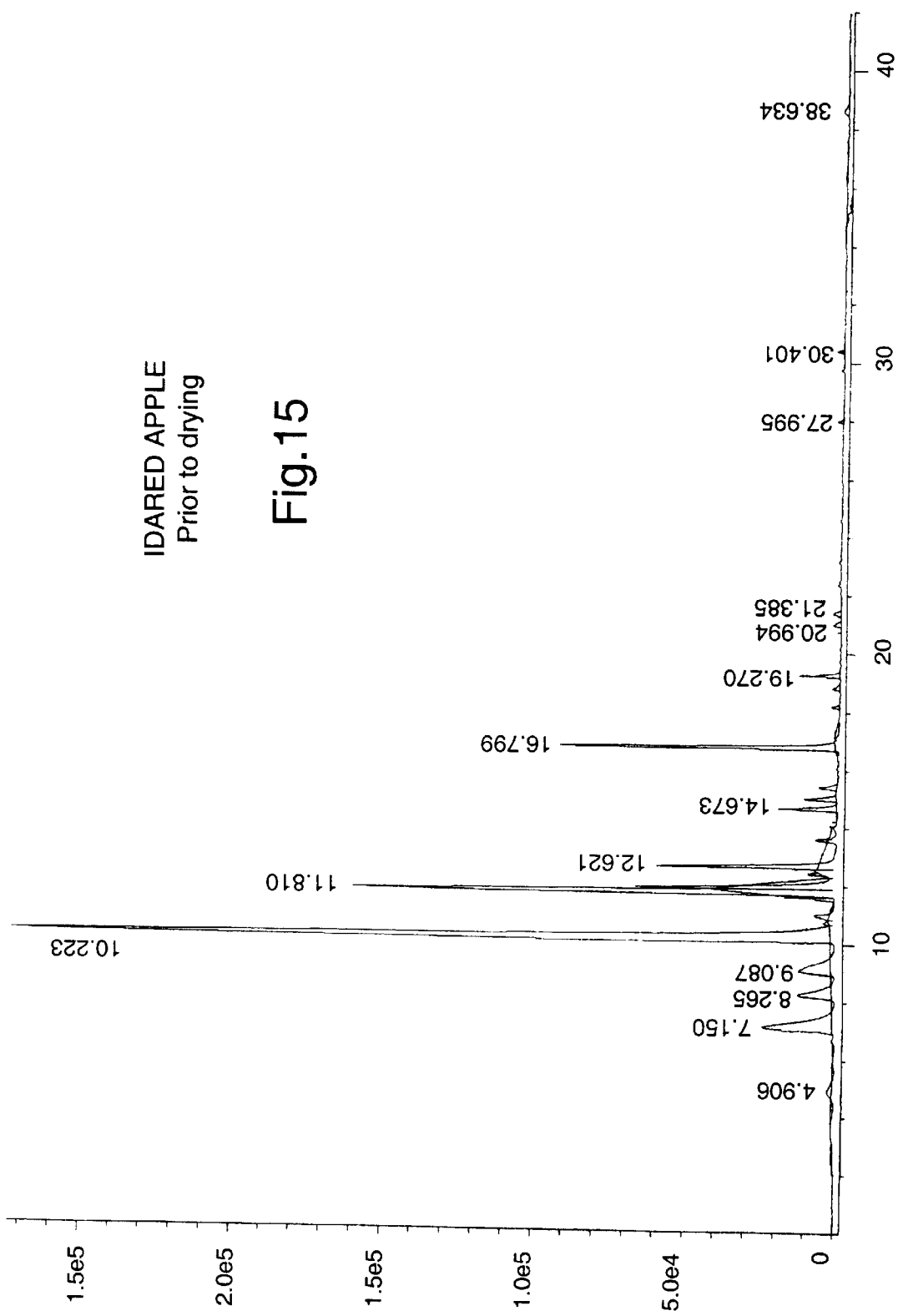
Figure 16:
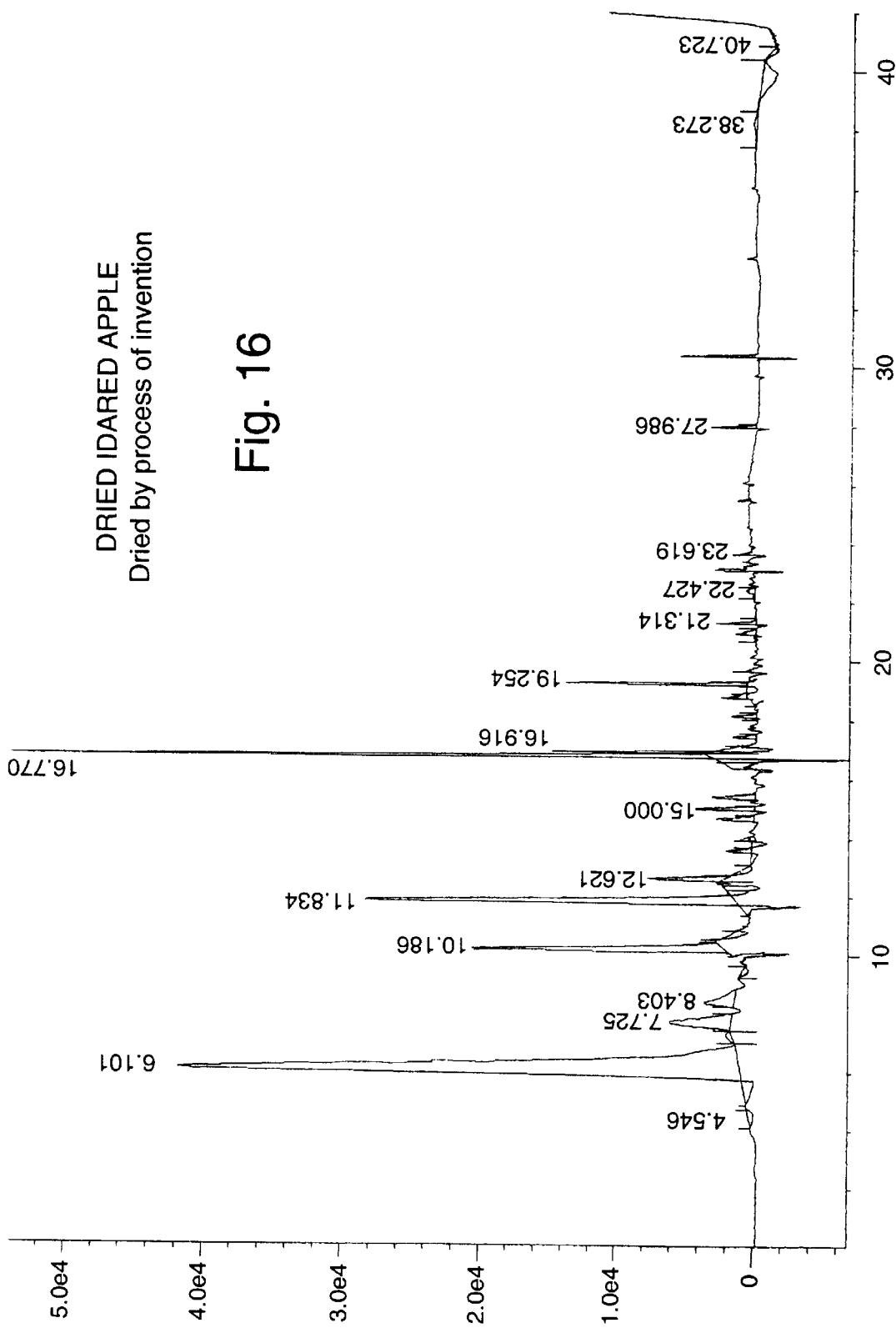
Figure 17:
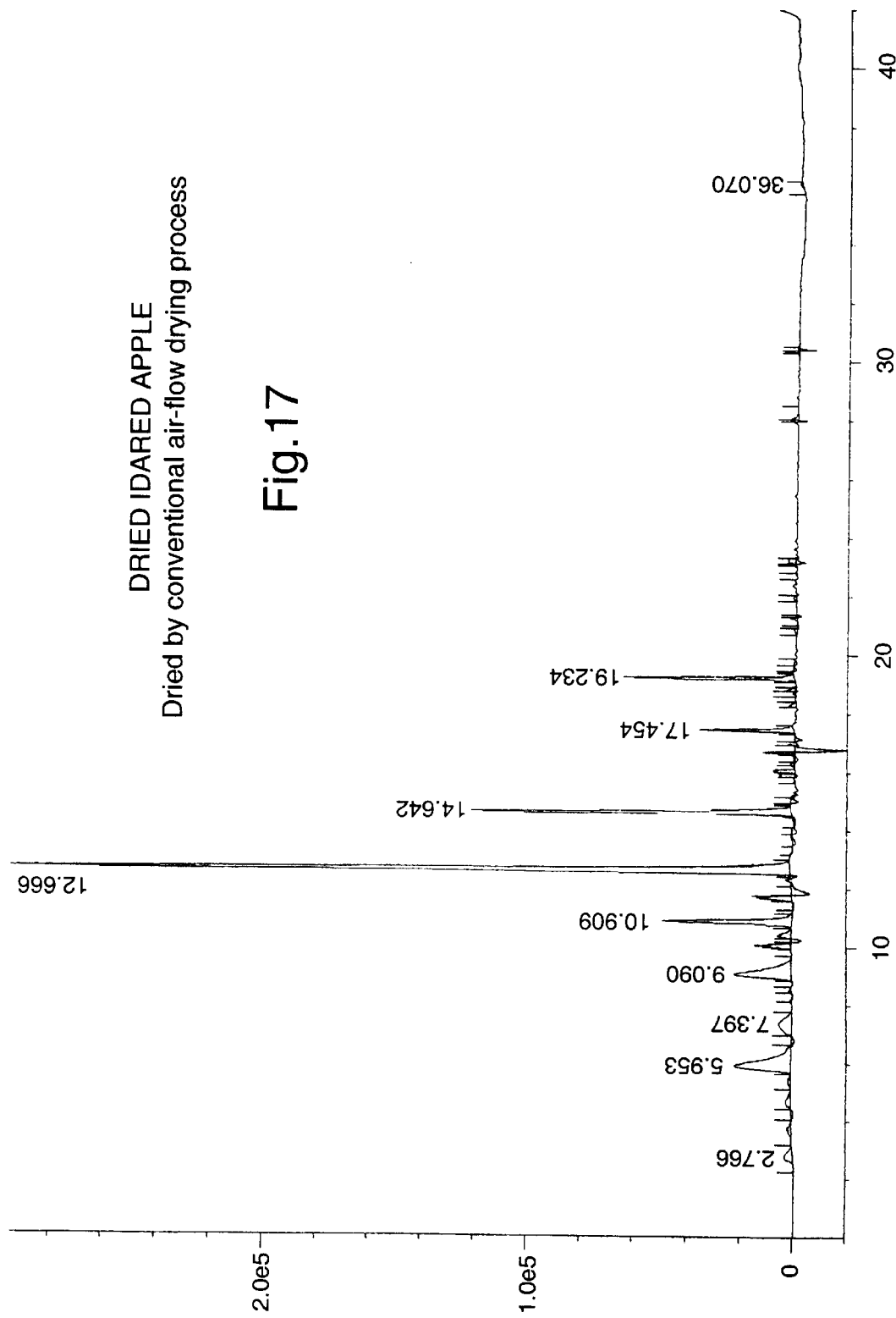
Figure 18:
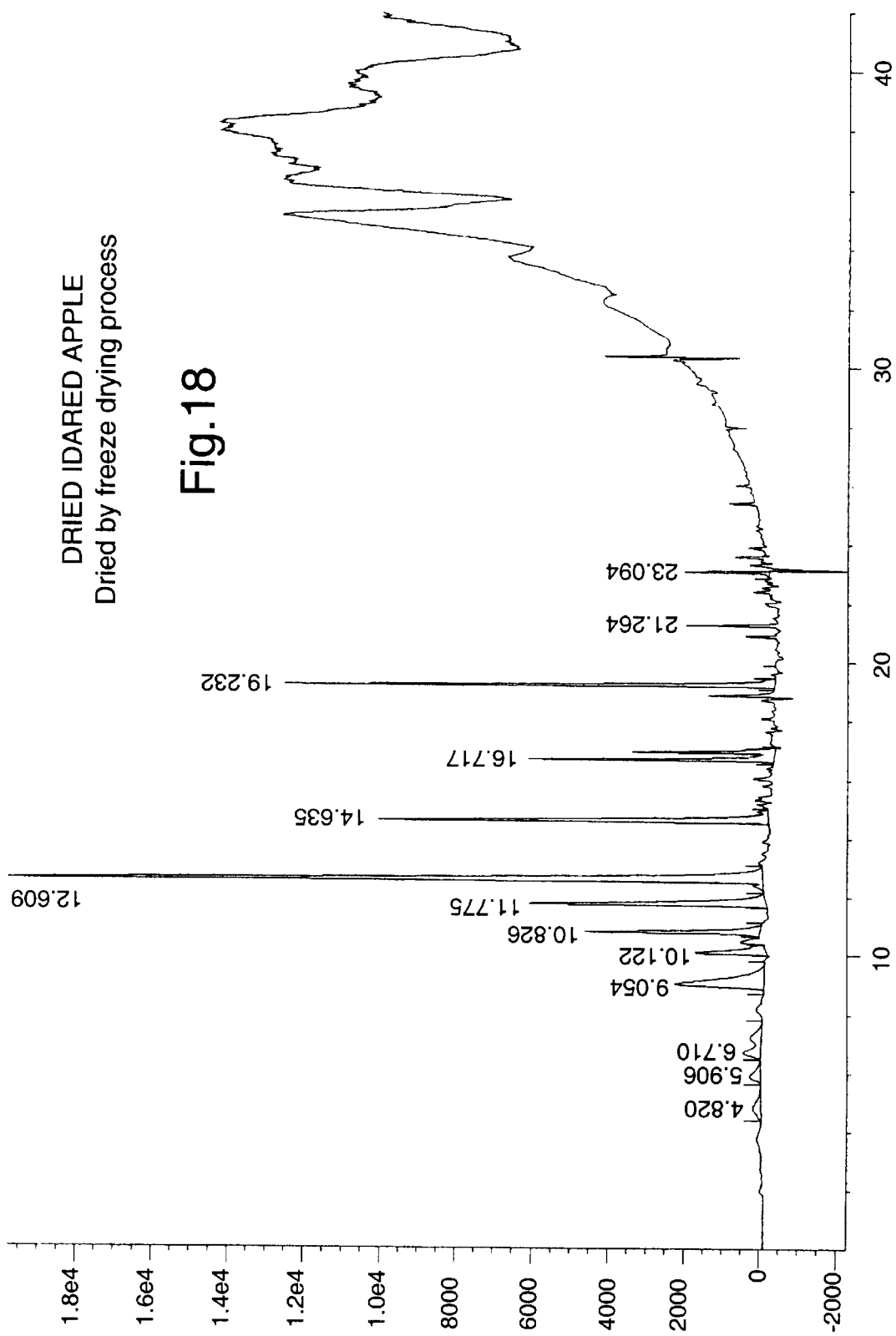

FIGS. 15 to 18 illustrate gas chromatographic traces of the IDARED apple slices which were prepared in similar fashion to those of FIGS. 8 to 11. FIG. 15 is a gas chromatographic trace of an apple slice prior to being dried. FIG. 16 is a gas chromatographic trace of an apple slice having been dried by the four phase process according tothe invention. FIG. 17 is a gas chromatographic trace of an apple slice having been dried by the conventional air-flow drying process, and FIG. 18 is a gas chromatographic trace of an apple slice having been dried by the freeze-drying process. A comparison between the four traces of FIGS. 15 to 18 indicate that as in the case of the banana slices, the apple which was dried by the process according to the invention retains a substantial amount of the volatile compounds which are eluted at temperatures up to 40° C., while the apples which were conventionally air-flow dried and freeze-dried do not retain the same amount of such compounds. However, a significant feature which can be seen by a comparison between the traces of FIGS. 15 and 18 is the fact that the apple which was dried by the freeze-drying process shows the development of significant peaks in the higher temperature range, in other words, temperature ranges towards 200° C. which, in general, tend to be associated with the development of off tastes. Such peaks are not present in the trace of the apple dried by the process according to the invention.

It can also be seen from the trace of FIG. 16 that the apple dried by the process according to the invention has prominent gas chromatographic peaks at 6.101, 10.186 and 11.834 minutes retention times.

Figure 19:
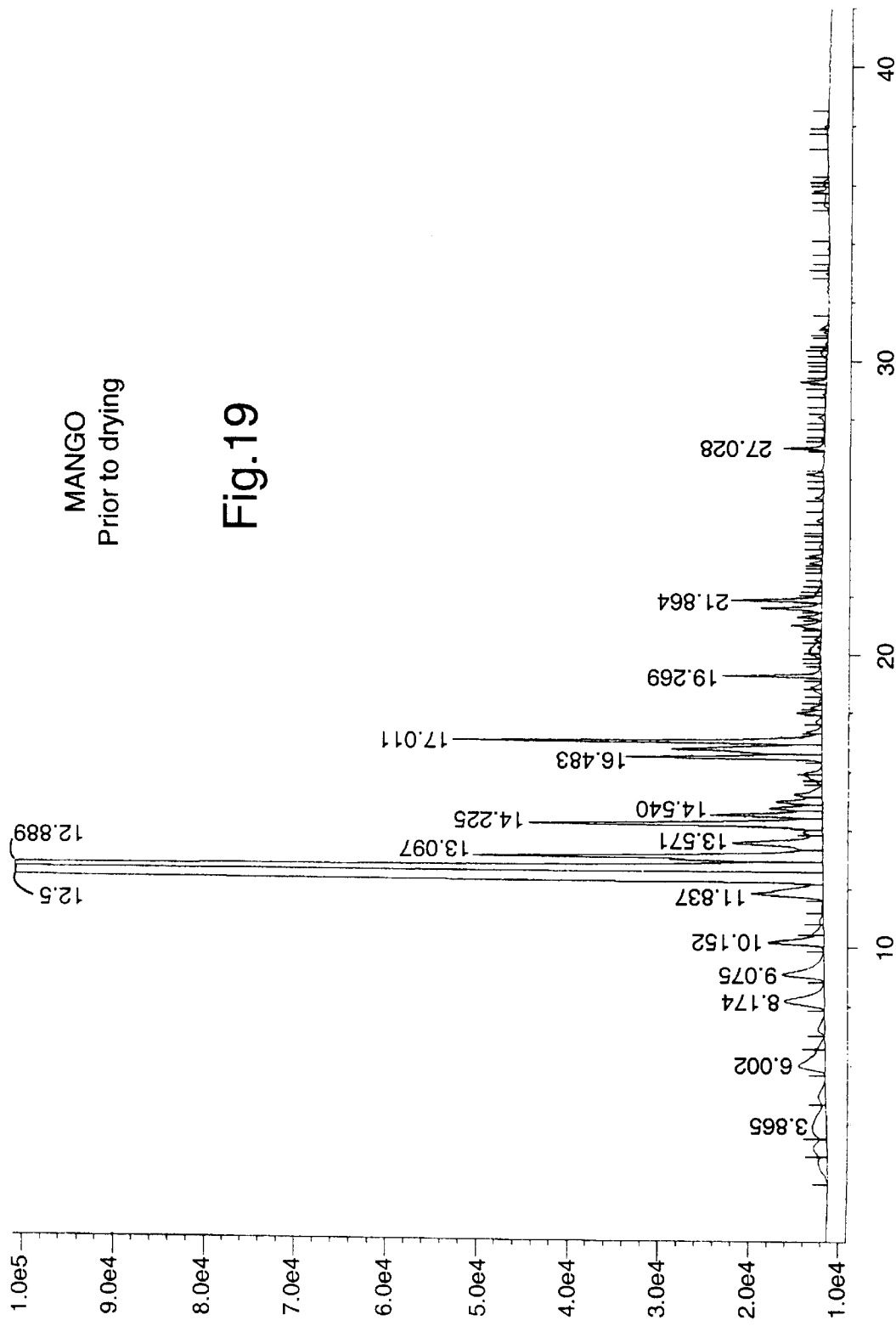
Figure 20:
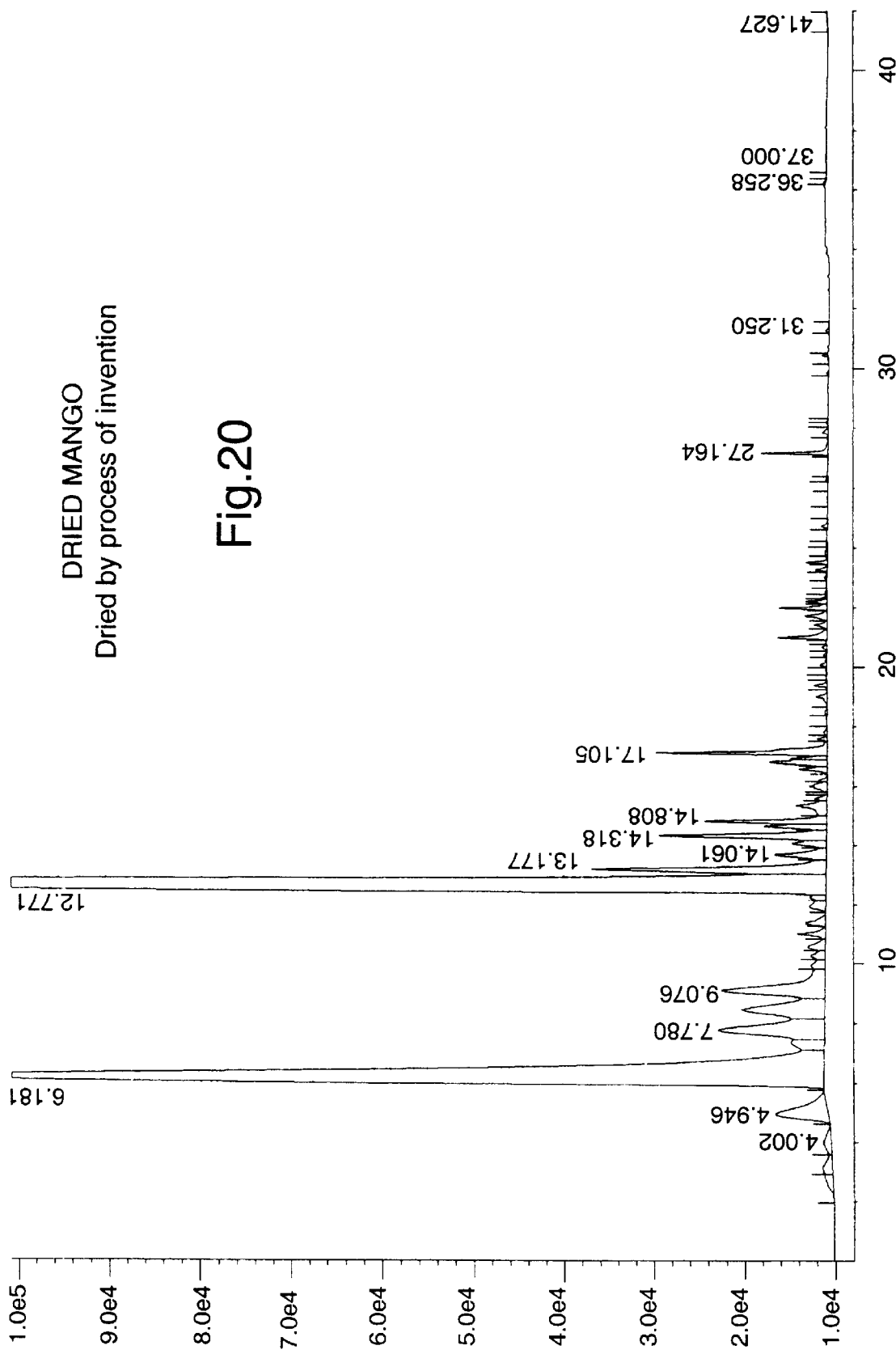
Figure 21:
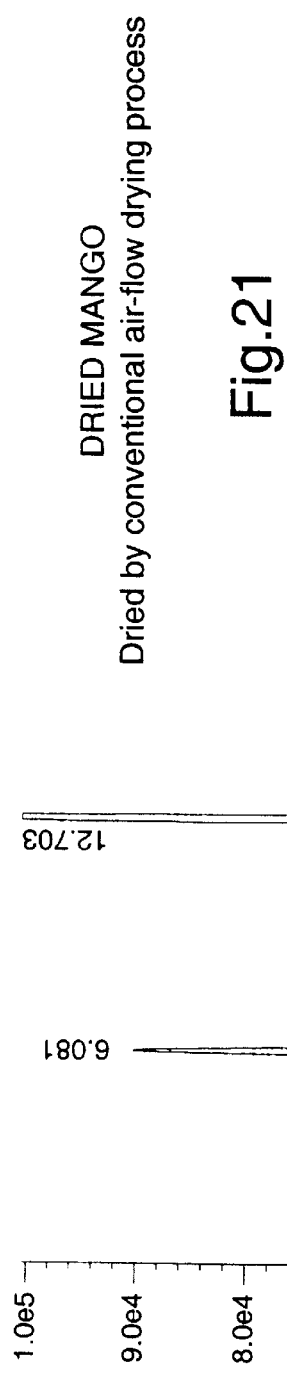
Figure 22:
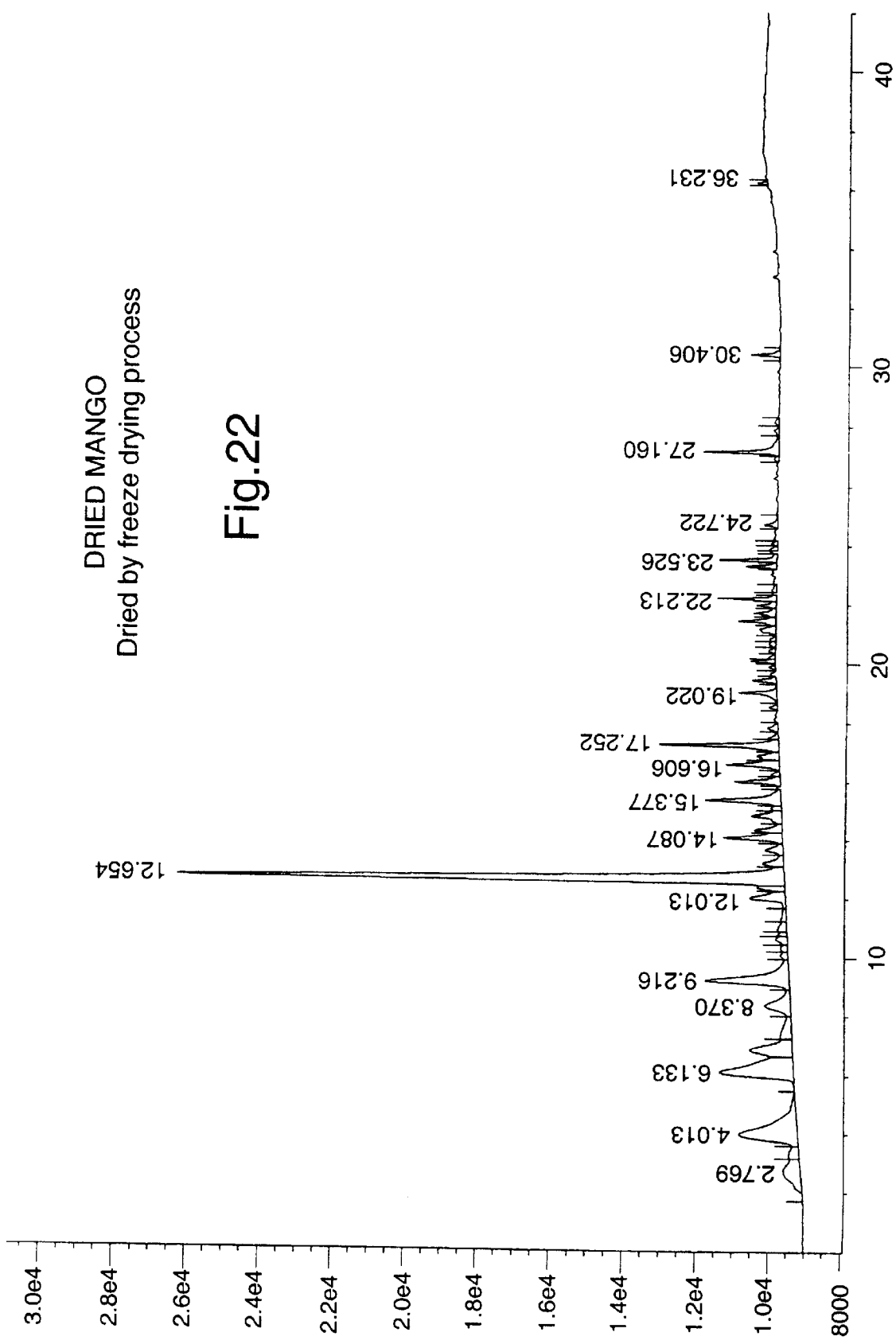
Figure 23:
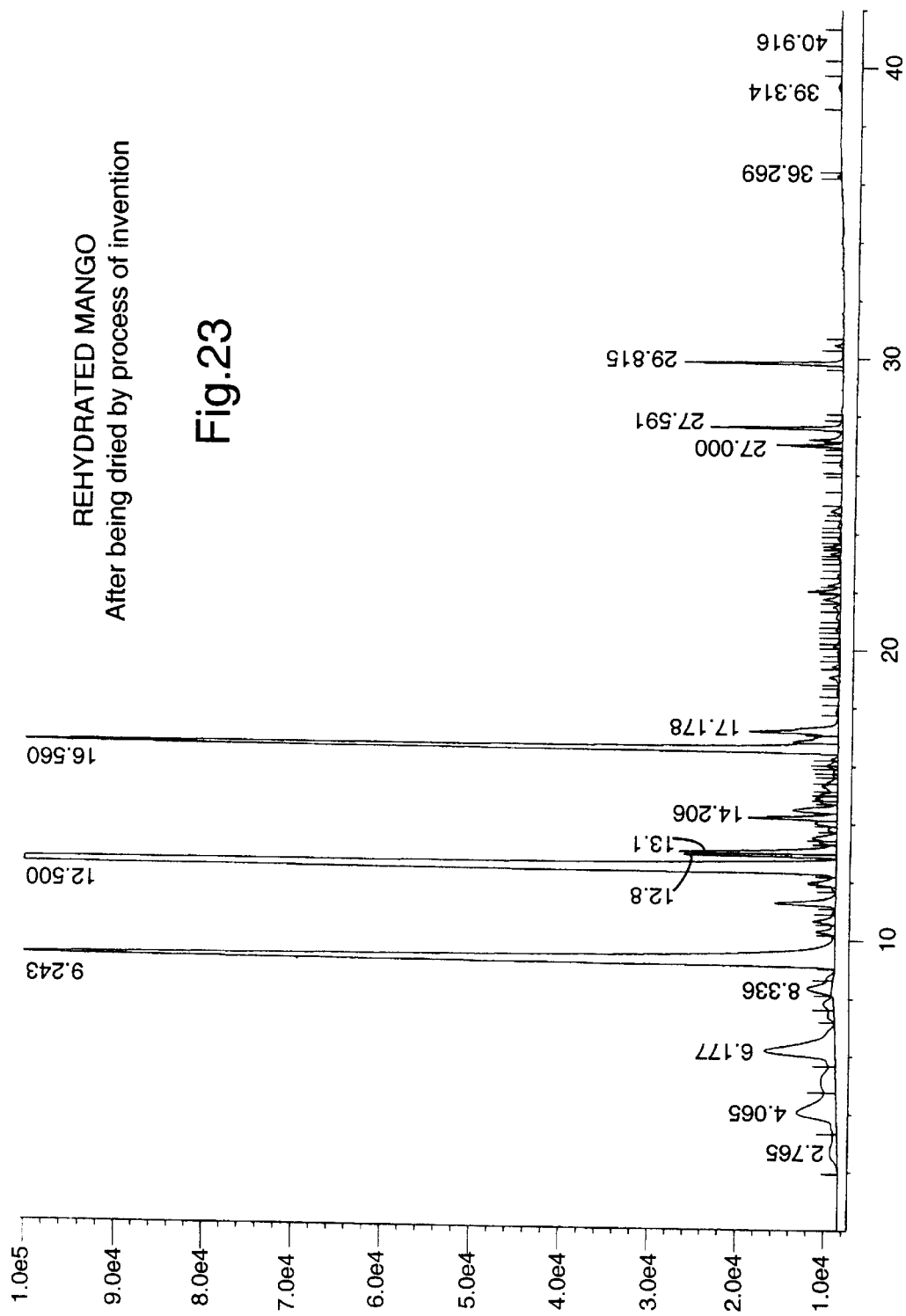
Figure 24:
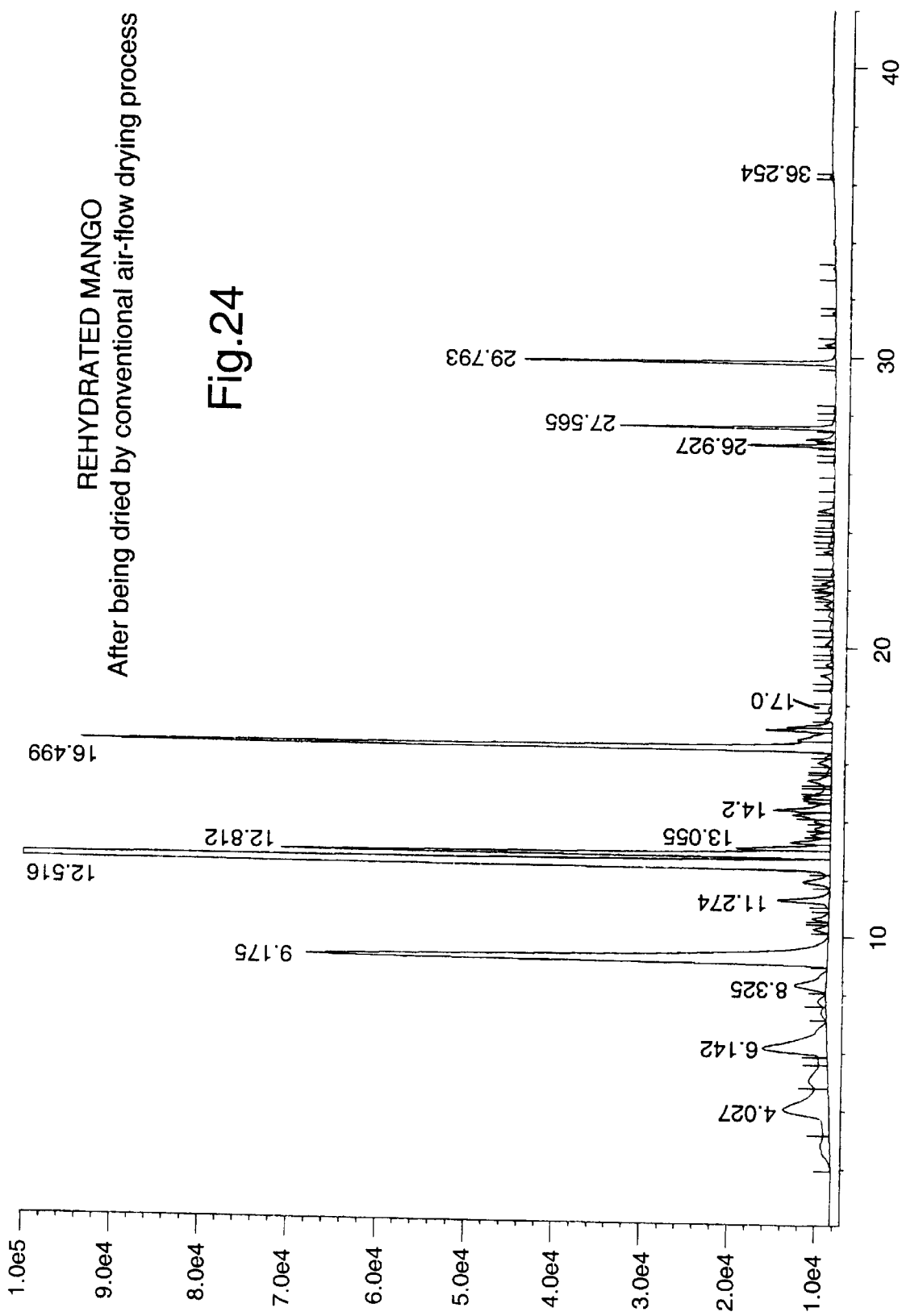
Figure 25:
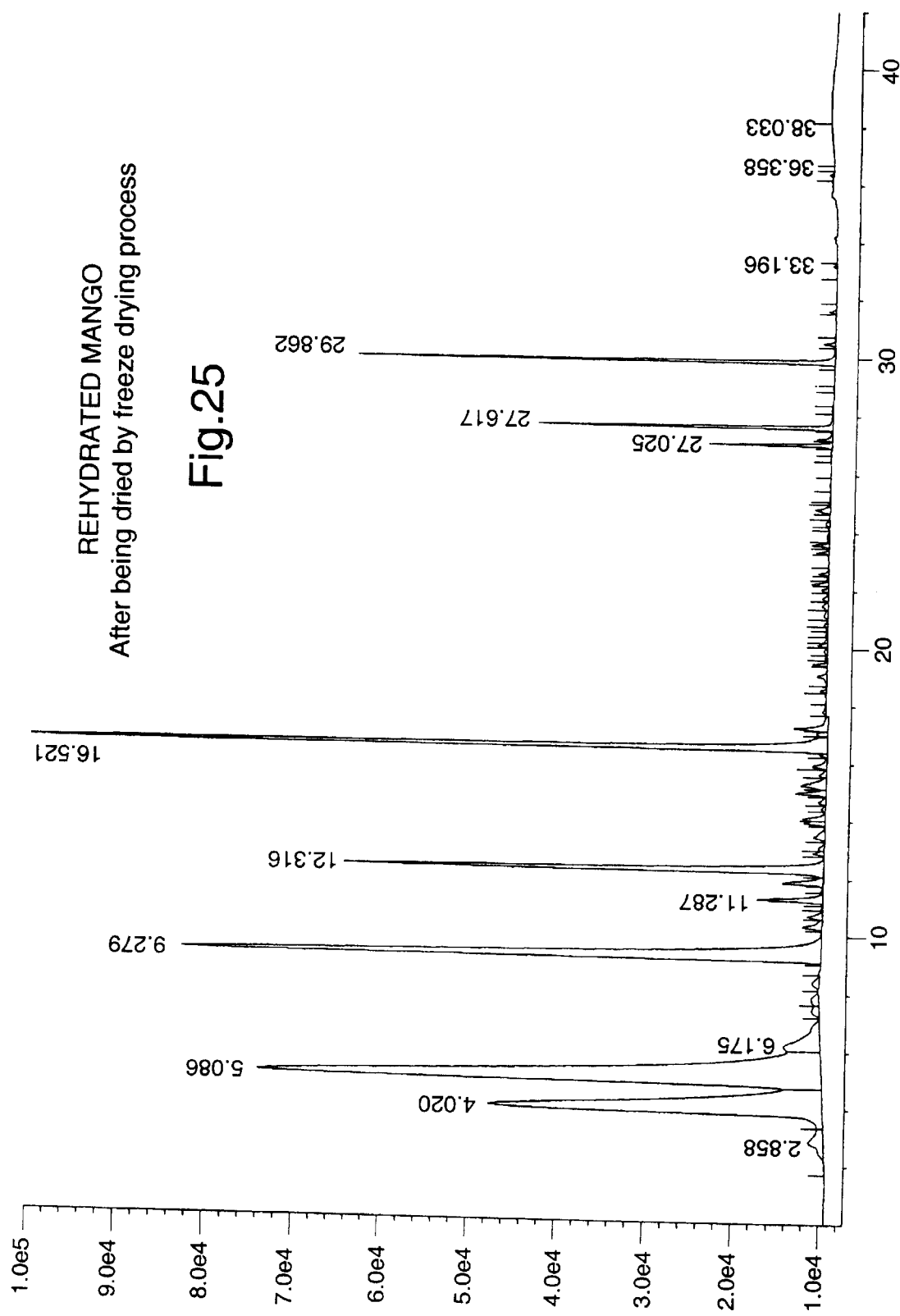

FIGS. 19 to 25 are gas chromatographic traces for mango slices which correspond to the gas chromatographic traces of the banana slices of FIGS. 8 to 14. In other words, FIG. 19 is a gas chromatographic trace of mango prior to drying, FIG. 20 is a trace of the mango dried by the four phase process according to the invention, FIG. 21 is a trace of the mango dried by the conventional air-flow drying process, FIG. 22 is a trace of the mango dried by the freeze-drying process, FIG. 23 is a trace of the mango which was rehydrated subsequent to being dried by the process according to the invention, FIG. 24 is a trace of the mango having been rehydrated subsequent to being dried by the conventional air-flow drying process, and FIG. 25 is a trace of the mango having been rehydrated subsequent to being dried by the freeze-drying process. Comparisons between the traces of FIGS. 19 to 23 yield substantially similar conclusions to those drawn from the comparisons made between FIGS. 8 to 14 of the banana as already discussed. In addition, it can be seen from FIG. 20 that the dried mango which was dried by the process according to the invention has prominent gas chromatographic peaks at 6.181 and 12.771.

The main fraction of volatile compounds in the mango are compounds evaporating in the 40° C. to 100° C. range of temperatures. The dominant compounds to be found in this fraction for the fresh fruit are: unidentified compounds with RT=12.5, RT=12.8 (probably butanol), RT=13.1, RT=14.2 and RT=17.0. The compound with RT=12.7 remains the main compound emitted by the dried mango which were dried by all three drying processes. However, in the aromas from the dried mango which was dried by the process according to the invention there is also a large quantity of ethanol (RT=6.81). Following rehydration of the mango dried by the process of the invention, three compounds dominate, one with RT=9.2 (probably propanol), two others with RT=12.5 and RT=16.6. Following rehydration of the mango which had been dried by the conventional air-flow drying process butanol (RT=12.8) additionally dominates. After rehydration of the mango which had been dried by the freeze-drying process, the rehydrated mango becomes very aromatic, with a large participation of a compound with RT=4.0 (ethanoic acid methyl ester) in the fraction up to 40° C. This rehydrated mango also displays compounds with RT=5.1 (methanol), RT=9.2 (propanol), RT=12.3 and RT=16.5 in the 40° C. to 100° C. fraction, and compounds with RT=27.6 and RT=29.9 in the 150° C. to 200° C. fraction.

Figure 26:
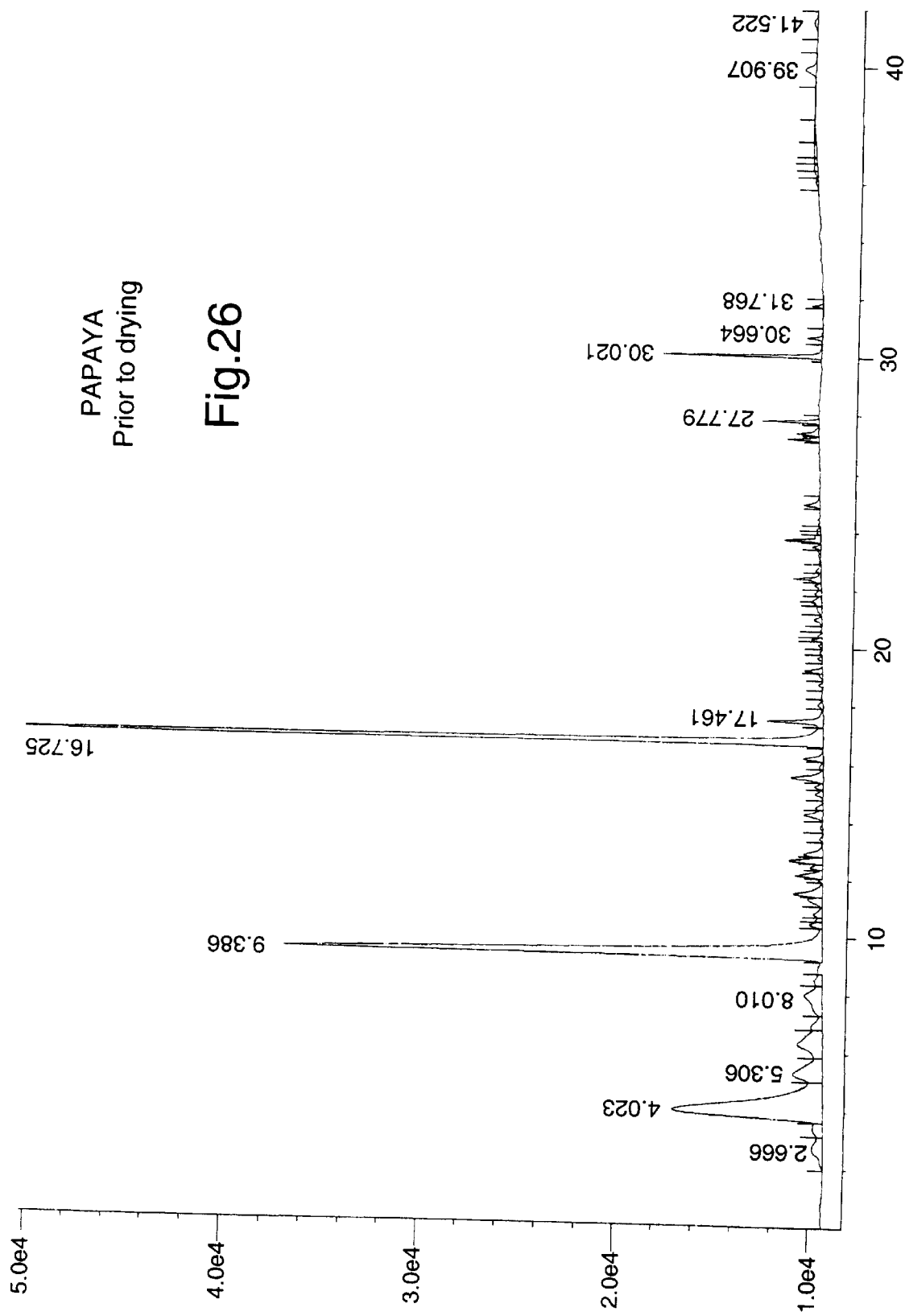
Figure 27:
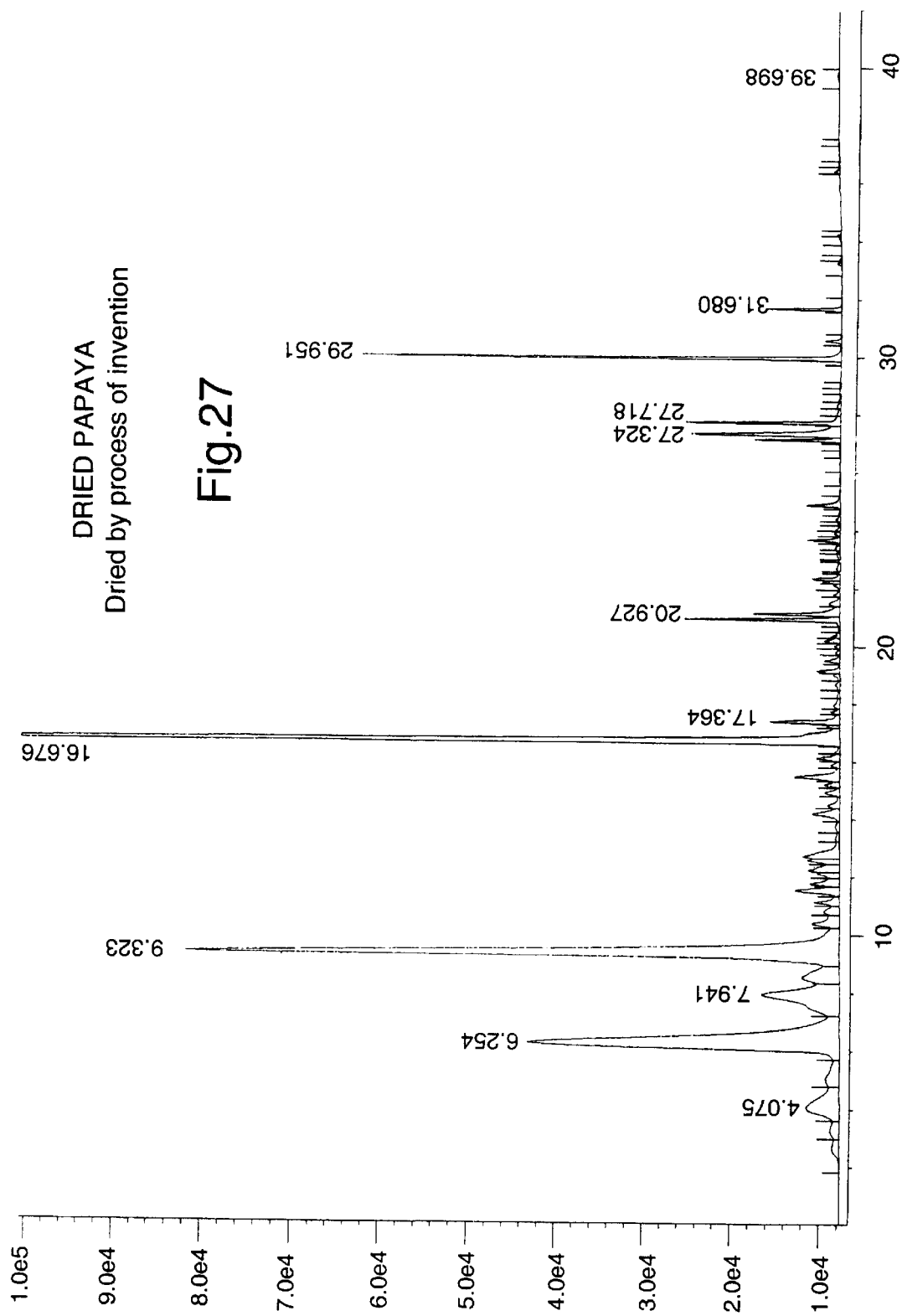
Figure 28:
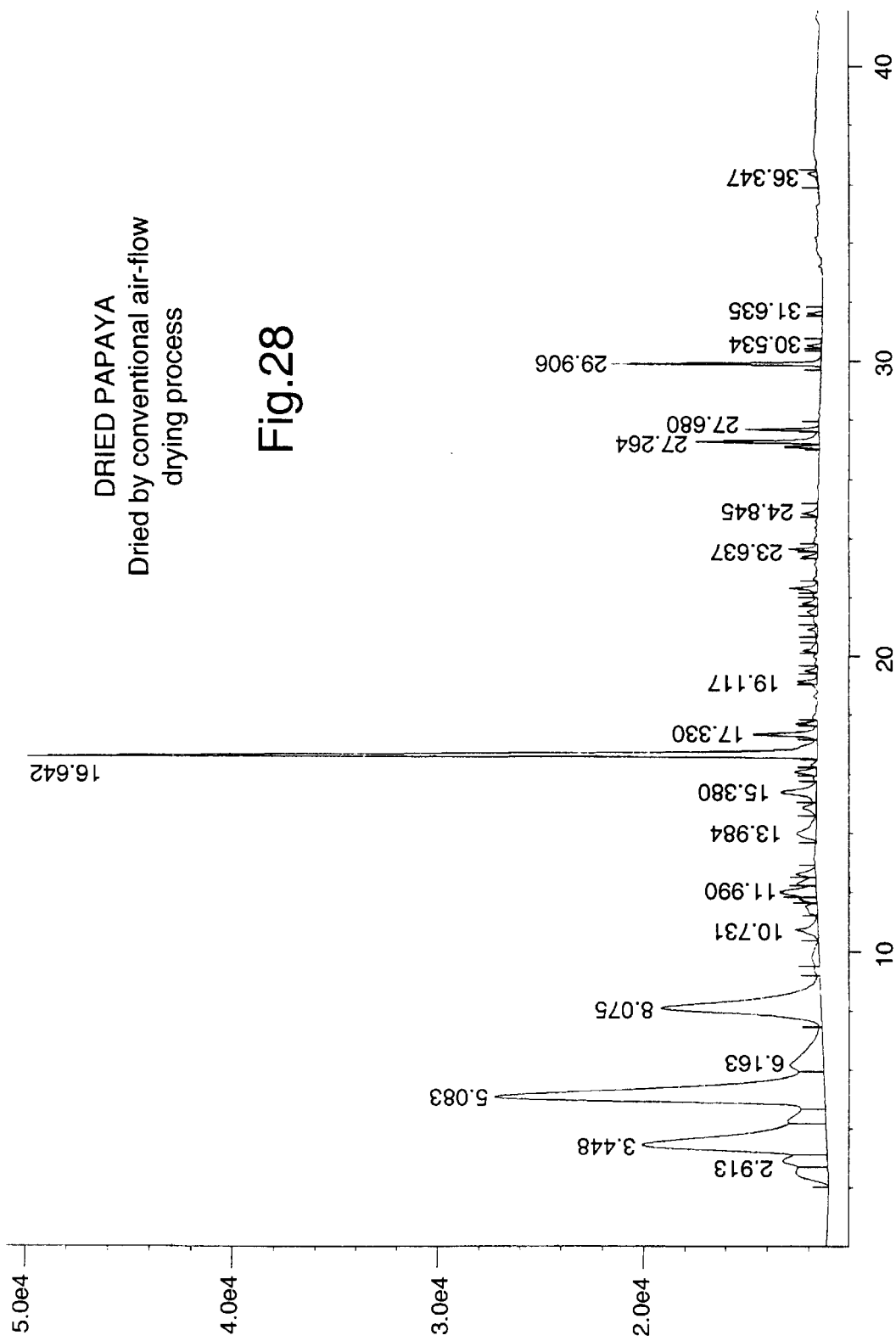
Figure 29:
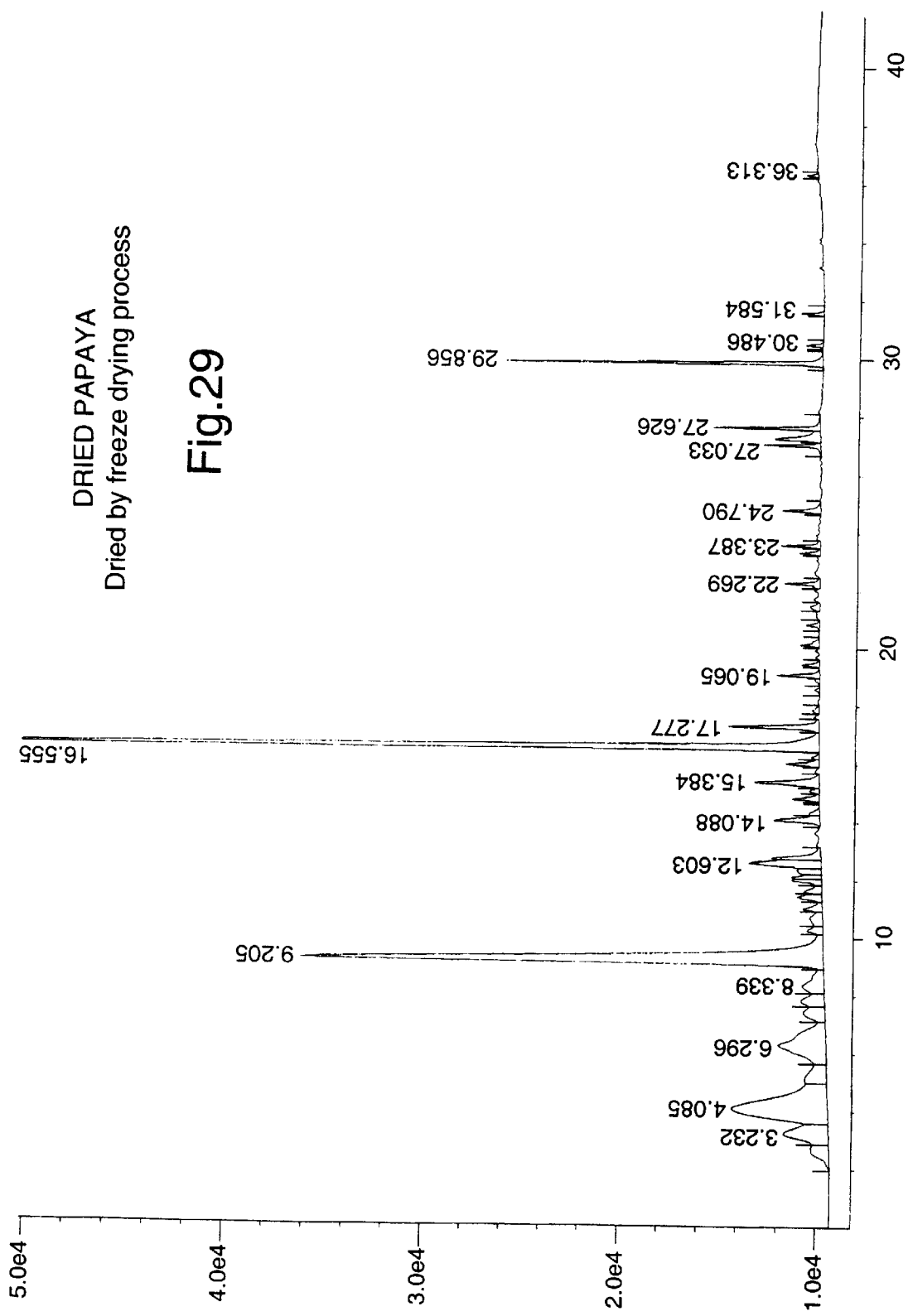
Figure 30:
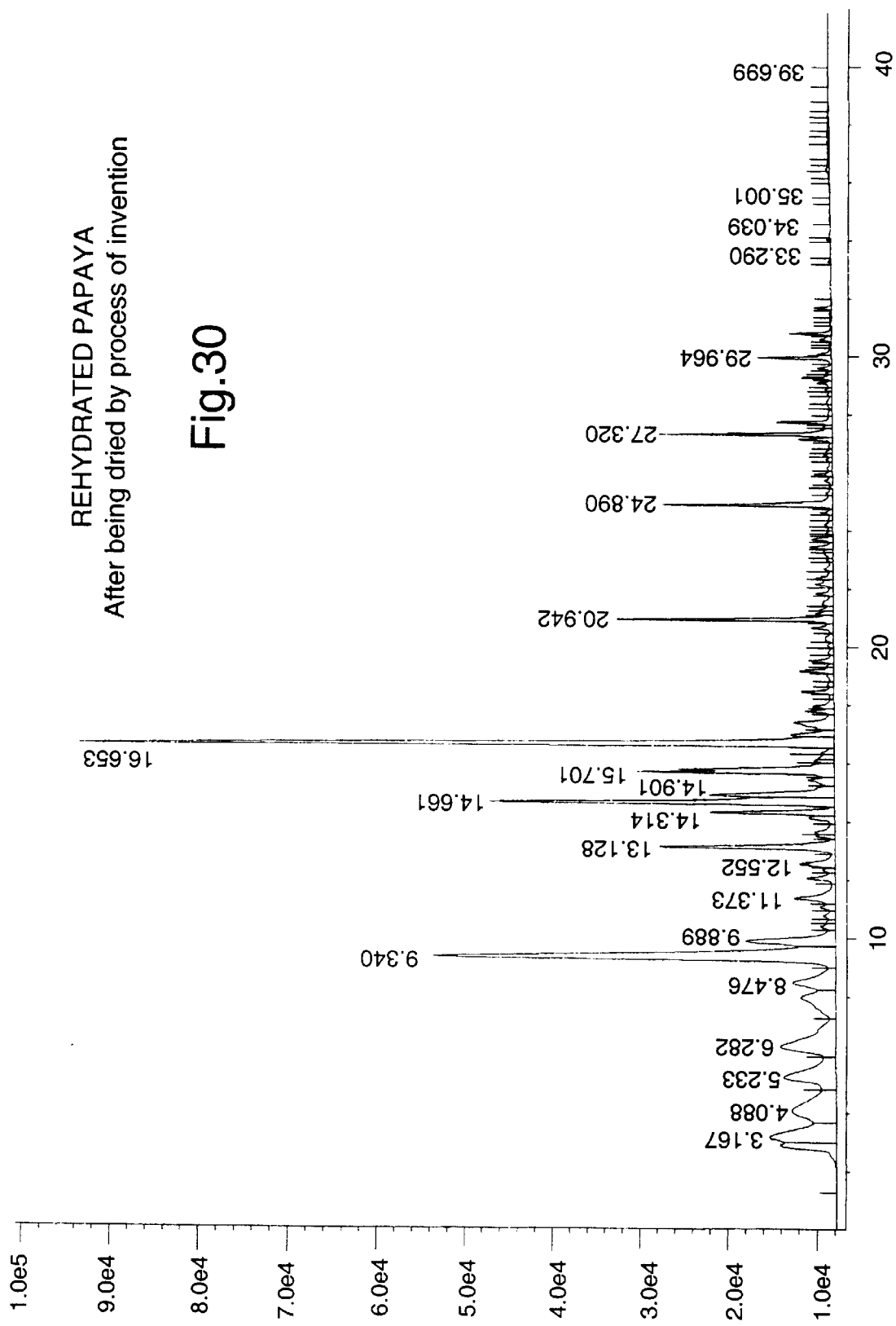
Figure 31:
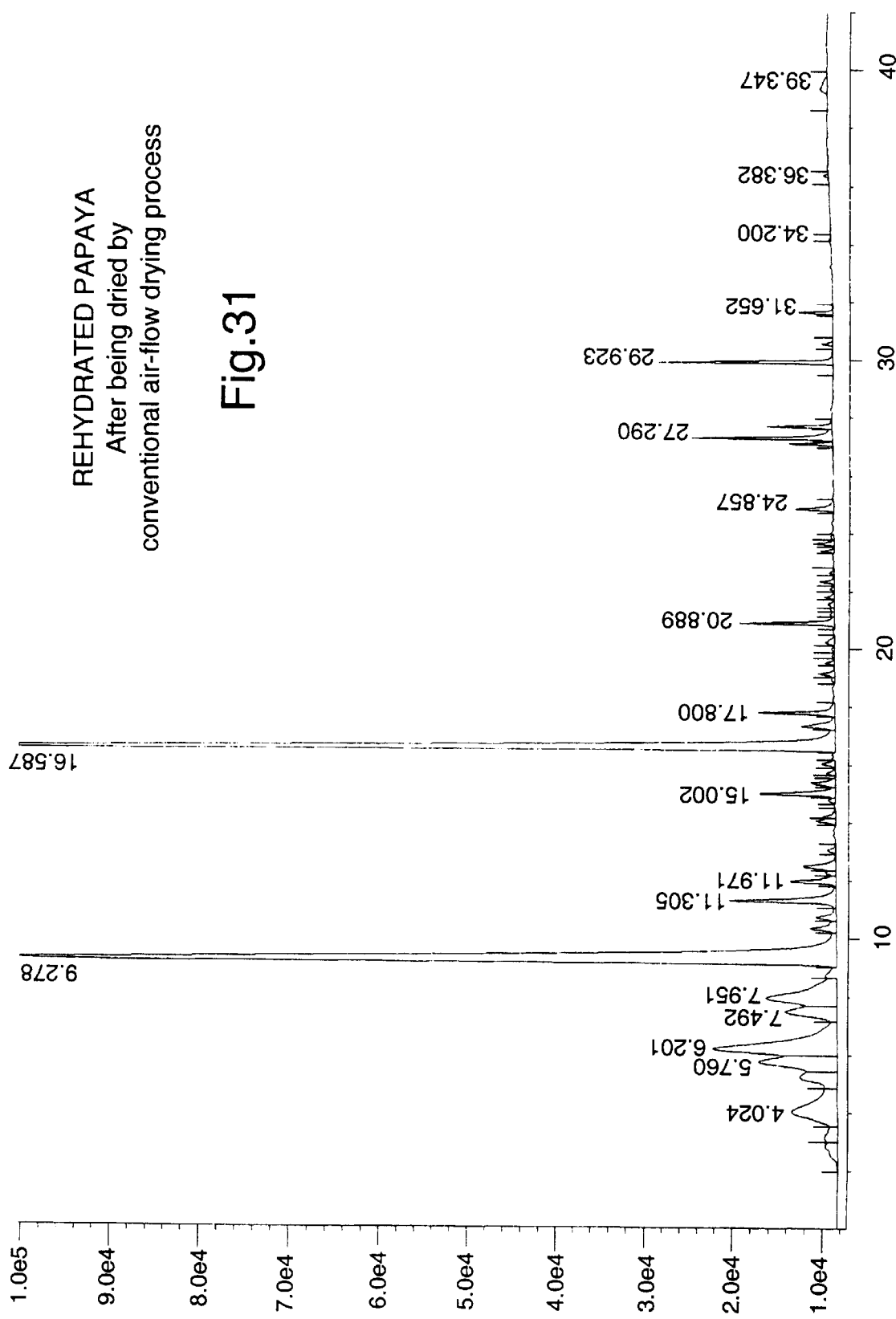
Figure 32:
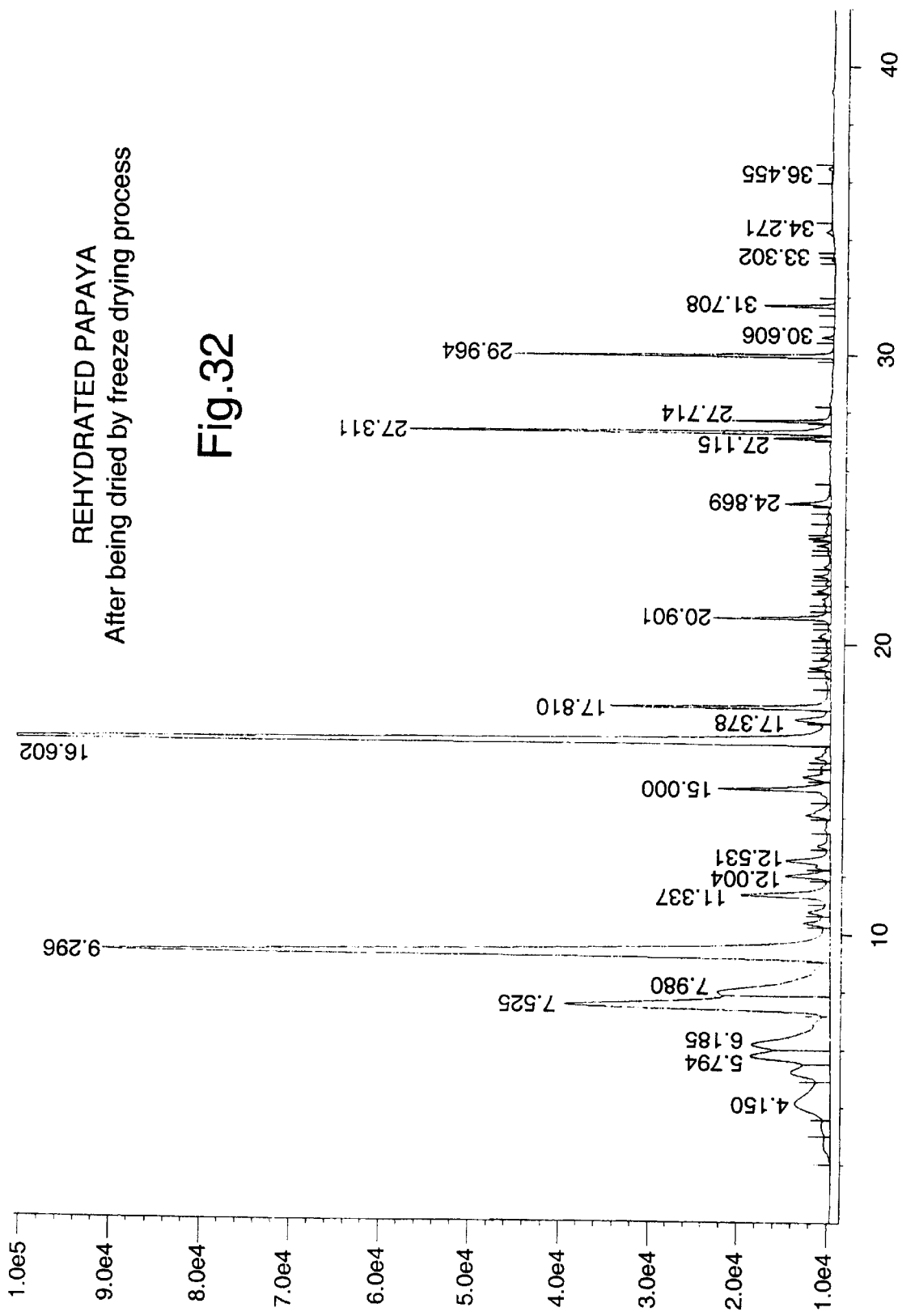

FIGS. 26 to 32 illustrate gas chromatographic traces for papaya which also correspond to the gas chromatographic traces of FIGS. 8 to 14. In other words, FIG. 26 is a trace of papaya prior to being dried, FIGS. 27 to 29 are traces of papaya having been dried by the process according to the invention, the conventional air-flow drying process and the freeze-drying process, respectively, and FIGS. 30 to 32 are traces of papaya having been rehydrated subsequent to being dried by the drying process according to the invention, the conventional air-flow drying process and the freeze-drying process, respectively. A comparison between the traces of FIGS. 26 to 32 yields substantially similar conclusions as those drawn from the comparison between the traces of FIGS. 8 to 14 in connection with banana. Additionally, the dried papaya dried by the process according to the invention has prominent gas chromatographic peaks at 6.254, 7.941 and 9.323 minutes retention times.

Figure 33:
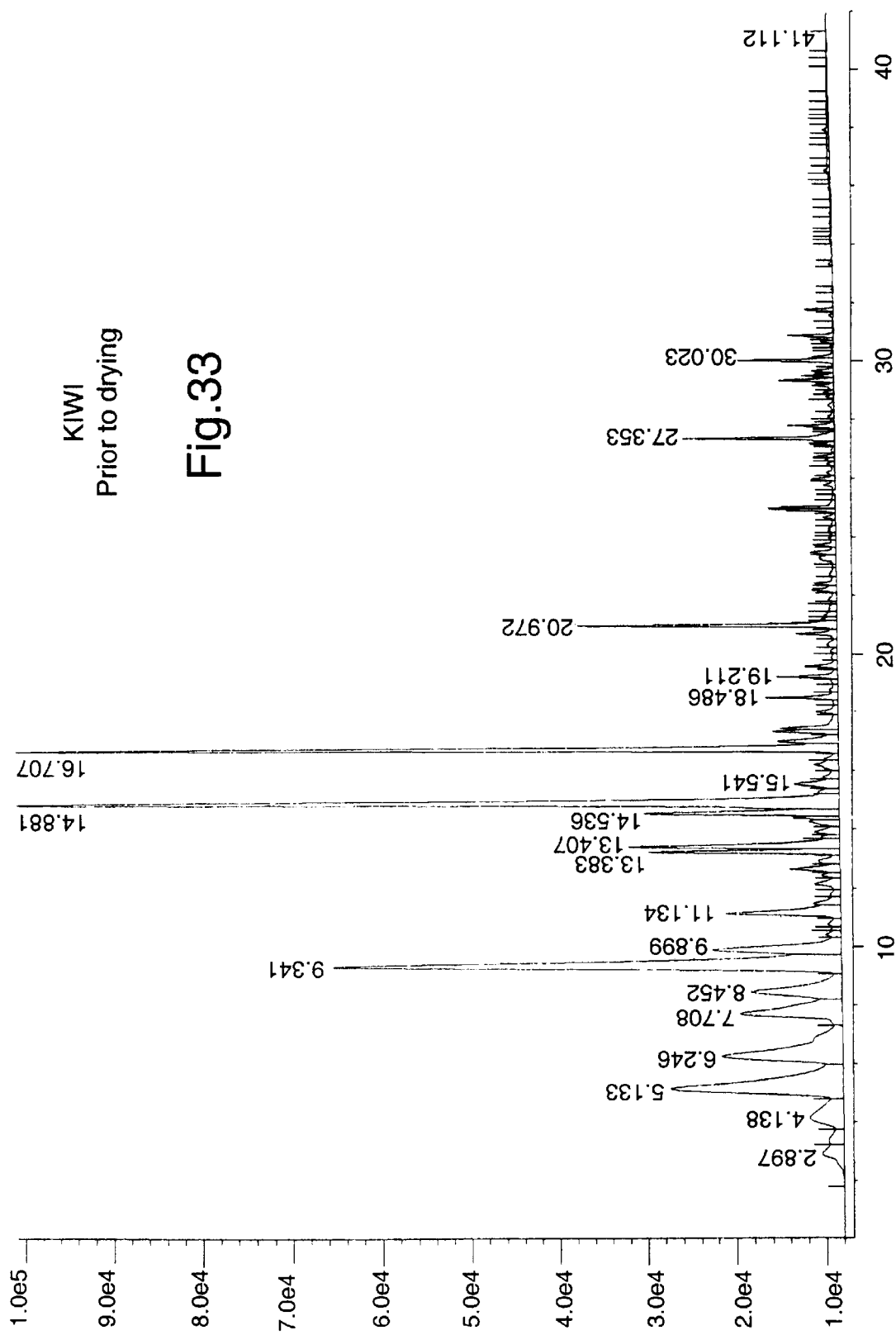
Figure 34:
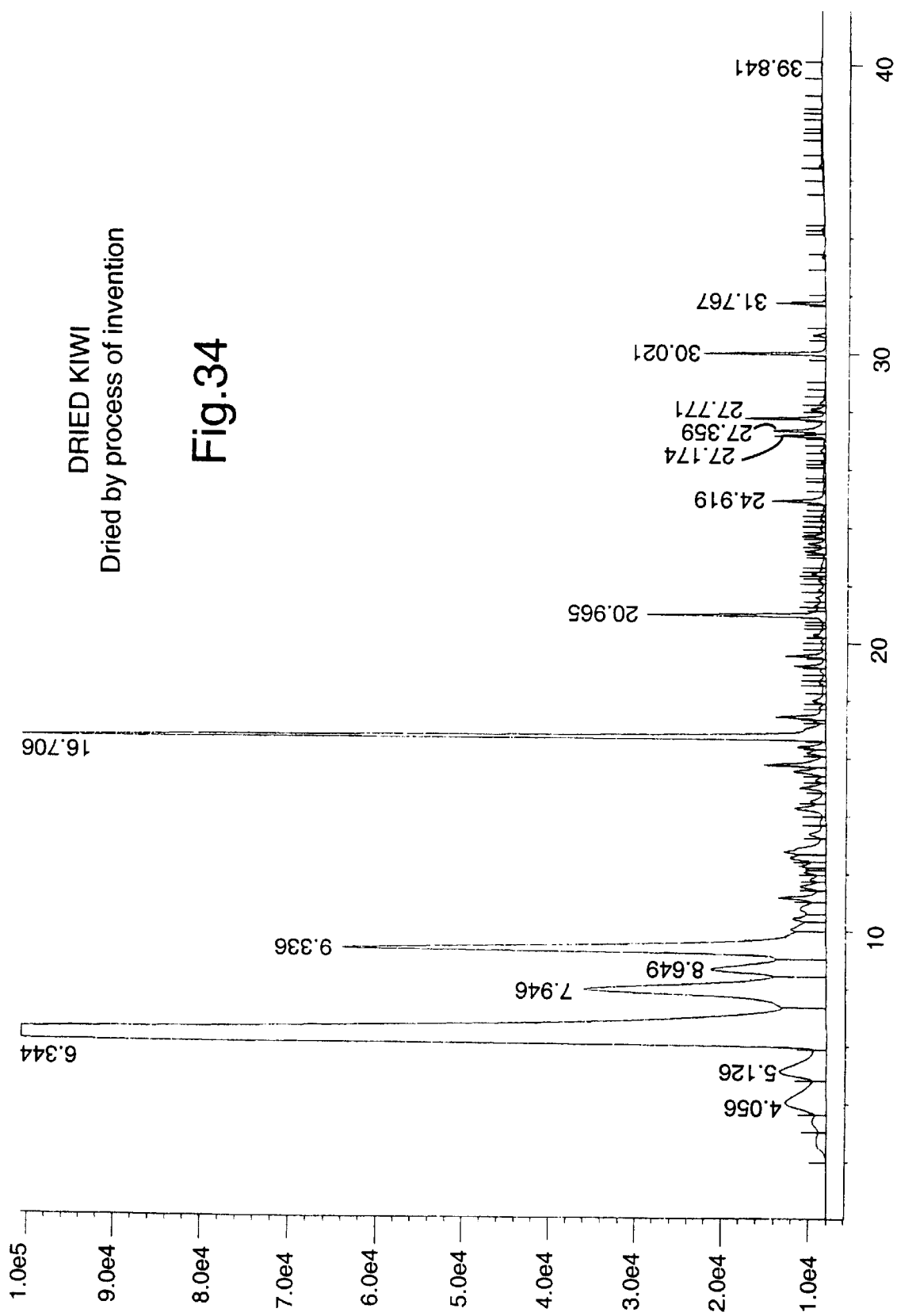
Figure 35:
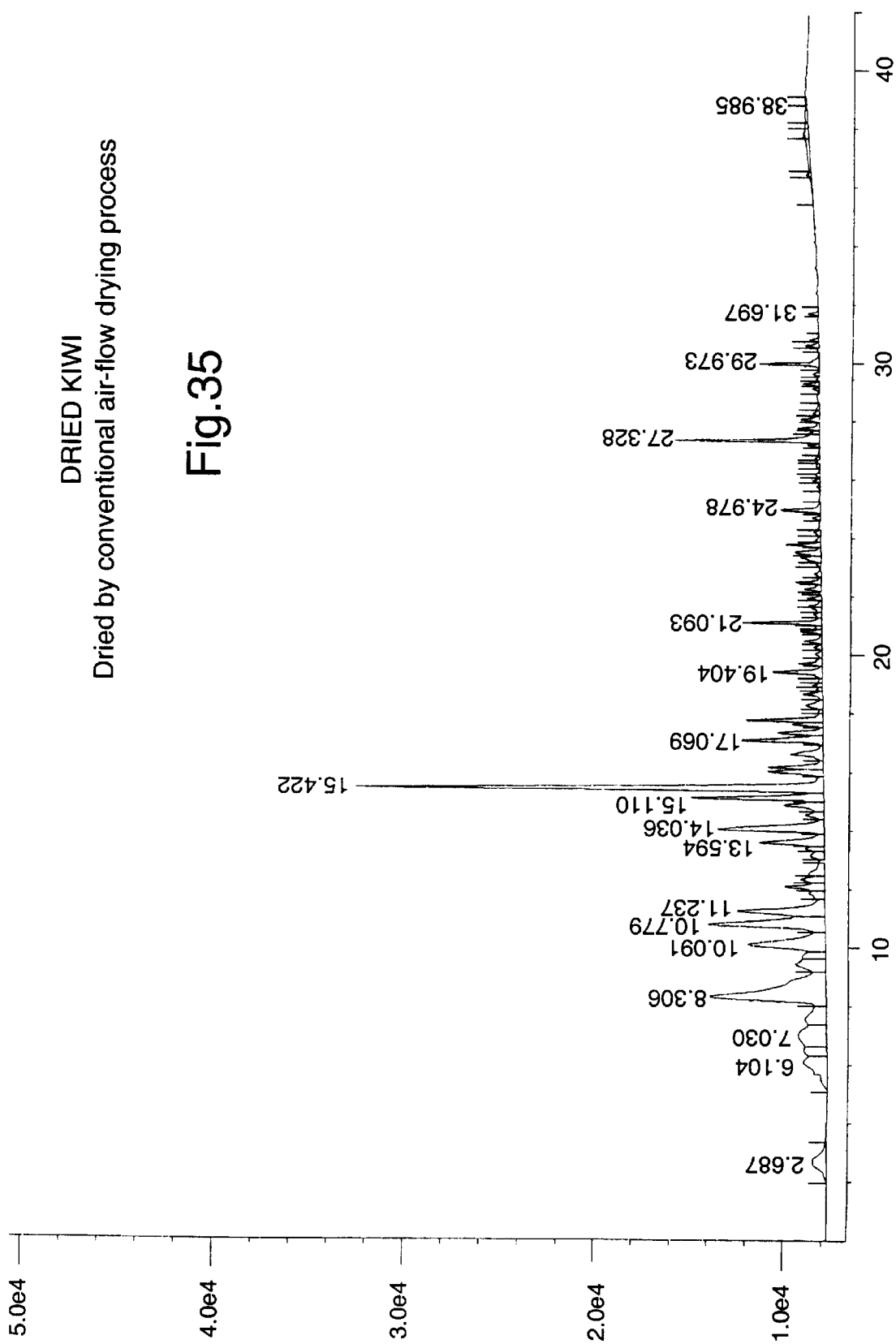
Figure 36:
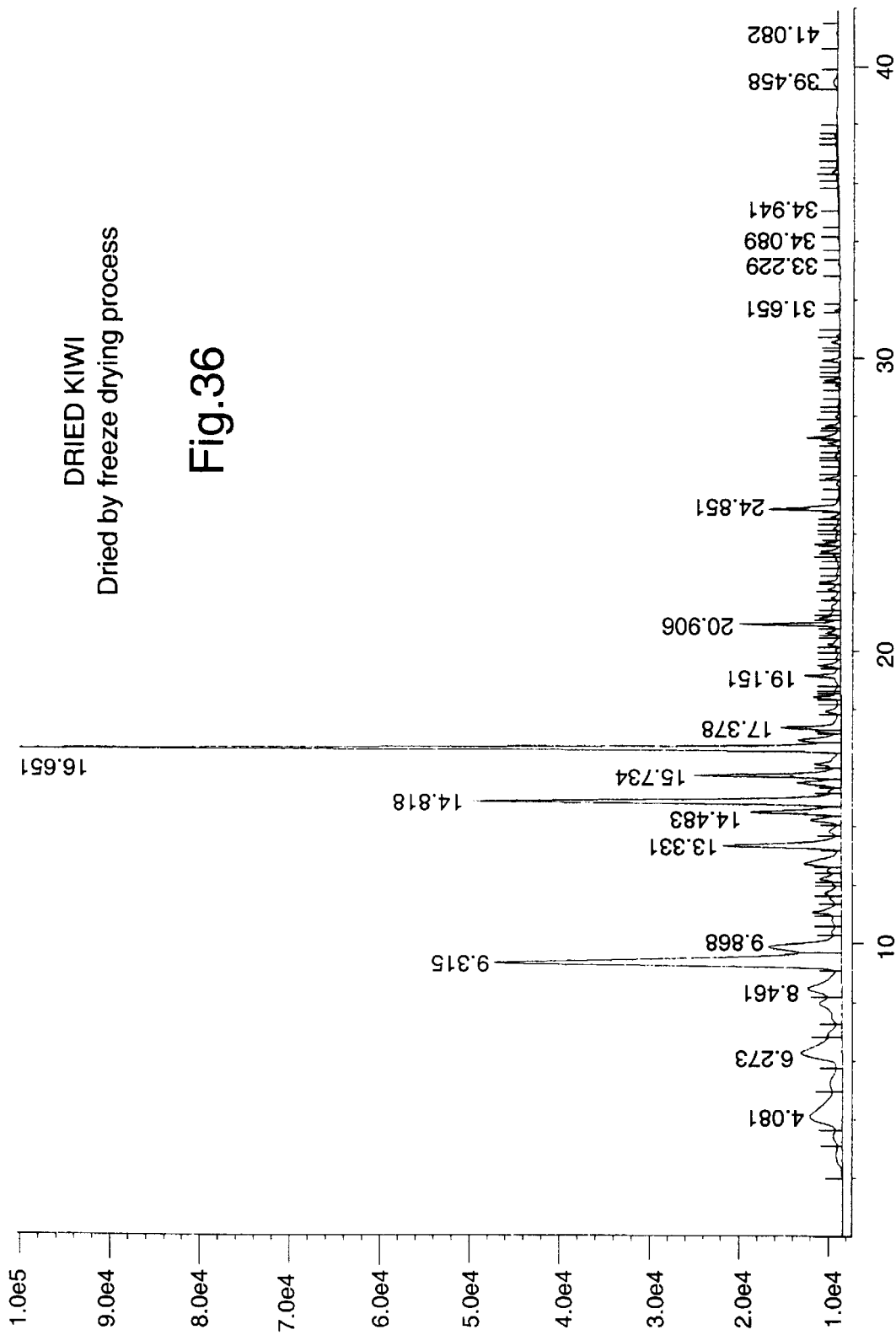
Figure 37:
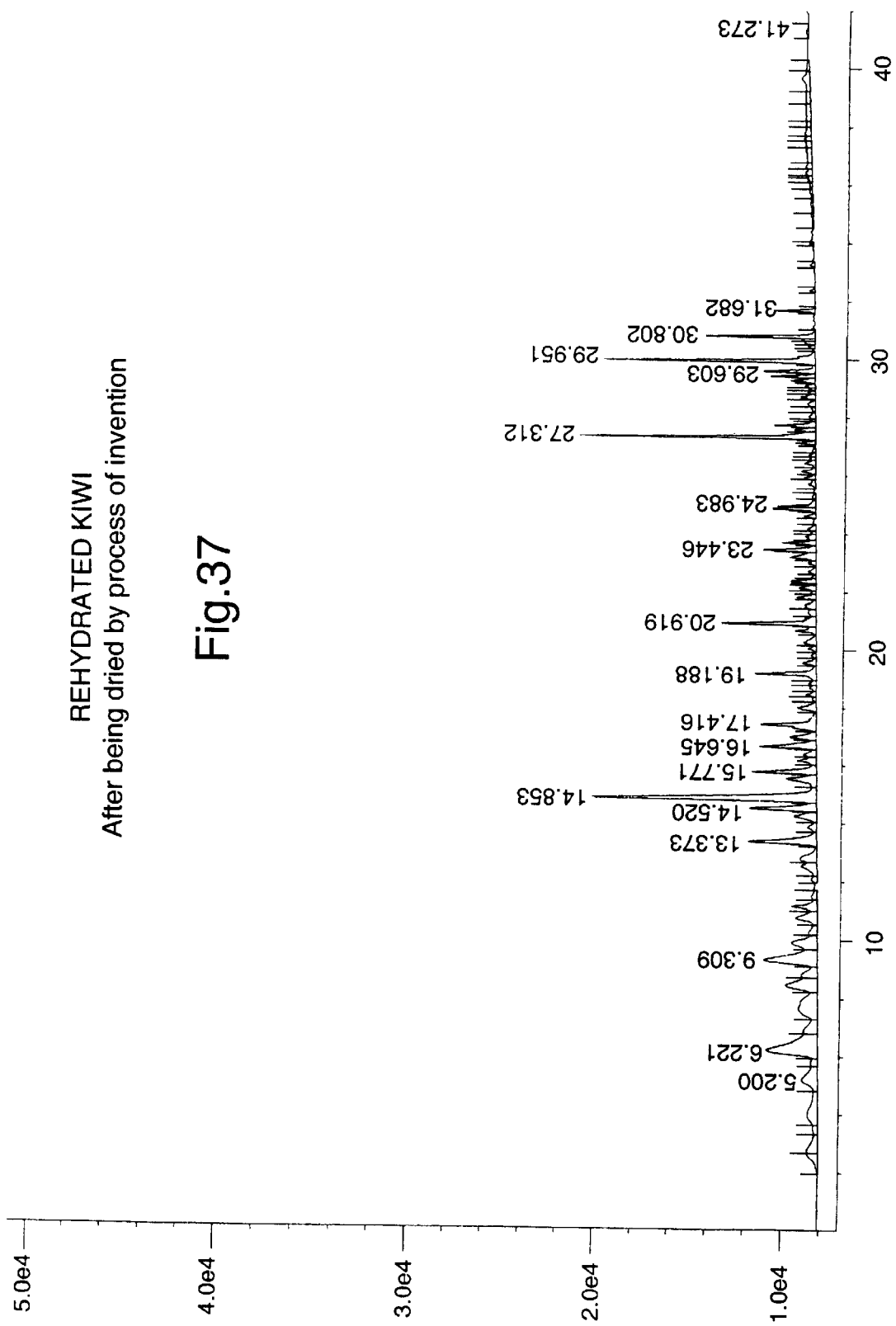
Figure 38:
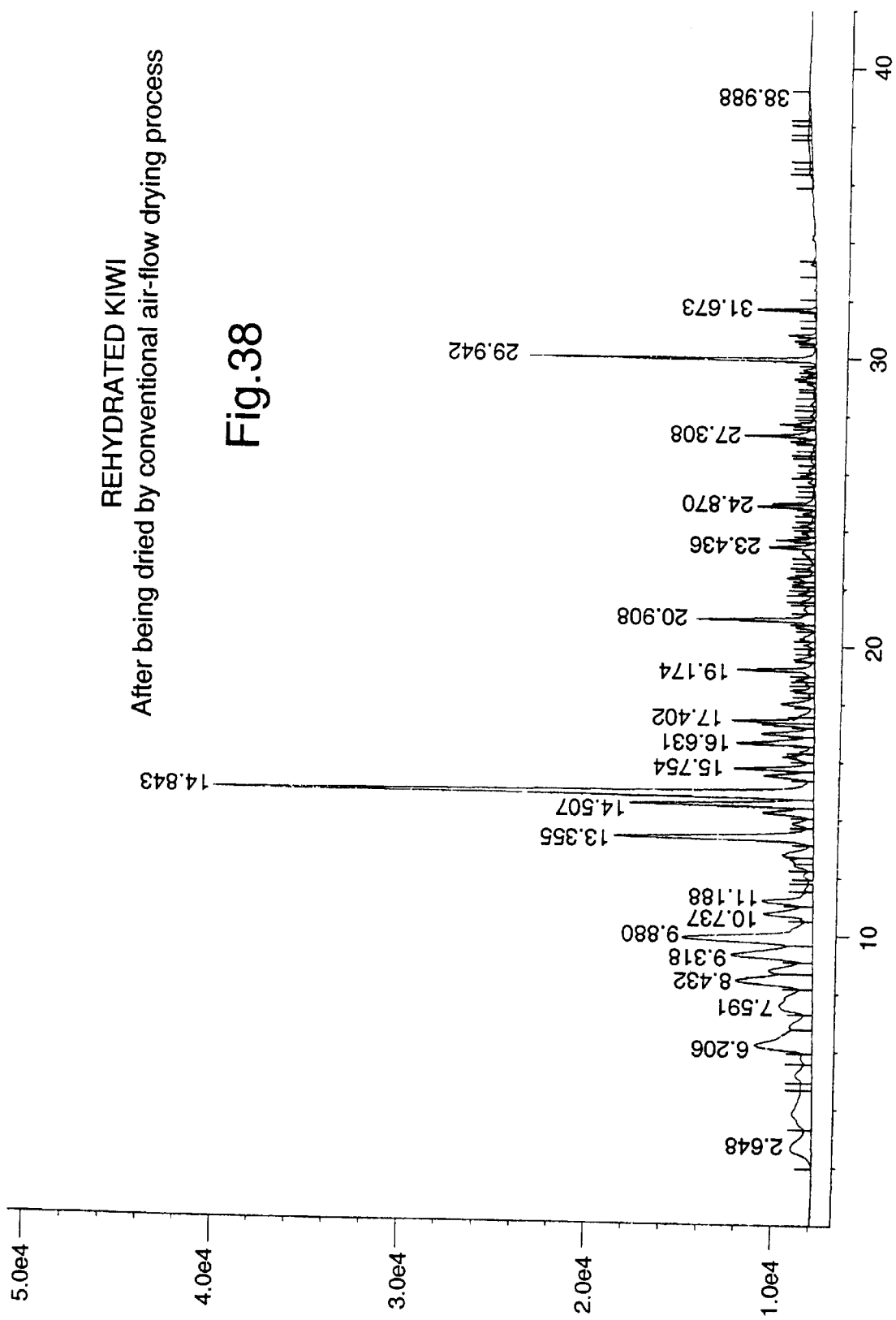
Figure 39:
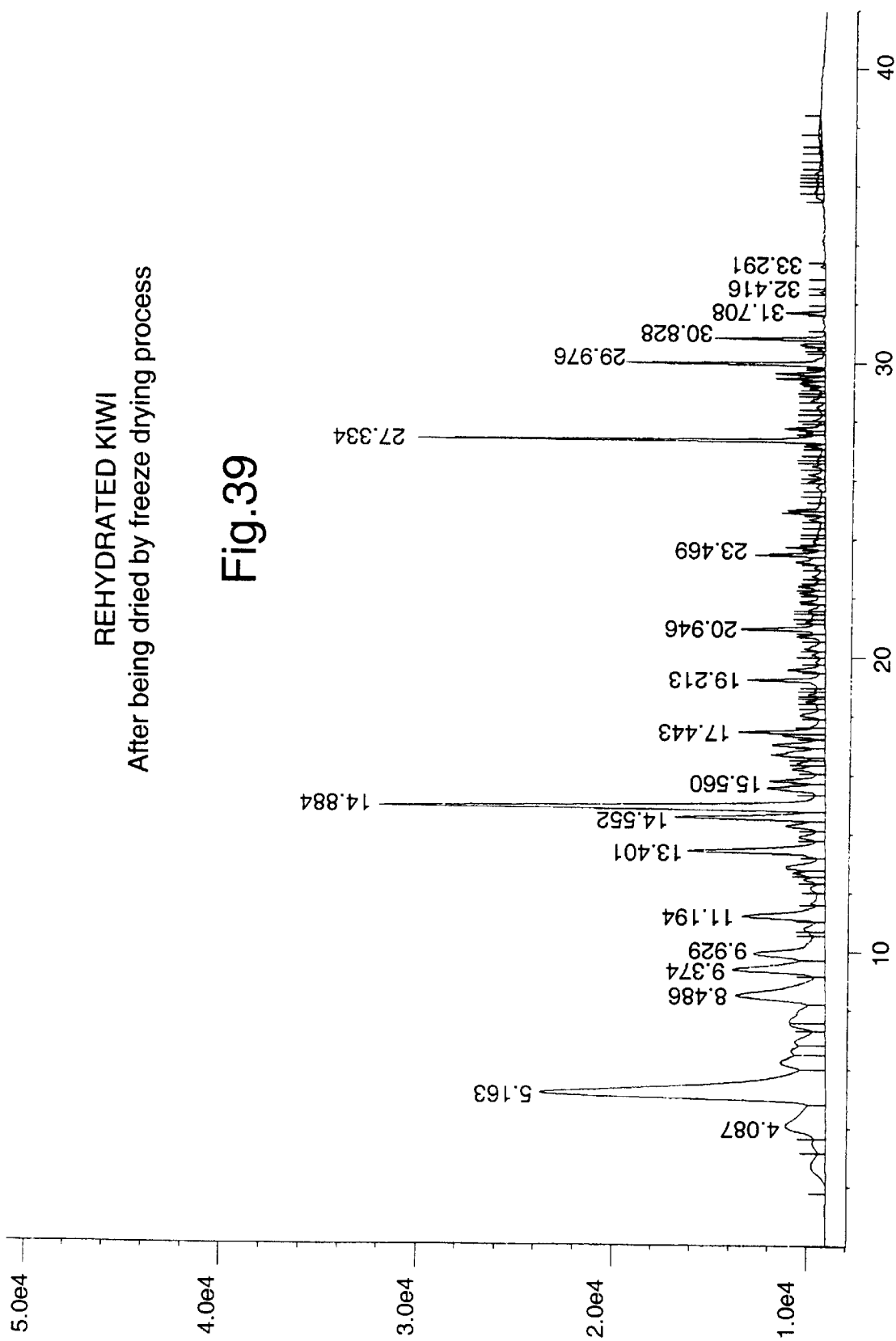

FIGS. 33 to 39 illustrate gas chromatographic traces for kiwi slices which also correspond to FIGS. 8 to 14. In other words, FIG. 33 is a trace of the kiwi prior to being dried, FIGS. 34 to 36 are traces of the kiwi having been dried by the process of the invention, the conventional air-flow drying process and the freeze-drying process, respectively, and FIGS. 37 to 39 are traces of the kiwi having been rehydrated subsequent to being dried by the process according to the invention, the conventional air-flow drying process and the freeze-drying process, respectively. A comparison between the traces of FIGS. 33 to 39 yields substantially similar conclusions to those drawn from the results of the comparison of the traces of FIGS. 8 to 14 for banana. In addition, it can be seen from FIG. 34 that the dried kiwi which was dried by the process according to the invention has prominent gas chromatographic peaks at 6.344, 7.946, 8.649 and 9.336 minutes retention times.

Figure 40:
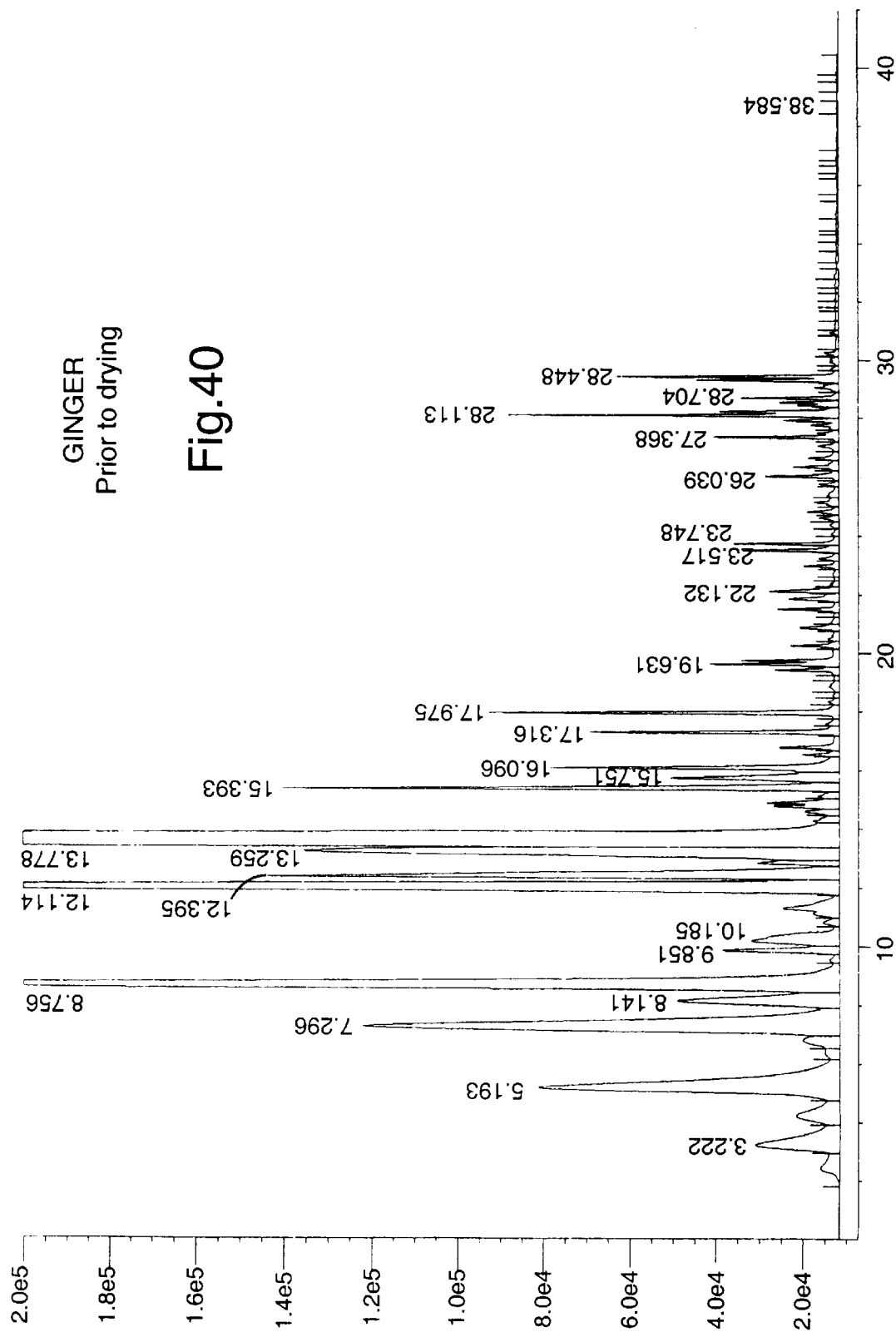
Figure 41:
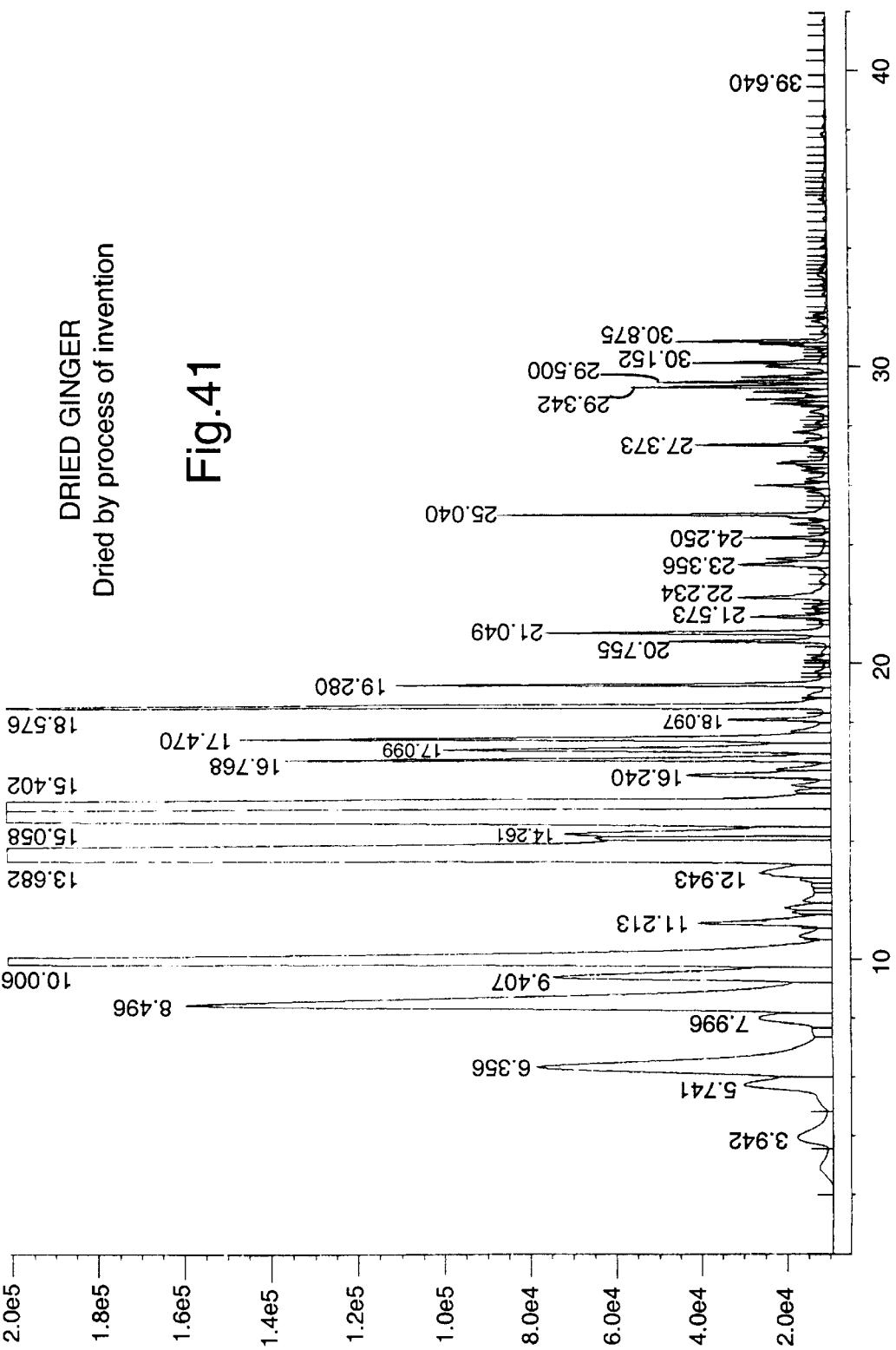
Figure 42:
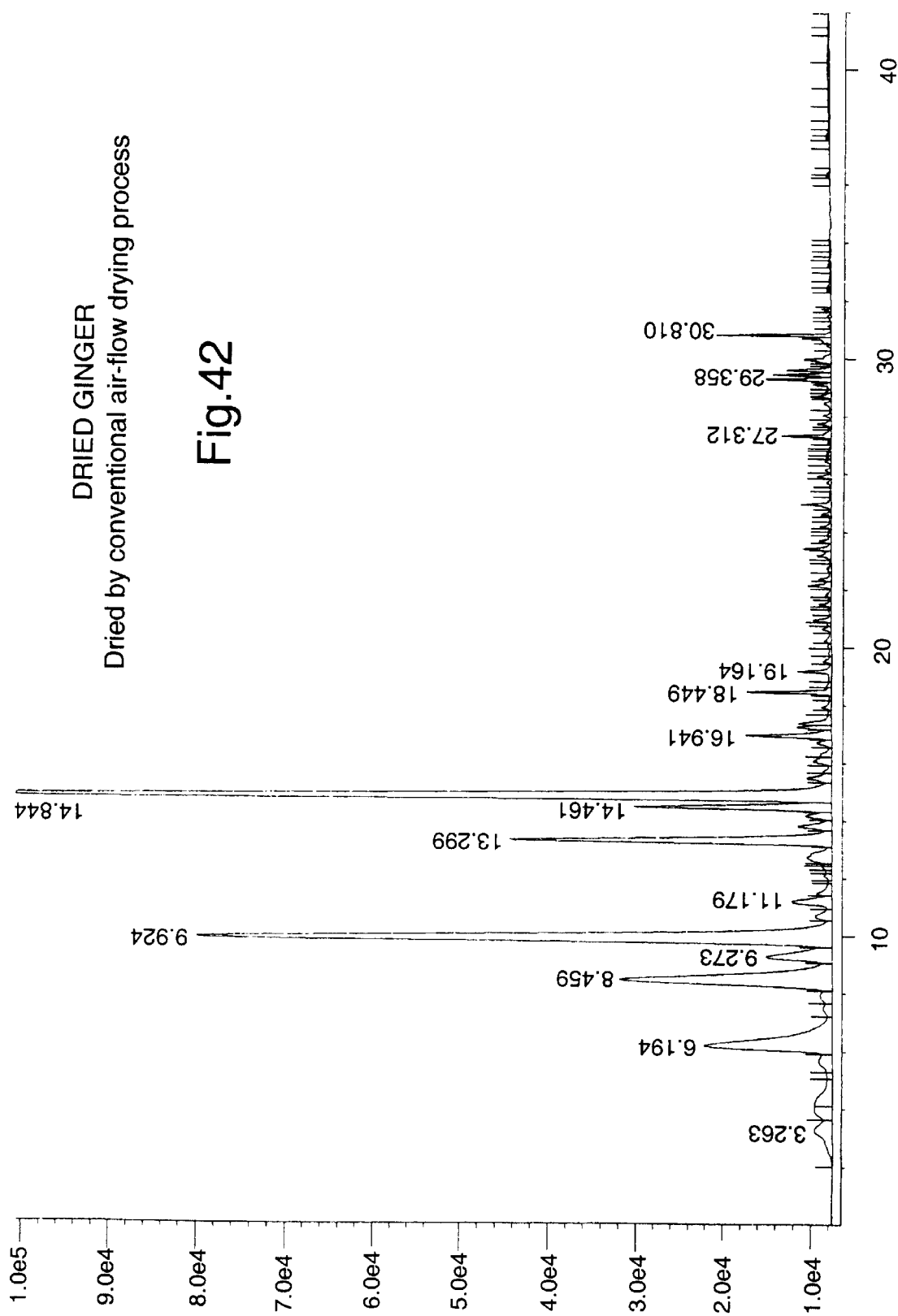
Figure 43:
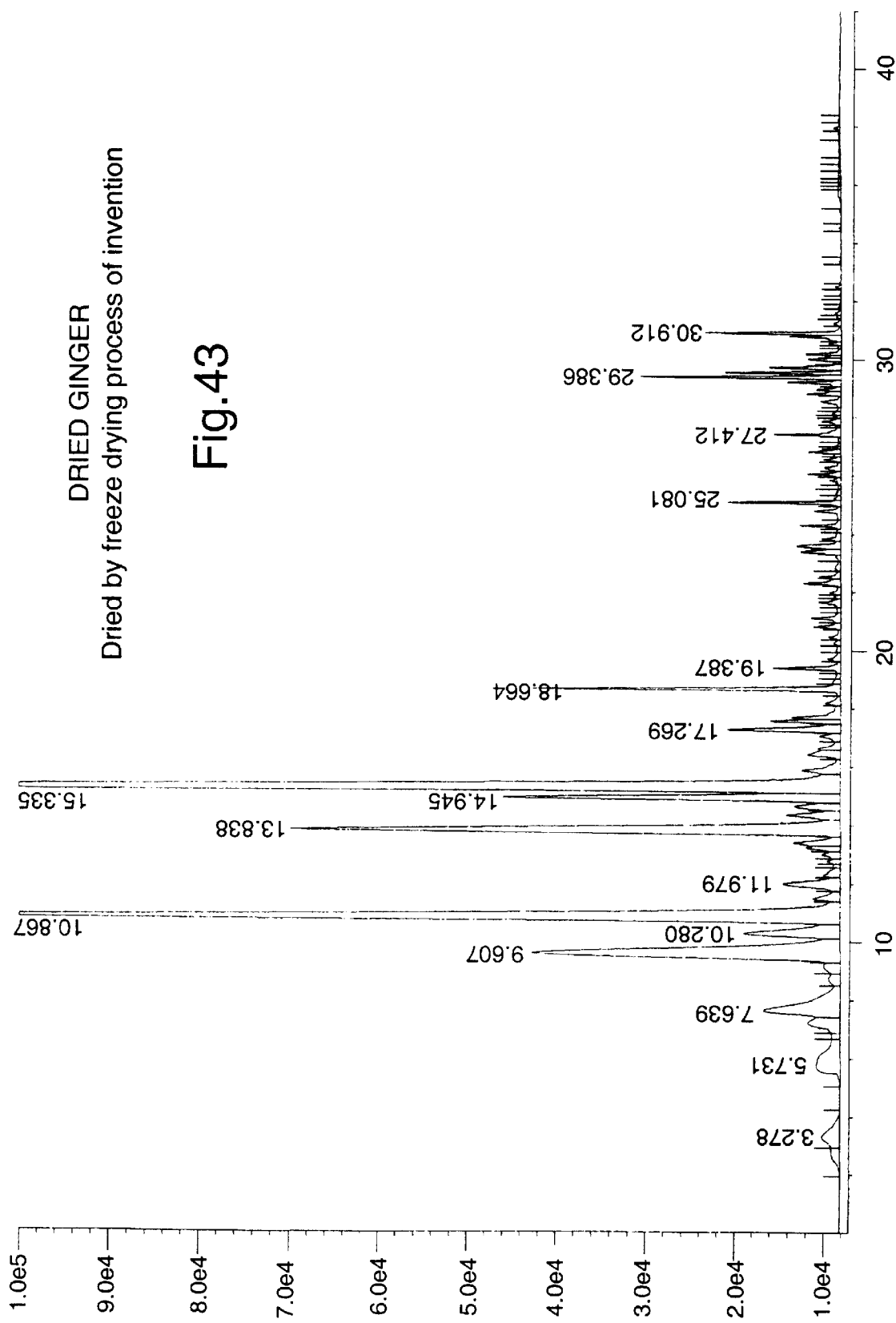
Figure 44:
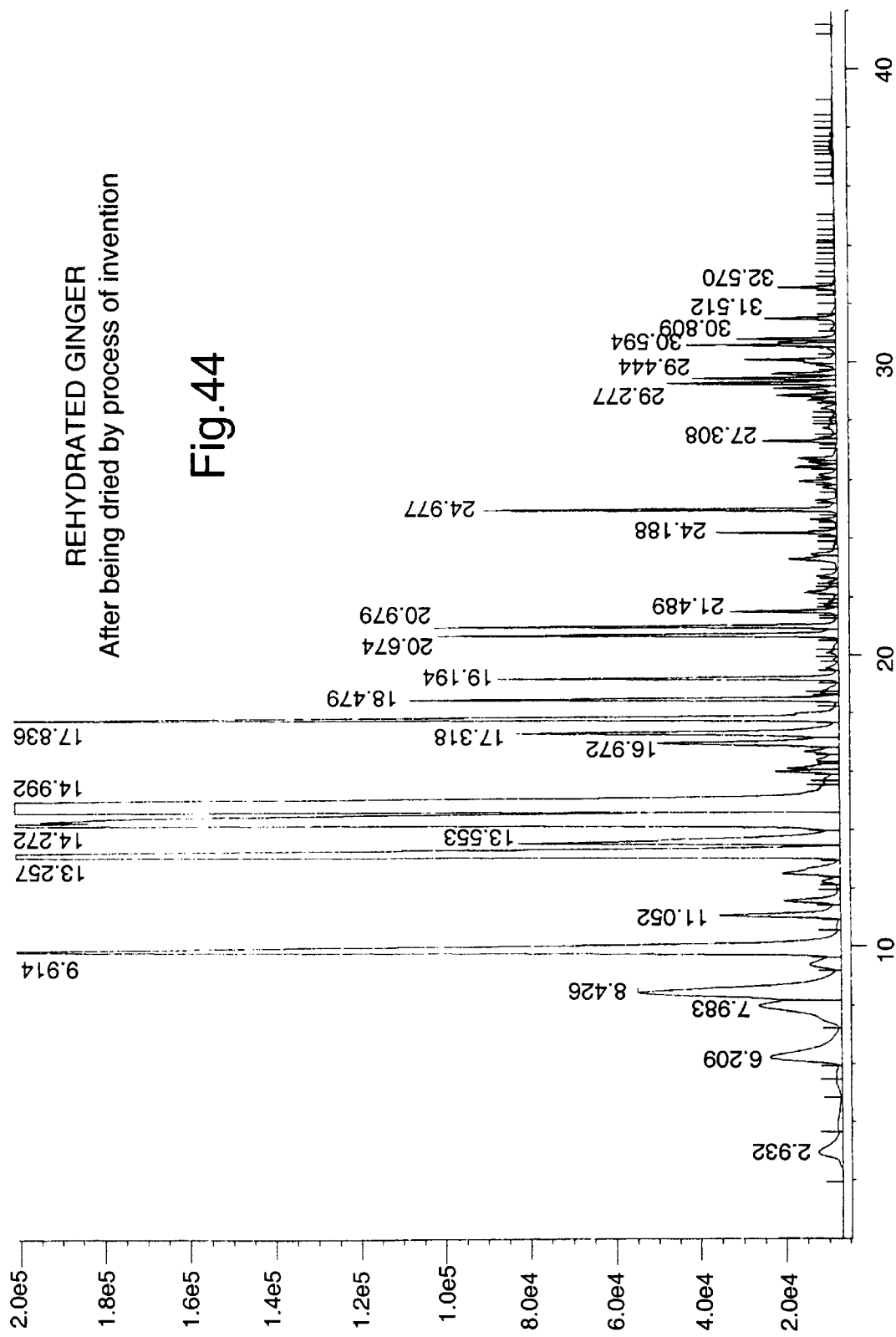
Figure 45:
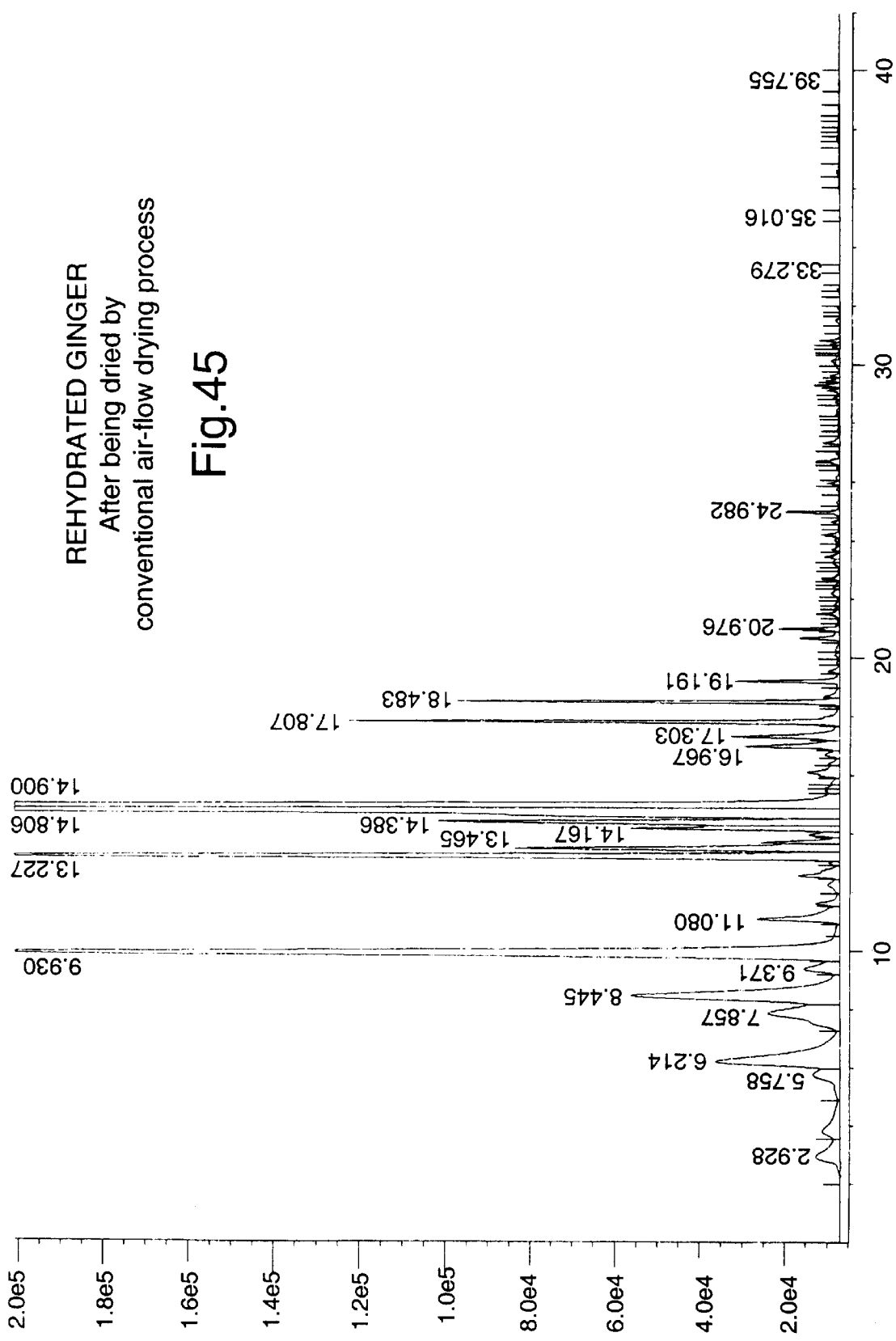
Figure 46:
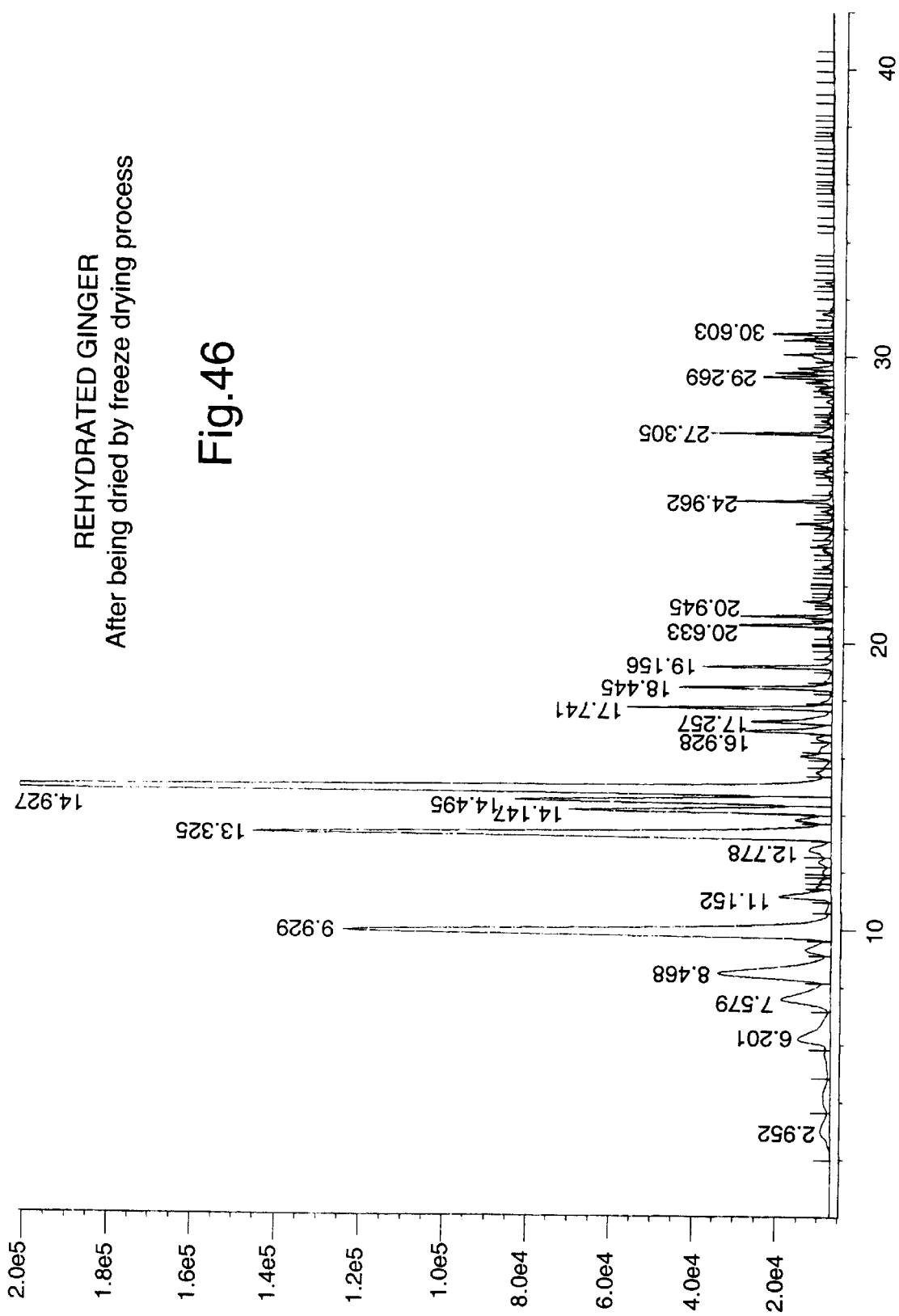

FIGS. 40 to 46 illustrate gas chromatographic traces of ginger which correspond to the traces of FIGS. 8 to 14. In other words, FIG. 40 illustrates a trace of the ginger prior to drying, FIGS. 41 to 43 illustrate traces of the ginger having been dried by the process according to the invention, the conventional air-flow drying process and the freeze-drying process, respectively, and FIGS. 44 to 46 illustrate traces of the ginger having been rehydrated subsequent to being dried by the process according to the invention, the conventional air-flow drying process and the freeze-drying process, respectively. Comparisons between the traces of FIGS. 40 to 46 yield substantially similar conclusions as those drawn from the comparison of the traces of FIGS. 8 to 14 for banana. Additionally, it can be seen from FIG. 41 that the dried ginger which had been dried by the process according to the invention has prominent gas chromatographic peaks at 5.741, 6.356, 7.996, 8.496, 9.407, 10.006 and 11.213 minutes retention times.

Figure 47:
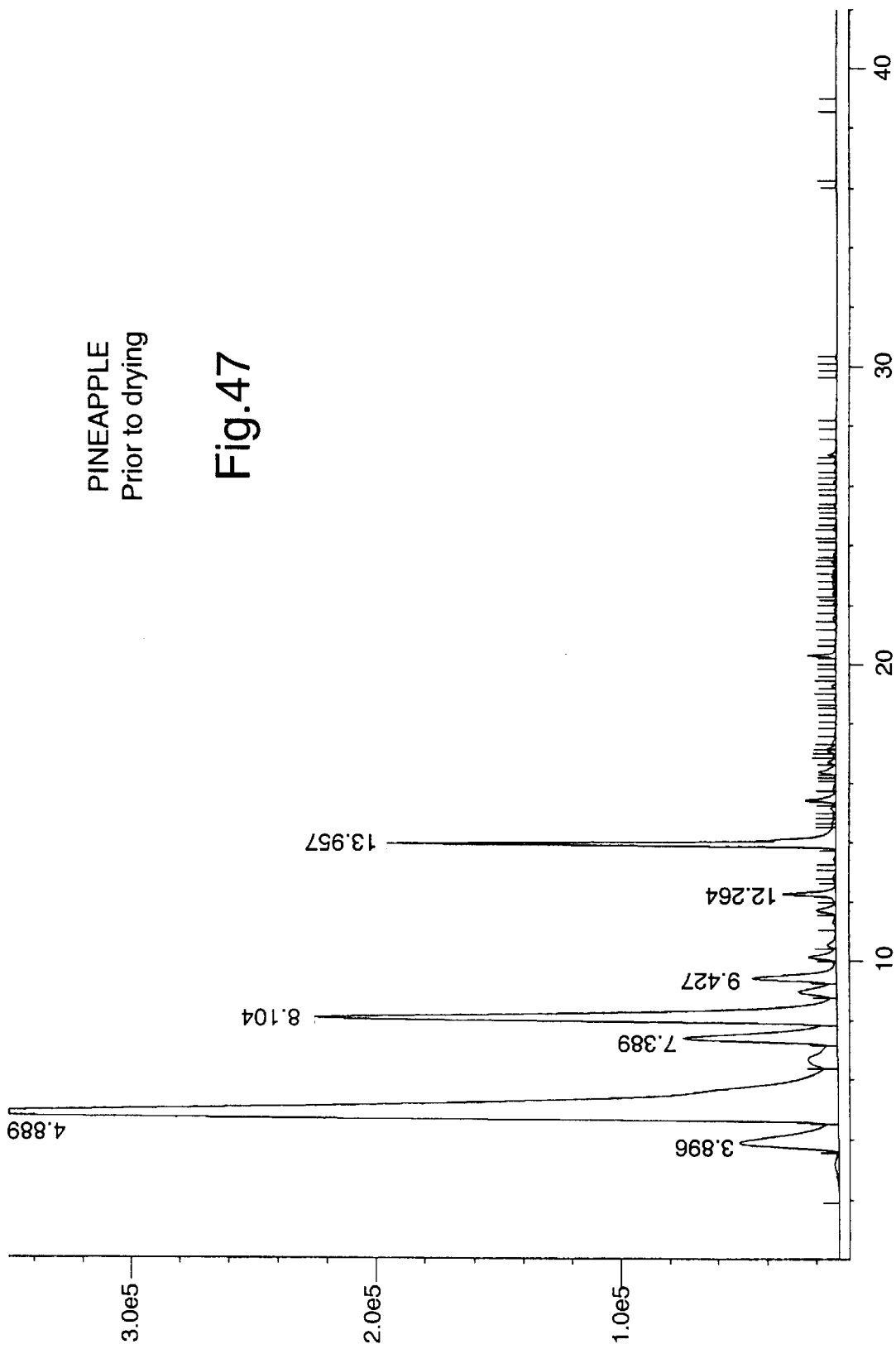
Figure 48:
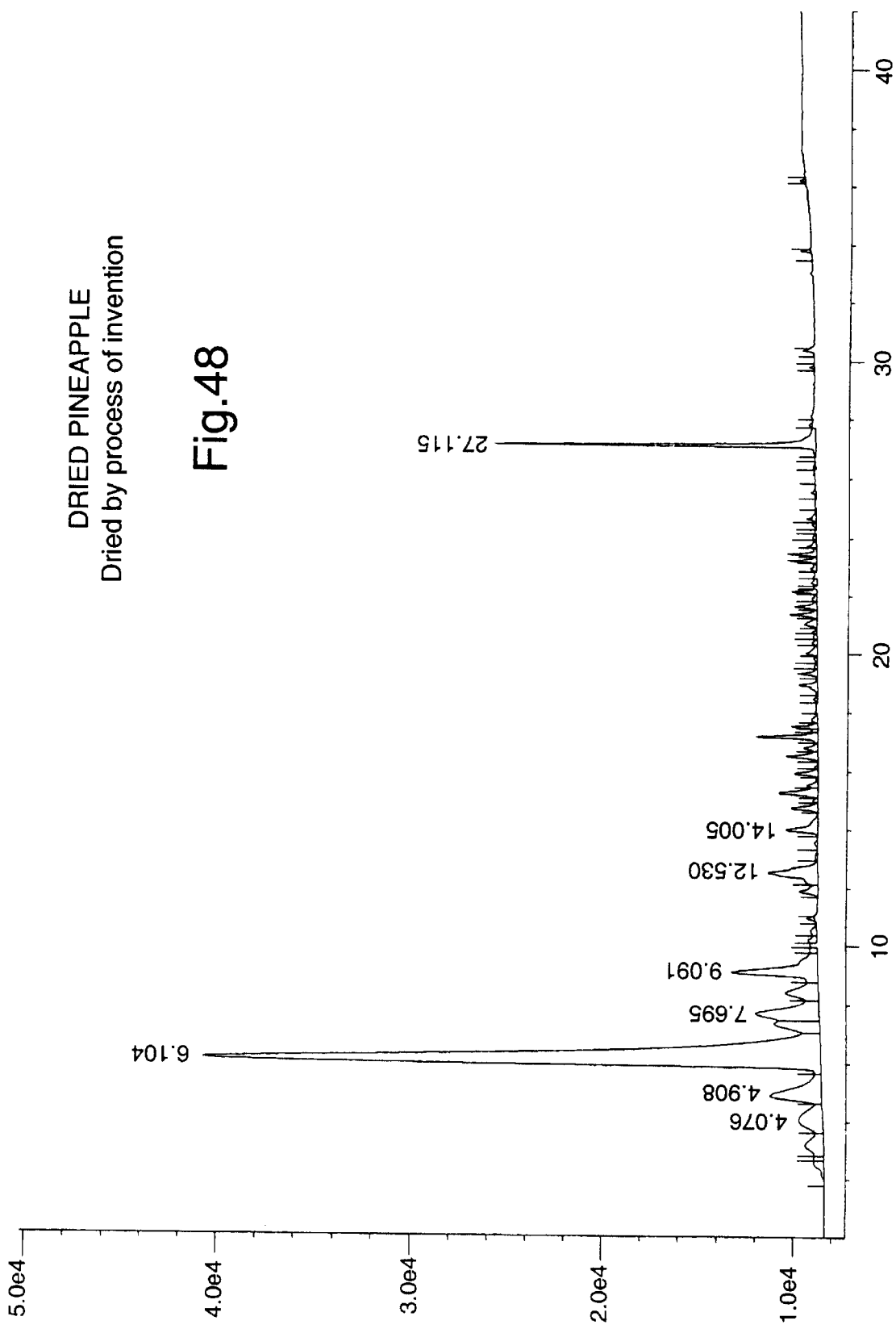
Figure 49:
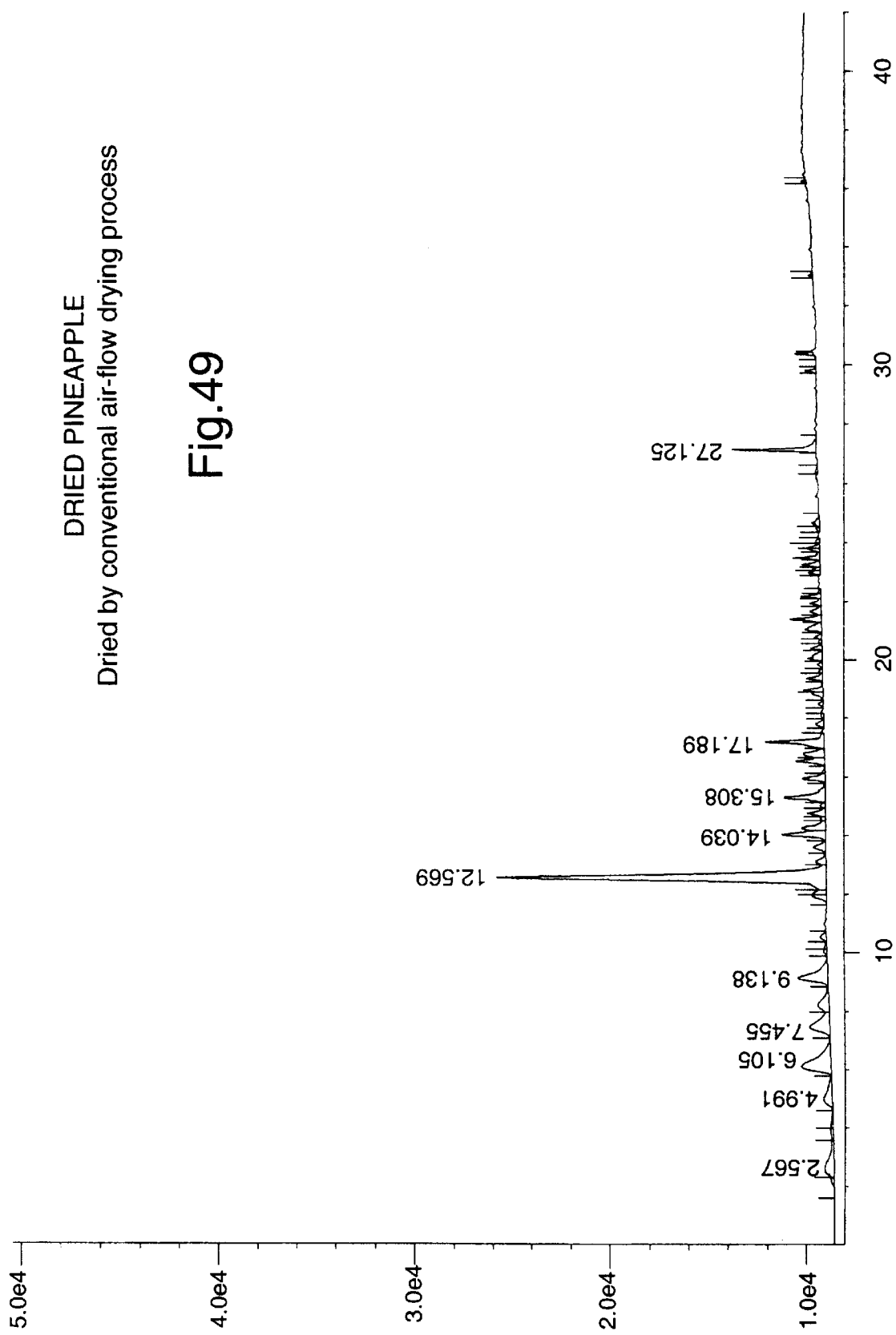
Figure 50:
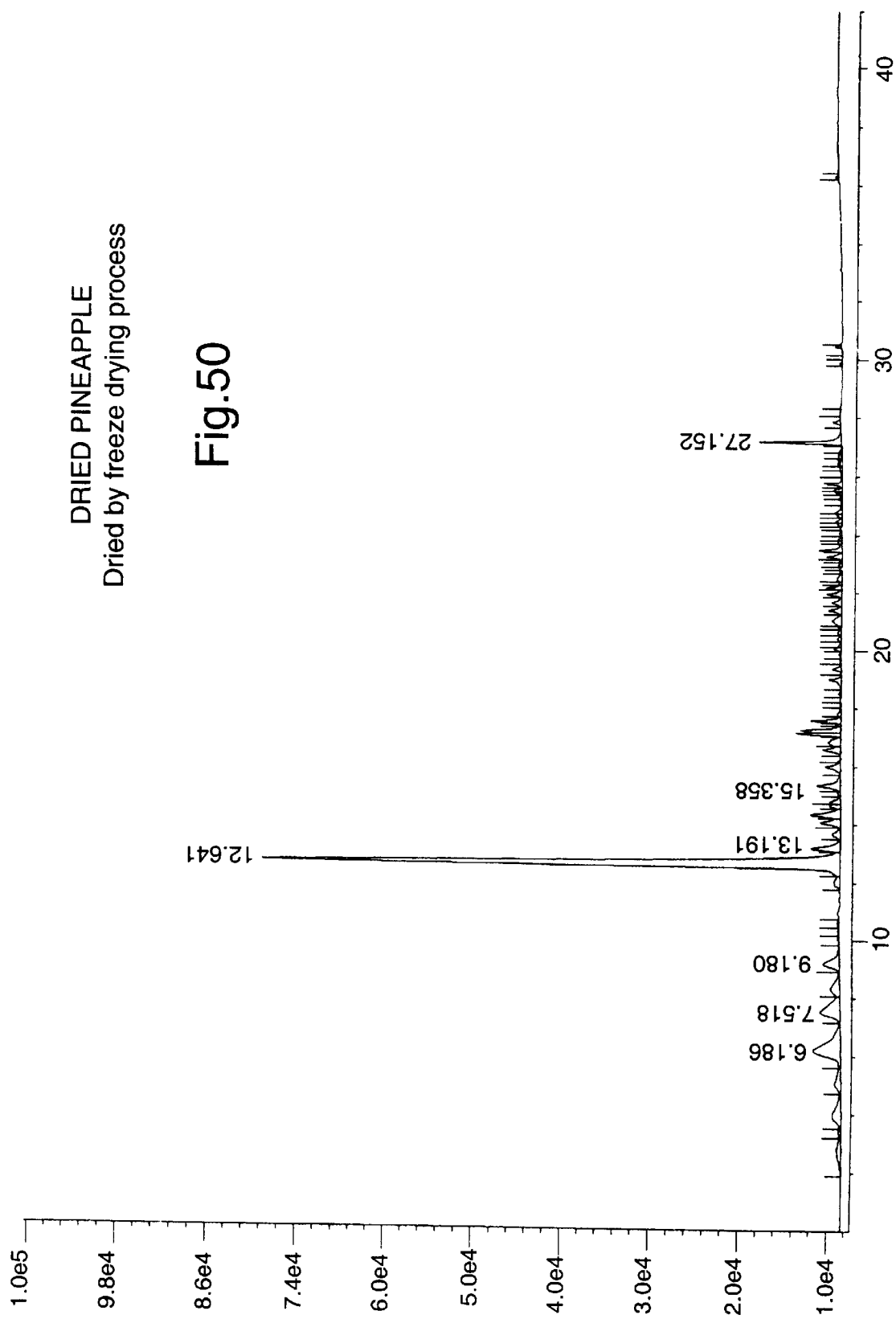
Figure 51:
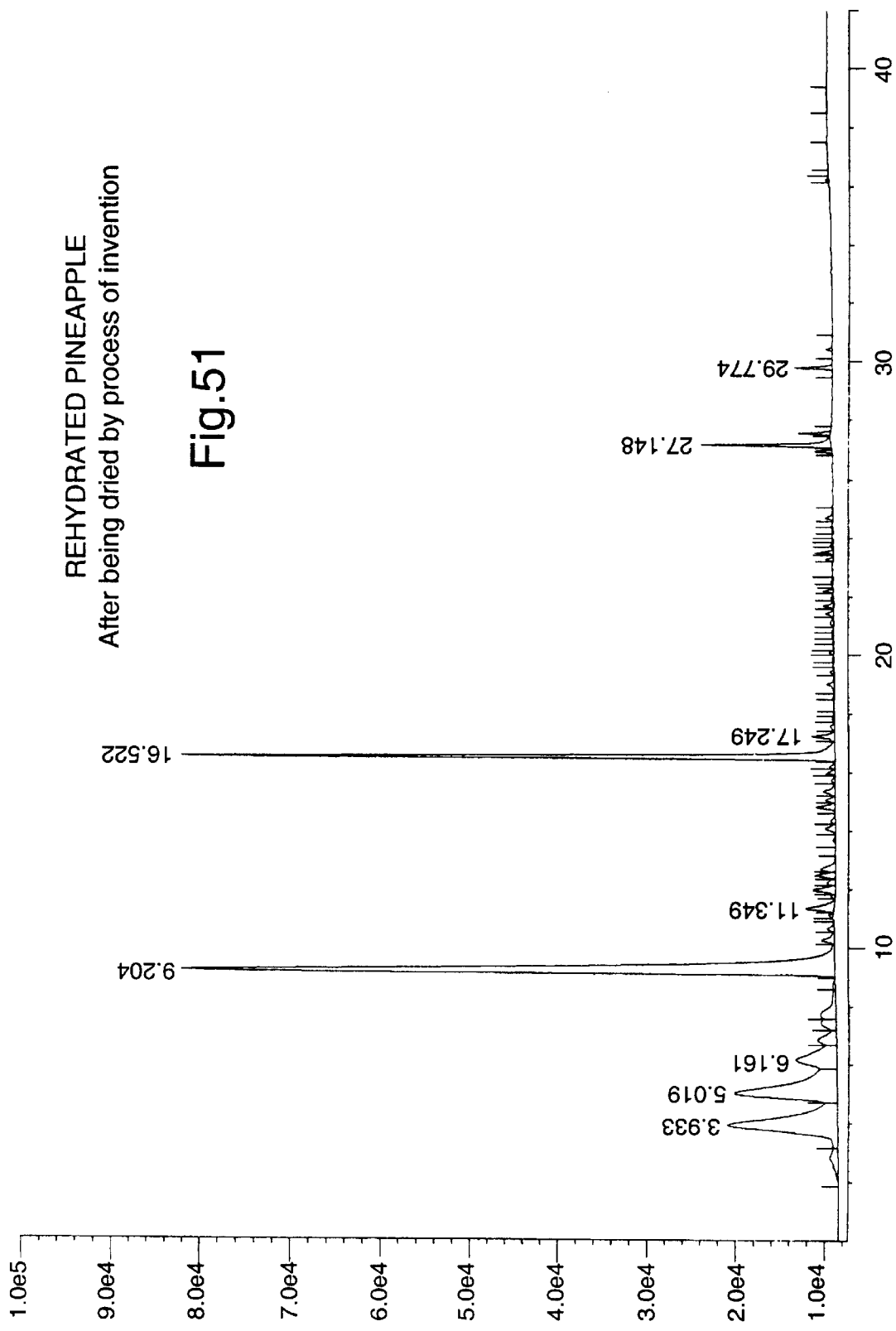
Figure 52:
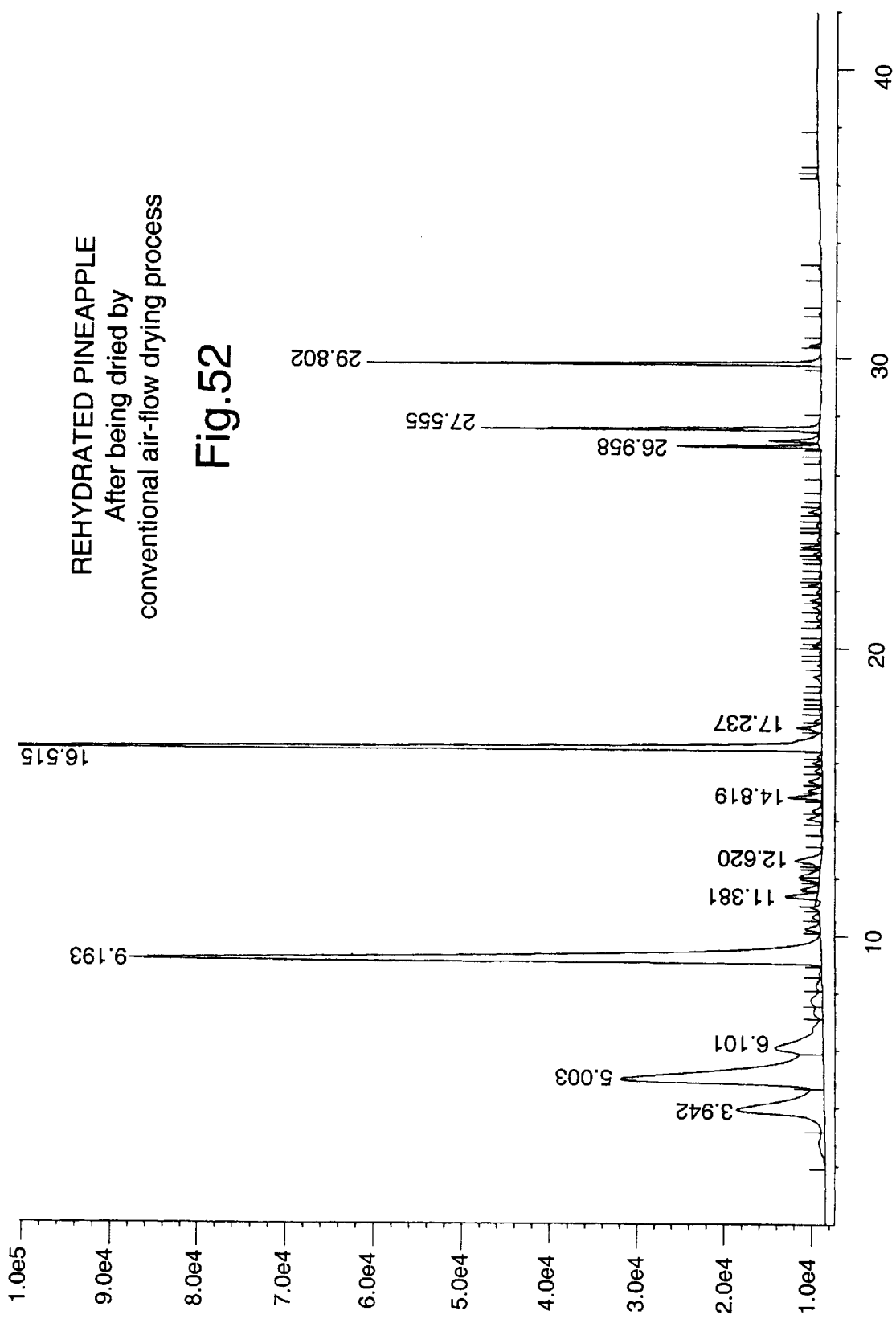
Figure 53:
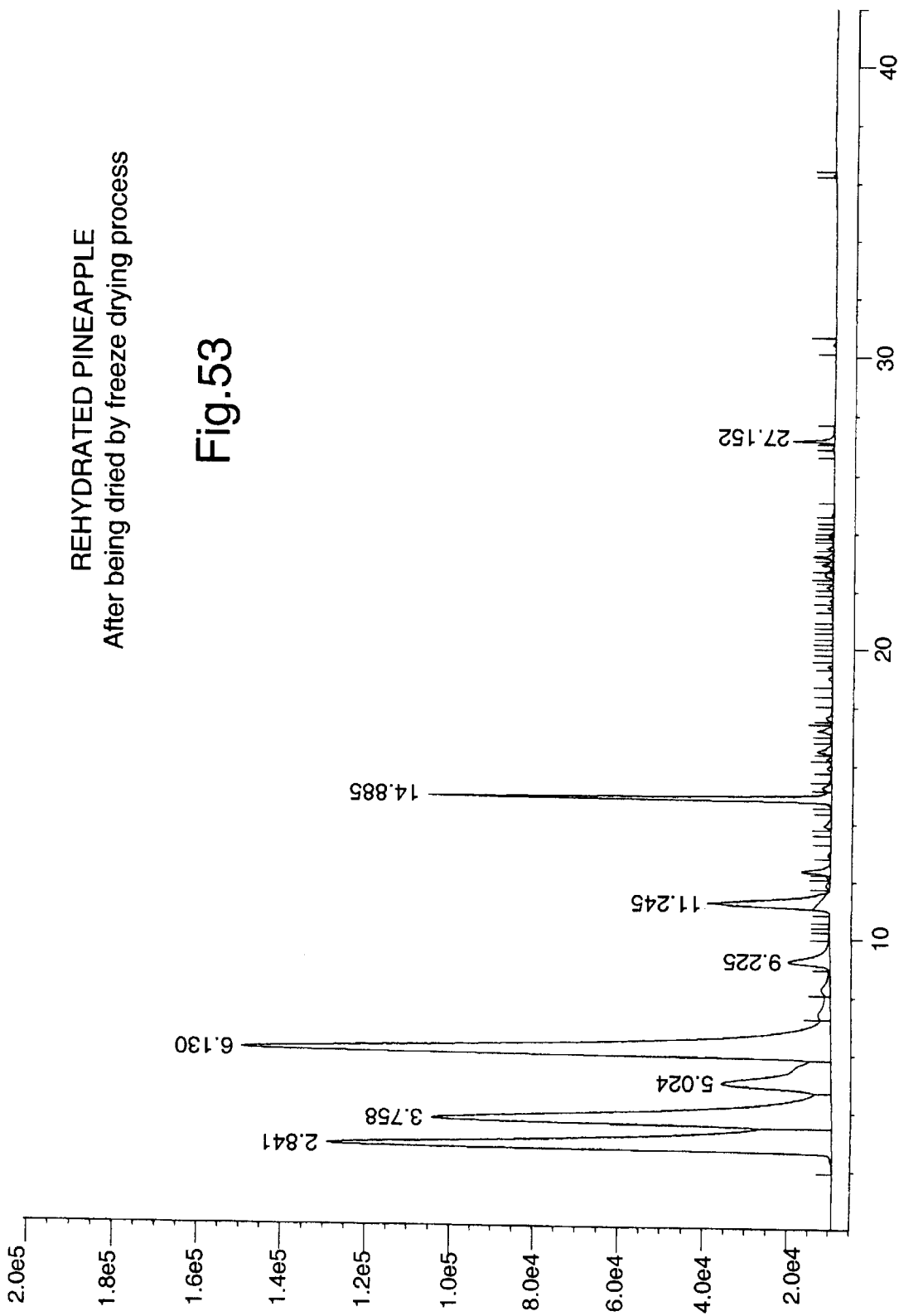

FIGS. 47 to 53 illustrate gas chromatographic traces of pineapple, which correspond to the gas chromatographic traces of FIGS. 8 to 14. In other words, the traces of FIG. 47 is of pineapple prior to drying. The trace of FIGS. 48 to 50 are of pineapple which has been dried by the process according to the invention, the conventional air-flow drying process and the freeze-drying process, respectively, and the traces of FIGS. 51 to 53 are of pineapple which has been rehydrated, prior to having been dried by the process according to the invention, the conventional air-flow drying process and the freeze-drying process, respectively. A comparison between the traces of FIGS. 48 to 53 yields similar conclusions to those drawn from the comparison between the traces of FIGS. 8 to 14 in respect of banana, and furthermore, it can be seen from FIG. 49 that the pineapple dried by the process according to the invention has a prominent gas chromatographic peak at 6.104 minutes retention time.

In the pineapple prior to being dried, the most intense was the fraction up to 40° C., with the compound RT=4.9 (ethyl ethanoate) dominating. In the 40° C. to 100° C. fraction the predominant compounds were RT=7.4 (butanoic acid methyl ester), RT=8.1 (2-methylbutanoic acid methyl ester) and RT=14.0 (hexanoic acid methyl ester). In the dried pineapple which had been dried by the conventional air-flow drying process, the main component was an unidentified compound with RT=12.6, and in the dried pineapple which had been dried by the process according to the invention the main component was ethanol (RT=6.1). The dried pineapple which had been dried by the freeze-drying process contained mainly the compounds with RT=12.6. Following rehydration of the dried product which had been dried by the conventional air-flow drying process and the freeze-drying process, there was an increase in the proportion of compounds belonging to the up to 40° C. fraction. In the case of the rehydrated pineapple which had previously been conventionally air-flow dried, the main compounds were unidentified compounds with RT=9.2 and RT=16.5. Additionally, in the rehydrated pineapple which had been dried by the conventional air-flow drying process there were unidentified compounds belonging to the 150° C. to 200° C. fraction which were characterised by RT=27.6 and RT=29.8.

The main compounds in the rehydrated material which had previously been dried by the freeze-drying process were compounds with RT=2.8, RT=3.8 (ethanoic acid methyl ester), RT=5.0 (ethyl ethanoate), RT=6.1 (ethanol), RT=11.2 and RT=14.9 (3-methylbutanol).

Figure 54:
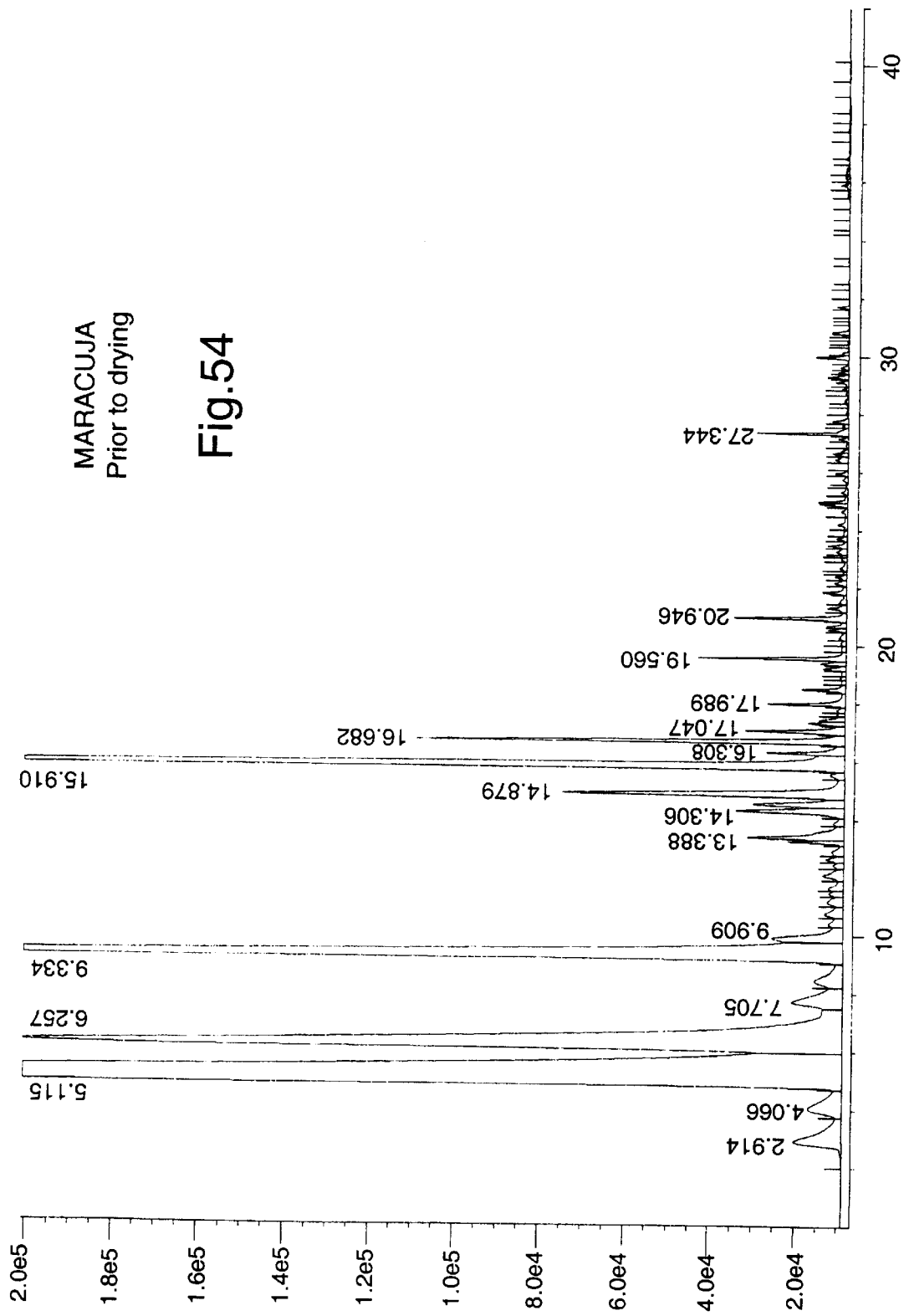
Figure 55:
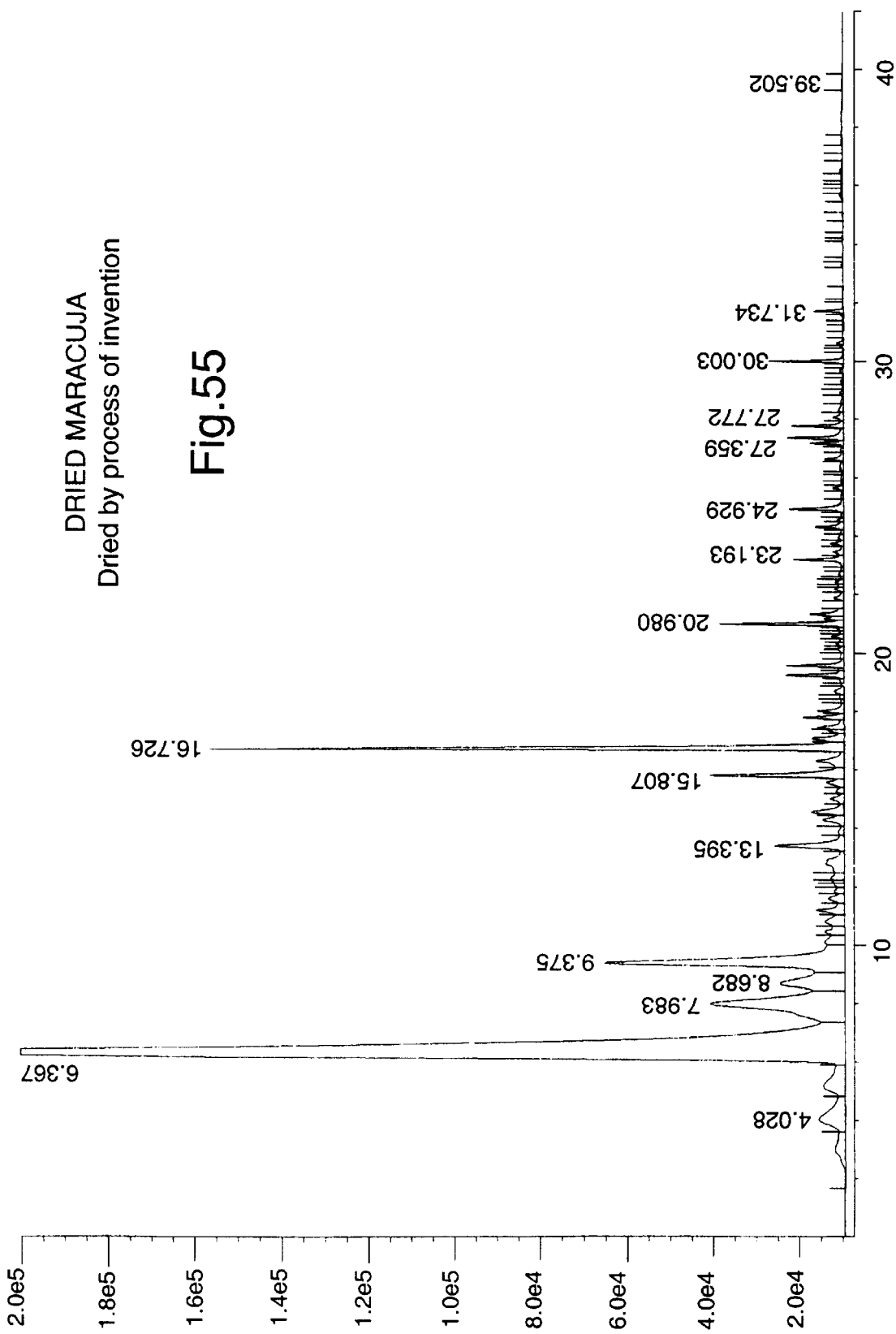
Figure 56:
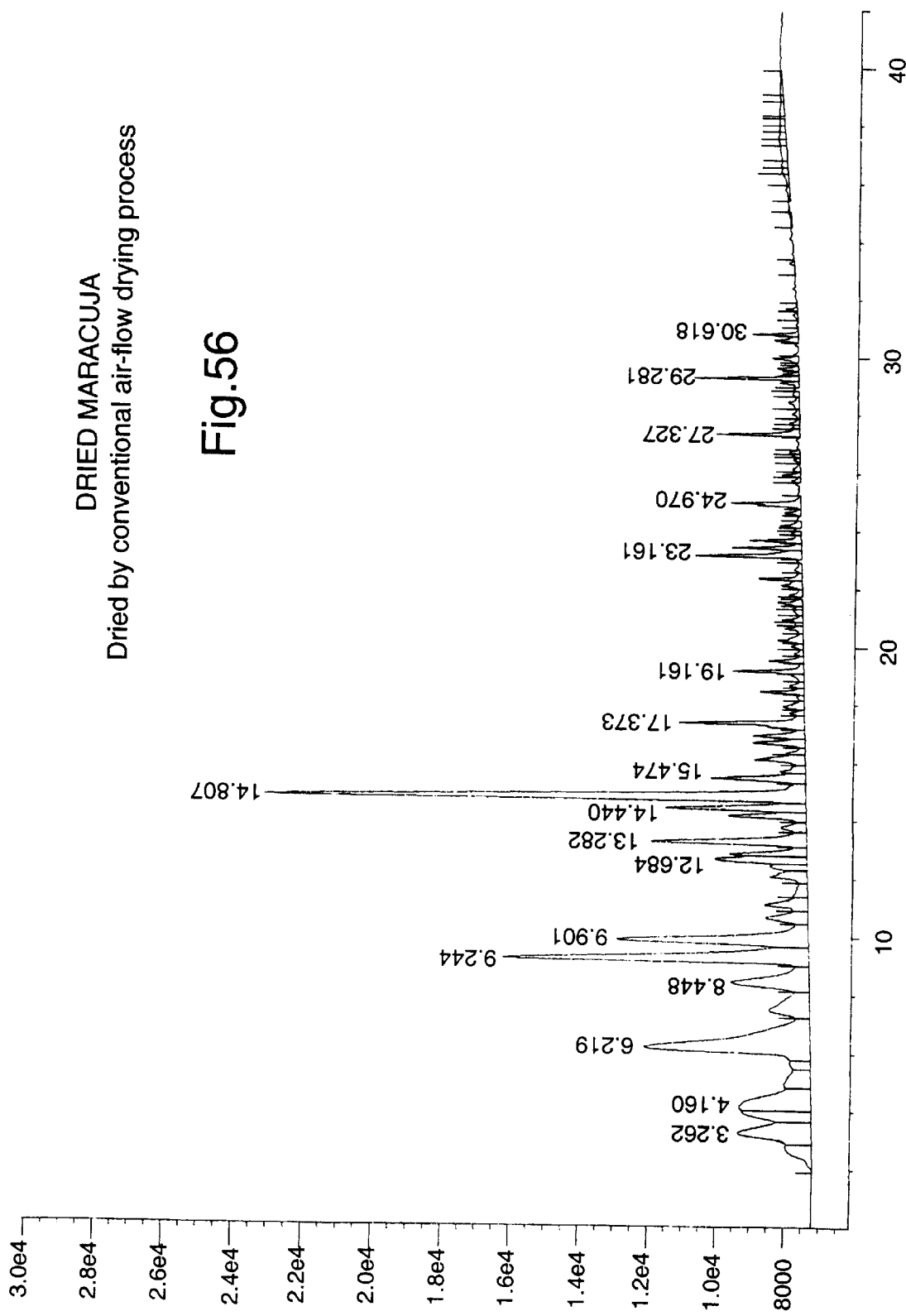
Figure 57:
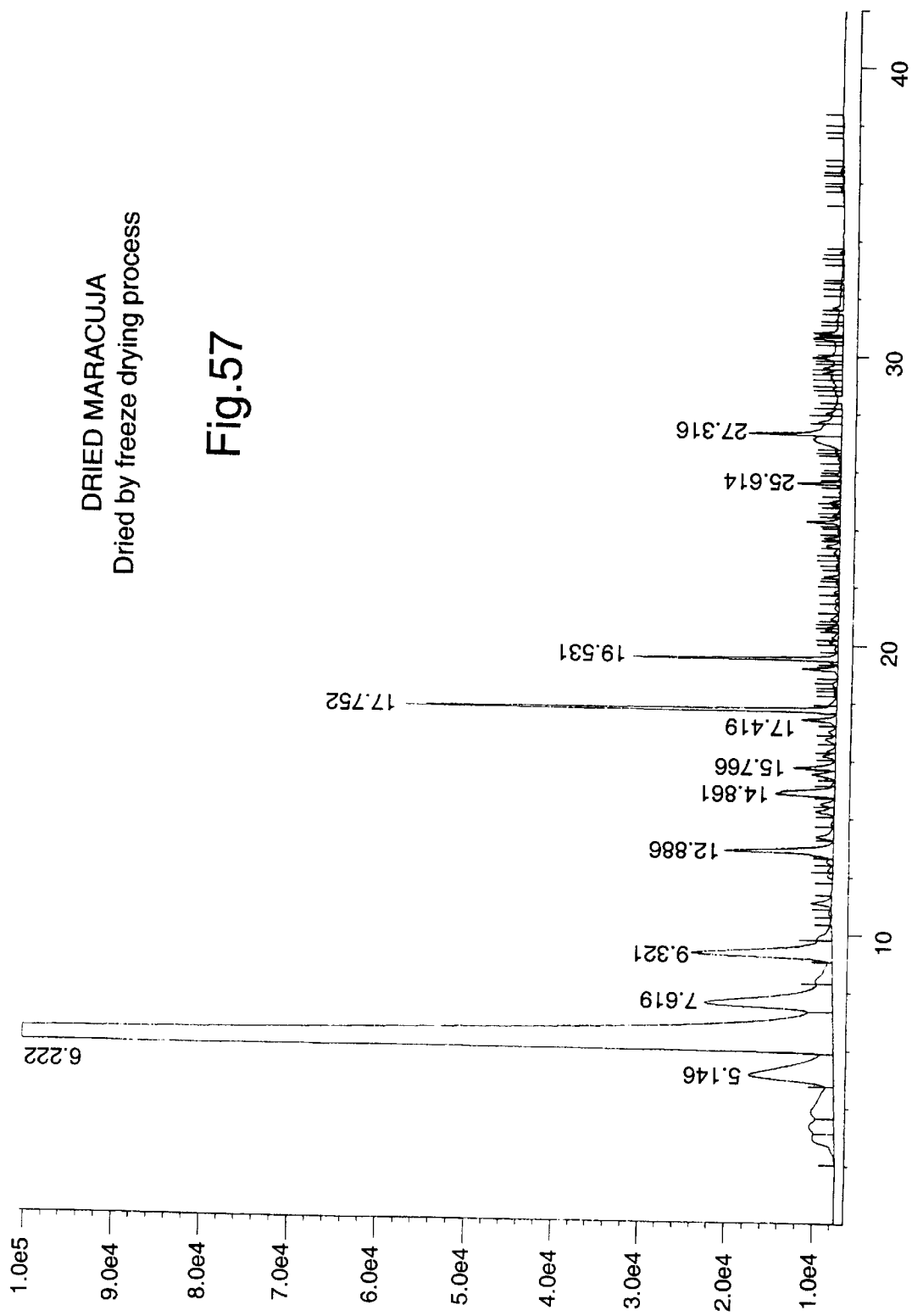
Figure 58:
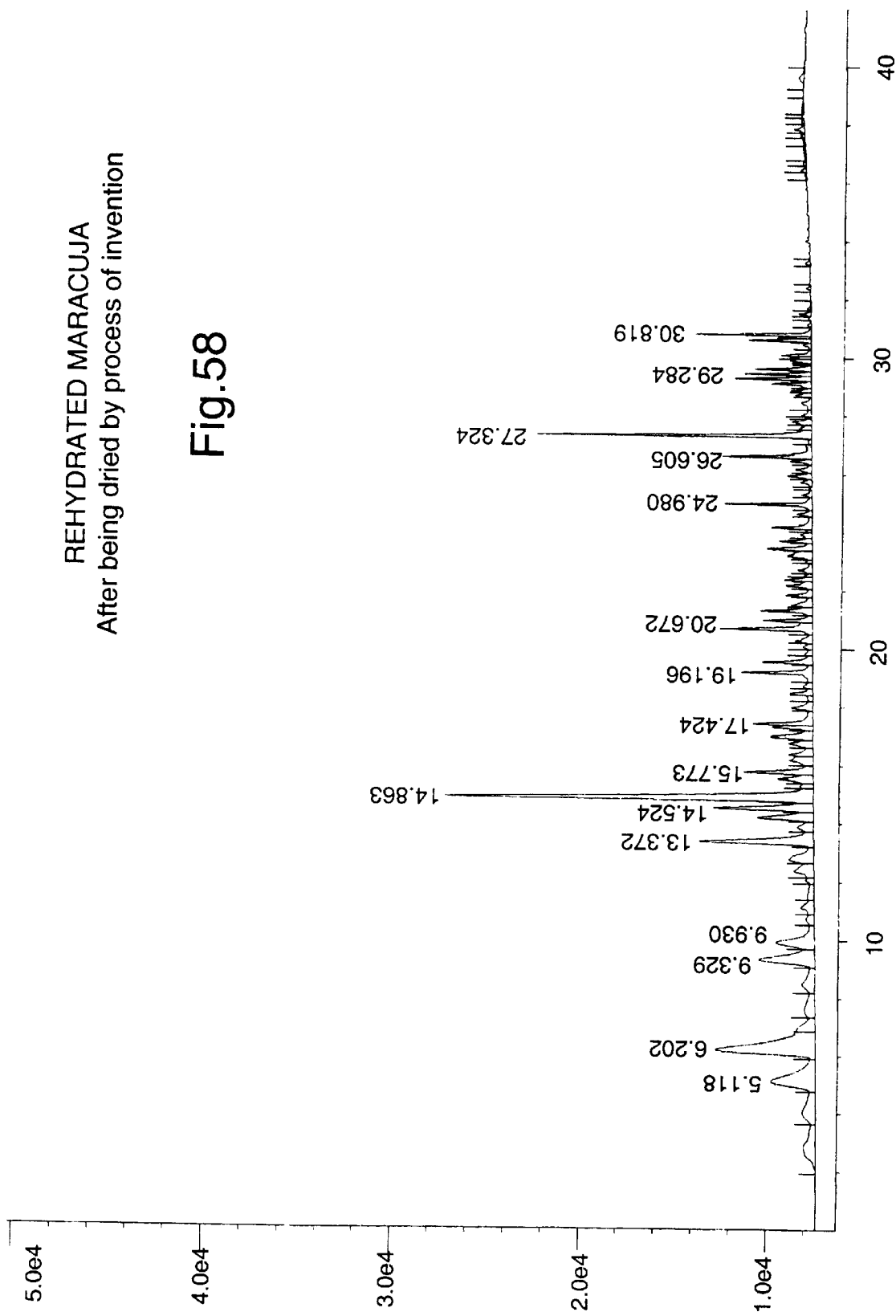

FIGS. 54 to 60 illustrate gas chromatographic traces of maracuja slices, which correspond to the gas chromatographic traces of FIGS. 8 to 14. In other words, FIG. 54 illustrates a trace of the maracuja prior to being dried, FIGS. 55 to 57 illustrate traces of the maracuja dried by the process according to the invention, the conventional air-flow drying process and the freeze-drying process, respectively, and FIGS. 58 to 60 illustrate traces of the maracuja having been rehydrated subsequent to being dried by the process according to the invention, the conventional air-flow drying process and the freeze-drying process, respectively. A comparison process between the traces of FIGS. 55 to 60 yields substantially similar conclusions to those drawn from the comparison of the traces of FIGS. 8 to 14 for banana. Additionally, it can be seen from FIG. 55 that the dried maracuja which was dried by the process according to the invention displays prominent gas chromatographic peaks at 6.367, 7.983, 8.682 and 9.375 minutes retention times.

In the above analysis which has been made with reference to FIGS. 8 to 60 it should be noted that the various compounds which have been identified, have been identified on the basis of the comparison of retention times with reference times, and by relying upon data which is available in the literature. The compound with the retention time of 27.0 which is visible on the gas chromatograph is an octanoic acid ethyl ester, which is used as a reference substance. Additionally, it should be noted that the abbreviation "RT" in the above discussion with reference to FIGS. 8 to 60 indicates "retention time".

The results of the analysis of the volatile compounds using gas chromatography give evidence of the influence of the drying technology on the composition of the level of aromatic compounds in the dried materials. The main fraction of volatile compounds consists of compounds evaporating in the 40° C. to 100° C. range of temperature. In all the dried materials because of the technological processing, a fall in the level of aromatic substances occurs. However, the dried fruits and vegetables which were dried by the process according to the invention have the highest level of aromatic compounds for each of the species of fruits and vegetables. Following rehydration an increase in the content of volatile compounds occurs in the case of mango and pineapple. This is greatest in the case of the mango and pineapple which had been dried by the freeze drying process. An increase in the content of volatile compounds in the rehydrated banana also occurs, and this increase is greatest in the case of the rehydrated banana which had previously been dried by the process according to the invention. At the same time, in the organoleptic rating, the highest level of foreign smell for banana has been observed in rehydrated banana, while in the case of mango and pineapple, the highest level of foreign smell has been found in rehydrated mango and banana which had been previously dried by the freeze drying process.

An assessment of hue was conducted on each fruit and tuber tested, using the test procedure according to the Hunter Colorimeter at L* a* b* is set out in Table 4.

TABLE 4

| Variety of fruit | Material for testing | | Hue according to Hunter Lab | | |
|---|---|---|---|---|---|
| | | | L* | a* | b* |
| Banana | Fresh fruit | | 80.57 | 4.07 | 26.39 |
| | Invention dried | dry | 62.48 | 5.89 | 27.15 |
| | material | rehydrated | 49.37 | 6.21 | 20.20 |
| | Air-flow dried fruit | dry | 68.98 | 5.78 | 28.04 |
| | (not Invention) | rehydrated | 54.03 | 5.81 | 18.79 |
| | Freeze-dried | dry | 86.11 | 2.95 | 14.24 |
| | material | rehydrated | 51.95 | 6.71 | 16.01 |
| Mango | Fresh fruit | | 69.64 | 15.83 | 60.30 |
| | Invention dried | dry | 65.89 | 20.90 | 62.33 |
| | material | rehydrated | 60.74 | 16.88 | 66.91 |
| | Air-flow dried fruit | dry | 77.95 | 16.57 | 67.85 |
| | (not Invention) | rehydrated | 68.39 | 15.14 | 67.89 |
| | Freeze-dried | dry | 83.64 | 10.97 | 43.47 |
| | material | rehydrated | 72.48 | 13.01 | 60.37 |
| Pineapple | Fresh fruit | | 84.52 | 1.51 | 26.63 |
| | Invention dried | dry | 81.50 | 3.88 | 32.67 |
| | material | rehydrated | 78.57 | 0.55 | 31.78 |
| | Air-flow dried fruit | dry | 78.38 | 3.63 | 33.05 |
| | (not Invention) | rehydrated | 79.01 | 0.67 | 29.43 |
| | Freeze-dried | dry | 92.44 | −0.14 | 18.02 |
| | material | rehydrated | 85.78 | −0.75 | 17.90 |
| Papaya | Fresh fruit | | 63.0 | 25.0 | 36.3 |
| | Invention dried | dry | 68.6 | 20.2 | 40.7 |
| | material | rehydrated | 46.0 | 26.3 | 36.4 |
| | Air-flow dried fruit | dry | 68.8 | 21.5 | 45.1 |
| | (not Invention) | rehydrated | 51.9 | 24.1 | 44.0 |
| | Freeze-dried | dry | 78.5 | 12.9 | 24.5 |
| | material | rehydrated | 69.0 | 16.7 | 38.7 |
| Kiwi | Fresh fruit | | 47.2 | −1.9 | 20.5 |
| | Invention dried | dry | 51.0 | 5.9 | 29.7 |
| | material | rehydrated | 47.4 | 3.1 | 25.6 |
| | Air-flow dried fruit | dry | 57.9 | 3.7 | 27.7 |
| | (not Invention) | rehydrated | 55.2 | 0.7 | 24.2 |
| | Freeze-dried | dry | 84.4 | −1.8 | 19.1 |
| | material | rehydrated | 63.9 | 0.0 | 25.7 |
| Maracuja | Fresh fruit | | 44.2 | 7.6 | 30.7 |
| | Invention dried | dry | 44.3 | 13.2 | 36.4 |
| | material | rehydrated | 43.7 | 7.5 | 30.0 |
| | Air-flow dried fruit | dry | 30.5 | 8.6 | 13.2 |
| | (not Invention) | rehydrated | 34.5 | 9.5 | 30.9 |
| | Freeze-dried | dry | 72.1 | 11.9 | 46.7 |
| | material | rehydrated | 49.7 | 7.1 | 34.3 |
| Ginger | Fresh fruit | | 68.9 | 1.3 | 33.4 |
| | Invention dried | dry | 58.2 | 3.0 | 18.6 |
| | material | rehydrated | 63.4 | 3.9 | 32.0 |
| | Air-flow dried fruit | dry | 69.9 | 1.1 | 19.0 |
| | (not Invention) | rehydrated | 62.3 | 4.8 | 33.3 |
| | Freeze-dried | dry | 83.3 | −2.0 | 22.0 |
| | material | rehydrated | 67.3 | 3.5 | 34.1 |

The dry mass content of each fruit and tuber tested was evaluated by desiccating samples to substantially total dryness. The results are shown in Table 5. The table shows that for the majority of fruits tested, the products dried by the four phase process of the invention could be rehydrated to a water content closer to the water content of the product prior to being dried, than could product dried by the other two drying processes. The ability ofta dried product to be rehydrated to a state approaching that of the product prior to being dried is an indication of the retention of the properties of that product which it had prior to being dried.

TABLE 5

| Variety of fruit | Material for testing | | Dry Substance [%] |
|---|---|---|---|
| Banana | Fresh fruit | | 24.60 |
| | Invention dried | dry | 92.76 |
| | material | rehydrated | 10.35 |

TABLE 5-continued

| Variety of fruit | Material for testing | | Dry Substance [%] |
|---|---|---|---|
| | Air-flow dried fruit (not Invention) | dry | 94.52 |
| | | rehydrated | 16.26 |
| | Freeze-dried material | dry | 95.80 |
| | | rehydrated | 15.46 |
| Mango | Fresh fruit | | 18.90 |
| | Invention dried material | dry | 93.16 |
| | | rehydrated | 8.78 |
| | Air-flow dried fruit (not Invention) | dry | 93.69 |
| | | rehydrated | 6.80 |
| | Freeze-dried material | dry | 95.14 |
| | | rehydrated | 7.94 |
| Pineapple | Fresh fruit | | 13.00 |
| | Invention dried material | dry | 93.58 |
| | | rehydrated | 5.41 |
| | Air-flow dried fruit (not Invention) | dry | 95.06 |
| | | rehydrated | 5.34 |
| | Freeze-dried material | dry | 94.62 |
| | | rehydrated | 5.62 |
| Papaya | Fresh fruit | | 9.69 |
| | Invention dried material | dry | 92.35 |
| | | rehydrated | 5.40 |
| | Air-flow dried fruit (not Invention) | dry | 93.49 |
| | | rehydrated | 4.33 |
| | Freeze-dried material | dry | 94.95 |
| | | rehydrated | 5.23 |
| Kiwi | Fresh fruit | | 16.75 |
| | Invention dried material | dry | 92.34 |
| | | rehydrated | 12.45 |
| | Air-flow dried fruit (not Invention) | dry | 93.86 |
| | | rehydrated | 11.14 |
| | Freeze-dried material | dry | 96.43 |
| | | rehydrated | 12.26 |
| Maracuja | Fresh fruit | | 22.13 |
| | Invention dried material | dry | 92.12 |
| | | rehydrated | 18.51 |
| | Air-flow dried fruit (not Invention) | dry | 94.79 |
| | | rehydrated | 19.85 |
| | Freeze-dried material | dry | 94.76 |
| | | rehydrated | 24.54 |
| Ginger | Fresh fruit | | 29.51 |
| | Invention dried material | dry | 94.48 |
| | | rehydrated | 20.50 |
| | Air-flow dried fruit (not Invention) | dry | 93.14 |
| | | rehydrated | 19.28 |
| | Freeze-dried material | dry | 96.62 |
| | | rehydrated | 17.02 |

Measurements of water activity of the above dried fruits and tubers have been taken and the results are presented in Table 6. The measurements of water activity were taken using a water activity meter AW-THERM 40 with automatic temperature compensation.

TABLE 6

| Variety of fruit | Materials for test | Water activity |
|---|---|---|
| Banana | Invention dried material | 0.392 |
| | Air-flow dried fruit (not invention) | 0.374 |
| | Freeze-dried material | 0.223 |
| Mango | Invention dried material | 0.410 |
| | Air-flow dried fruit (not invention) | 0.355 |
| | Freeze-dried material | 0.237 |
| Pineapple | Invention dried material | 0.362 |
| | Air-flow dried fruit (not invention) | 0.337 |
| | Freeze-dried material | 0.306 |
| Papaya | Invention dried material | 0.347 |
| | Air-flow dried fruit (not invention) | 0.301 |
| | Freeze-dried material | 0.267 |
| Kiwi | Invention dried material | 0.330 |
| | Air-flow dried fruit (not invention) | 0.294 |
| | Freeze-dried material | 0.144 |
| Maracuja | Invention dried material | 0.333 |
| | Air-flow dried fruit (not invention) | 0.309 |
| | Freeze-dried material | 0.169 |
| Ginger | Invention dried material | 0.298 |
| | Air-flow dried fruit (not invention) | 0.345 |
| | Freeze-dried material | 0.099 |

Ascorbic acid content of the above dried fruits and tubers tested is presented in Table 7.

The ascorbic acid presence was tested using the HPLC method, Supelco LC—18 column, with the solvent 1% $KHPO_4$, pH-3, the rate of flow=0.8 ml/min. The detection was conducted at a wavelength of 243 nm.

A representative sample of the material was taken, which was homogenized in 6% metaphosphoric acid, and then filtered. From the solution that was obtained, phenol compounds were removed on the C-18 column and then the solution was subjected to the HPLC chromatography analysis. The retention time of ascorbic acid was equal to 6.31 min. In the tested range of ascorbic acid content, (from 0.2 to 1.5 mg of ascorbic acid in 100 ml of solution prepared for injection) the square of the correlation of the content of ascorbic acid in the reference solutions and the surface areas of the peak equalled to 0.9998.

TABLE 7

| | | Ascorbic acid content | | |
|---|---|---|---|---|
| Variety of fruit | Material for testing | [mg/100 g] | [mg/100 g dry mass] | [%] |
| Banana | Fresh fruit | 5.8 | 23.6 | 100.0 |
| | Invention dried material | 3.2 | 3.4 | 14.4 |
| | Air-flow dried fruit (not invention) | 0.5 | 0.5 | 0.2 |
| | Freeze-dried material | 3.0 | 3.2 | 13.5 |
| Mango | Fresh fruit | 21.3 | 112.7 | 100.0 |
| | Invention dried material | 103.3 | 110.9 | 98.4 |
| | Air-flow dried fruit (not invention) | 93.8 | 98.6 | 87.5 |
| | Freeze-dried material | 87.7 | 90.2 | 80.0 |
| Pineapple | Fresh fruit | 32.7 | 251.6 | 100.0 |
| | Invention dried material | 217.6 | 232.5 | 92.4 |
| | Air-flow dried fruit (not invention) | 198.9 | 210.2 | 83.5 |
| | Freeze-dried material | 239.2 | 246.5 | 97.9 |
| Papaya | Fresh fruit | 44.6 | 460.0 | 100.0 |
| | Invention dried material | 392.1 | 413.7 | 89.9 |
| | Air-flow dried fruit (not invention) | 405.2 | 433.4 | 94.2 |
| | Freeze-dried material | 417.8 | 435.8 | 94.7 |
| Kiwi | Fresh fruit | 104.4 | 623.1 | 100.0 |
| | Invention dried material | 574.0 | 621.6 | 99.8 |
| | Air-flow dried fruit (not invention) | 459.9 | 499.1 | 80.1 |
| | Freeze-dried material | 549.1 | 569.5 | 91.4 |

TABLE 7-continued

|  |  | Ascorbic acid content | | |
|---|---|---|---|---|
| Variety of fruit | Material for testing | [mg/100 g] | [mg/100 g dry mass] | [%] |
| Maracuja | Fresh fruit | 13.0 | 58.7 | 100.0 |
|  | Invention dried material | 38.9 | 42.2 | 72.0 |
|  | Air-flow dried fruit (not invention) | 2.5 | 2.6 | 4.4 |
|  | Freeze-dried material | 48.4 | 50.5 | 86.0 |

Of the above fruits and tubers, a comparison has been made of the content of b-carotene and carotenoids, and the level of nitrates and nitrites for banana, mango and pineapple. The result of the comparison are shown in Table 8. The analytical methods used were as follows:

carotenolds and b-carotene—method described by Czapski and Saniewski, Experimentia, 39, 1373–1374, 1983;

nitrates—potentiometric method, using the ORION apparatus;

nitrites—spectrophotometry method, according to Polish standard PN-92 A-75112.

TABLE 8

|  |  | [mg/100 g D.W.] | | | |
|---|---|---|---|---|---|
| Variety of fruits | Material for testing | b-carotene | sum of all carotenoids | nitrates | nitrates |
| Banana | Fresh fruit | 275 | 393 | 350 | <100 |
|  | Invention dried material | 255 | 487 | 330 |  |
|  | Air-flow dried fruit (not invention) | 389 | 845 | 310 |  |
|  | Freeze-dried material | 383 | 547 | 270 |  |
| Mango | Fresh fruit | 330 | 875 | 105 | <100 |
|  | Invention dried material | 371 | 734 | 110 |  |
|  | Air-flow dried fruit (not invention) | 402 | 927 | 100 |  |
|  | Freeze-dried material | 418 | 961 | 105 |  |
| Pineapple | Fresh fruit | 326 | 131 | 145 | <100 |
|  | Invention dried material | 364 | 645 | 140 |  |
|  | Air-flow dried fruit (not invention) | 291 | 558 | 150 |  |
|  | Freeze-dried material | 300 | 594 | 140 |  |

Table 9 shows the results of texture tests on the slices of the above fruits and tubers, with the exception of maracuja (passion fruit). Each result is an average of at least 20 measurements. The measurements of the penetration force and the Young's modulus were performed using the structural solidity meter Instron 4303 with a sensor having a radius of 3.7 mm. To make the measurements, the perforation of a slice of a given material was placed between two plates with holes having a radius of 16.7 m.

As can be seen from Table 9, most of the products dried by the dehydration process according to the invention have a Young's modulus comprised between 0.11 MPa and about 0.20 MPa.

TABLE 9

| Variety of fruit | Material for testing | Penetration Force [N] | Apparent Young's modulus [MPa] |
|---|---|---|---|
| Banana | Fresh fruit | 0.31 | 0.031 |
|  | Invention dried material | 9.79 | 0.138 |
|  | Air-flow dried fruit (not invention) | 12.49 | 0.238 |
|  | Freeze-dried material | 7.14 | 0.387 |
| Mango | Fresh fruit | 0.54 | 1.004 |
|  | Invention dried material | 10.95 | 0.175 |
|  | Air-flow dried fruit (not invention) | 12.32 | 0.231 |
|  | Freeze-dried material | 10.00 | 0.311 |
| Pineapple | Fresh fruit | 1.80 | 0.013 |
|  | Invention dried material | 11.94 | 0.119 |
|  | Air-flow dried fruit (not invention) | 7.90 | 0.106 |
|  | Freeze-dried material | 8.74 | 0.235 |
| Papaya | Fresh fruit | 0.395 | 0.0095 |
|  | Invention dried material | 7.392 | 0.2239 |
|  | Air-flow dried fruit (not invention) | 7.171 | 0.1382 |
|  | Freeze-dried material | 5.207 | 0.2970 |
| Kiwi | Fresh fruit | 0.624 | 0.0045 |
|  | Invention dried material | 10.280 | 0.1265 |
|  | Air-flow dried fruit (not invention) | 9.782 | 0.0953 |
|  | Freeze-dried material | 11.075 | 0.2534 |
| Ginger | Fresh fruit | 12.130 | 0.0875 |
|  | Invention dried material | 17.570 | 1.0240 |
|  | Air-flow dried fruit (not invention) | 20.100 | 0.5468 |
|  | Freeze-dried material | 9.077 | 0.3866 |

Evaluation of the Organoleotic Test Results

Banana

The banana slices dried by the four phase process of the invention and the conventional air-flow dried slices received similar ratings, both higher than the ratings for the freeze-dried banana slices, for the presence of typical banana flavour and the absence of off-flavour. The slightly different overall rating for the conventional air-flow dried material is the result of its greater hardness, caused by its having been dried to a water content level of 5.5% (v. 7.2% for the material dried in accordance with the invention). Banana slices dried in accordance with the invention were much less brittle than the other dried products tested. In addition, the hue of the banana slices dried in accordance with the invention was closer than the hue of the freeze-dried banana slices to the hue of the banana slices prior to drying.

Following rehydration, because of a comparable water-absorption capacity (cf. Table 6), the materials dried in accordance with the invention and conventional air-flow dried material reached a similar level of hardness. At the same time, the freeze-dried and the conventional air-flow dried materials were characterised by a high degree of browness and a strongly perceptible foreign smell and taste after rehydration. They were rated as unpalatable, with an unnatural hue and smell. The hue ratings are confirmed in the colour parameter measurements according to the Hunter scale (Table 4).

Mango

The conventional air-flow dried material received the highest rating for mango smell with the lowest level of foreign smell, slightly higher than the rating for material dried in accordance with the invention. Like the freeze-dried material, the conventional air-flow dried material was characterised by a low degree of browness, comparable to that of the mango prior to drying. The conventional air-flow dried material and the material dried in accordance with the invention received similar hardness ratings, reflecting the nearly equal water content (6.3% and 6.8% respectively). The product dried in accordance with the invention had a much lower degree of brittleness.

Following rehydration, the differences between the various dried materials became more noticeable. Thus, the material dried using conventional air-flow drying had a higher level of foreign smell and taste after rehydration, in addition to being harder and lighter in colour than the material dried in accordance with the invention. The rehydrated freeze-dried material, while retaining a light hue comparable to that of the mango prior to drying, was characterised by a particularly high level of foreign smell and taste.

Pineapple

Of the dried pineapples tested, the pineapple dried in accordance with the invention was characterised by the highest organoleptic ratings (Table 2c). In particular, it had an exceptionally strong pineapple smell, similar to that for pineapple prior to drying, with almost no foreign smell. In addition, it was characterised by low brittleness.

Slices of rehydrated pineapple which had been dried in accordance with the invention were characterised by a hardness close to that of the slices of pineapple prior to drying. This feature is important in the use of dried fruit for the production of breakfast mixtures to which liquids, for example, milk are normally added. Also in those slices of pineapple which were rehydrated after being dried in accordance with the invention, the most intense pineapple aroma was recorded. The highest level of foreign smell, as in the case of mango, was noticed in the rehydrate obtained from the freeze-dried material. These results are in line with those acquired from the analysis of volatile compounds as shown in FIGS. 9 and 12.

Kiwi

Kiwi slices dried in accordance with the invention had low brittleness and a high level of kiwi flavour retention. The freeze-dried material also had a high level of kiwi flavour retention, but was otherwise light in colour and brittle.

After rehydration, the structure became too soft and a strong off-flavour and odour developed in the freeze-dried and conventionally air-flow dried materials. The kiwi dried in accordance with the invention was superior to all others tested in colour retention and was rated substanti ally better than the others in flavour and odour after rehydration.

Papaya

The papaya slices dried by conventional air-flow drying received generally average rankings, while after rehydration it received low rankings. Papaya dried in accordance with the invention displayed higher intensity of taste-flavour compounds typical for papaya prior to drying, and the lowest presence of foreign taste and off-flavour. The freeze-dried material received higher rankings in general in the dry state, compared to conventional air-flow dried material, while after rehydration the density of compounds responsible for undesirable taste and odour significantly increased. All papaya fruit products, both in dry form and after rehydration, displayed fair colour with no indication of browning. The rehydrated papaya which had been dried in accordance with the invention received substantially higher rankings than the papaya dried using the other processes.

Ginger

The freeze-dried ginger slices displayed fair colour and a high degree of brittleness. The highest level of ginger flavour with almost no foreign smell was observed in material dried in accordance with the invention. Relatively good quality was ndisplayed by the conventional air-flow dried material except for significant browning which was reflected in the hue evaluation and the general quality ranking. In all dried products, the density of volatile compounds giving the typical ginger fragrance decreased after rehydration, while the intensity of foreign odour returned to the level typical for ginger prior to drying. The rehydrated ginger which had been dried in accordance with the invention received a slightly higher overall rating compared to the rehydrated ginger which had been dried according to the other techniques.

Hue

Table 4 presents the colour coordinates determined in the Hunter $L^*a^*b^*$ apparatus for various materials before and after drying. The materials dried in accordance with the invention exhibited superior colour retention and colour stability after rehydration in all cases.

Other Observations

Capacity for Rehydration

The highest capacity for water absorption (rehydration) was shown by the dried papaya and ginger dried in accordance with the invention. In the case of the kiwi, the conventionally air-flow dried material had a slightly higher rehydration capacity than the material dried in accordance with the invention. The freeze-dried material of the various fruits and tubers tested indicated the lowest levels of rehydration capacity compared to the others.

Water Activity

The water activity measurements (Table 6) indicate that all the tested dried materials were completely protected against microbiological deterioration. Thus, these materials would not require any additional treatment to ensure preservation, other than packaging because of their high hygroscopicity. The pineapple dried in accordance with the invention had the highest water activity value, which is in line with the dry mass measurements and the organoleptic assessments. The water activity value for all of the tested materials dried in accordance with the invention were less than 0.41, which indicates that they were completely protected against microbiological decomposition.

Ascorbic Acid Content

The results of tests for the presence of ascorbic acid in the materials before and after drying can be found in Table 7. For the mango and the pineapple dried in accordance with the invention, there were only insignificant losses of vitamin C during processing. Thus, the mango dried in accordance with the invention retained approximately 98% of the vitamin C content of the mango prior to drying. Similarly, the pineapple dried in accordance with the invention retained 92%. The mango and pineapple slices dried by conventional air-flow drying exhibited greater losses of vitamin C, 20% for the mango and 16% for the pineapple. A comparison of the vitamin C losses in the materials dried in accordance with the invention and freeze-dried materials allows one to conclude that the proportion of vitamin C preserved in the former is exceptionally high.

Because bananas contain a very high level of native enzymes from the group of oxidases, drying brought about a very strong fall in the content of ascorbic acid. The highest preservation rate of ascorbic acid (about 15%) was found in the bananas dried in accordance with the invention. For the freeze-dried bananas, the preservation rate was about 14%. The conventionally air-flow dried bananas had a vitamin C loss in the range of 98%, meaning that there was nearly complete destruction of the vitamin C in that material.

The kiwi dried in accordance with the invention had practically no ascorbic acid losses. In the freeze-dried kiwi, 80% of the vitamin C was preserved.

Presence of Carotenoids and of Beta-carotene

The results of the tests, given in Table 8, indicate that all species of materials tested retain a similar high level of b-carotene and carotenoids. Thus, each of the drying processes results in a small loss of these elements. Pineapple dried in accordance with the invention demonstrated superior results in the retention of b-carotene.

Level of Nitrates and Nitrites

The level of nitrates and nitrites in the fresh and dried materials tested is below the accepted maximum value given by FAO/World Health Organisation and the Polish National Hygiene Office. With respect to the presence of the above mentioned compounds in these materials, they can be considered completely acceptable for consumption by adults and children.

Composite Products Using Materials Dried in Accordance with the Invention

Materials dried in accordance with the invention can be added to composite food preparations. For example, dried apple or banana slices may be added to a mixture to be baked for making a cake. Dried fruit slices as such or dried fruits in powder form may also be advantageously used as additives to sugar syrup, jams, marmalades, yogurt, sauces, for example, salad dressing, gelatinous products, for example, a mixture of dry gelatine and dried particles of fruits or herbs, and so on.

After drying, herbs, spices, vegetables and the like are advantageously cut into small particles and are possibly mixed with salts or other seasoning materials.

Use of the Inventive Processes as a Pre-treatment

Tests made on various dried materials, for example, apple slices, have shown that the product of the invention had a higher vitamin C content than freeze-dried apple slices. Because of this high retention of vitamin C content, the process of the invention can be used as a prior treatment so as to increase the concentration of the structural components of the material being dried, including vitamin C content, and to increase the efficiency of another process for which the material is to be used, without significant degradation of those components. The process of the invention can therefore be used, for example, for the drying of a culture medium containing microorganisms so as to have dried material with a higher concentration of the component sought in the process.

Processes according to other embodiments of the invention can also be carried out by means of the apparatus shown in FIG. 1, and this will be readily apparent to those skilled in the art.

While the apparatus of FIG. 1 which has been described for carrying out the dehydration process according to the invention, provides for carrying out the dehydration processes of the invention as batch processes, it will be readily apparent to those skilled in the art that other suitable apparatus may be provided so that the processes according to the invention may be carried out as continuous processes.

It is also envisaged that it is not essential that the same drying medium, subject to the addition of fresh drying medium be used in the complete drying process. For example, it is envisaged that the product may be conveyed on a production line through a number of different drying chambers in which different drying media would be used. However, in such cases, the temperature and relative humidity of the drying media in general, would be regulated in the various drying chambers so that the change in drying medium temperature and relative humidity to which the product is subjected in the transition from one drying chamber to another would be gradual, and would be substantially similar to that already described with reference to FIGS. 6 and 7. Furthermore, it is envisaged that where the product is transferred from one drying chamber to another in a drying process, the drying medium may be circulated a number of times through the respective drying compartments, and then may subsequently be circulated to the next drying chamber in sequence.

It will of course be appreciated that the dehydrating processes for dehydrating various fruits and tubers which have been described above may be varied without departing from the scope of the invention. The examples of the inventive drying process described have been given purely for the purpose of describing the best method known for carrying out the process according to the invention.

What is claimed is:

1. A process for dehydrating a product by urging a gaseous drying medium into contact with the product in a chamber, wherein the temperature and relative humidity of the drying medium are controlled so that the rate of water removal from the product is such as to minimize damage to the cellular structure of the product during the drying process, the process comprising the steps of:

permitting the relative humidity of the drying medium in the chamber to rise to a maximum value which lies within the range of 30% to 70%;

maintaining the relative humidity of the drying medium in the chamber substantially constant at the maximum value, or permitting the relative humidity of the drying medium in the chamber to only gradually decrease by maintaining the relative humidity of the drying medium being delivered to the chamber substantially constant, until the relative humidity of the drying medium in the chamber commences to fall or commences to fall at an increasing rate; and permitting the relative humidity of the drying medium in the chamber to fall off relatively rapidly after the fall in relative humidity of the drying medium in the chamber has commenced or the rate of fall of the relative humidity of the drying medium in the chamber has commenced to increase, until the water content of the product is approaching the desired water content and the rate of evaporation of water from the product becomes substantially independent of the drying medium, and then controlling the relative humidity of the drying medium to approach a predetermined value of relative humidity which provides the product dried to the desired water content, the predetermined value of relative humidity being in the range of 20% to 40% lower than the equilibrium relative humidity of the product which corresponds to the desired water content of the product.

2. A process as claimed in claim 1 in which on the rate of evaporation of water from the product becoming substantially independent of the drying medium, the relative humidity of the drying medium is controlled to asympototically approach the predetermined value of relative humidity.

3. A process as claimed in claim 2 in which the relative humidity of the drying medium is maintained substantially at the predetermined value of relative humidity for a time period in the range of 30 minute to 120 minutes.

4. A process as claimed in claim 2 in which during the period while the relative humidity of the drying medium in the chamber is asymptotically approaching the predetermined value of relative humidity fresh drying medium is introduced at a rate of not more than 5% by weight of the mass flow rate of the drying medium.

5. A process as claimed in claim 1 in which during the period while the relative humidity of the drying medium in the chamber is being maintained substantially constant or is only gradually decreasing, the relative humidity of the drying medium in the chamber is not more than 50% relative humidity lower than the equilibrium relative humidity of the product.

6. A process as claimed in claim 5 in which during the period while the relative humidity of the drying medium in the chamber is being maintained substantially constant or is only gradually decreasing, the relative humidity of the drying medium in the chamber is not more than 30% relative humidity lower than the equilibrium relative humidity of the product.

7. A process as claimed in claim 1 in which during the period while the relative humidity of the drying medium in the chamber is falling relatively rapidly, the relative humidity of the drying medium is controlled so that the relative humidity of the drying medium in the chamber is not more than 70% relative humidity lower than the equilibrium relative humidity of the product.

8. A process as claimed in claim 7 in which during the period while the relative humidity of the drying medium in the chamber is falling relatively rapidly, the relative humidity of the drying medium is controlled so that the relative humidity of the drying medium in the chamber is not more than 50% relative humidity lower than the equilibrium relative humidity of the product.

9. A process as claimed in claim 1 in which the drying medium is re-circulated.

10. A process as claimed in claim 1 in which fresh drying medium is introduced at a substantially constant rate of not more than 7% by weight of the mass flow rate of the drying medium during the period while the relative humidity of the drying medium in the chamber is being maintained substantially constant at the maximum value of relative humidity.

11. A process as claimed in claim 10 in which fresh drying medium is introduced through an inlet opening and exhaust drying medium is exhausted through an outlet opening, the size of the inlet and outlet openings being controlled as a function of the nominal exposed surface area of the product in accordance with a Modulation Index (MI) which is defined as:

$$MI = Kp \times NSP(S_{en} + S_{ex})/(S_{en} + S_{ex})$$

where $S_{en}$ is the cross-sectional area of the inlet opening for make-up fresh drying medium;

$S_{ex}$ is the cross-sectional area of the outlet opening for exhaust drying medium;

NSP is the nominal exposed surface area of the product; and

Kp is a constant whose value depends on the product being dried and the pressure/flow characteristics of the drying medium, and during the period while the relative humidity of the drying medium in the chamber is being maintained substantially constant at the maximum value, the value of the Modulation Index lies in the range of 1,000 to 10,000.

12. A process as claimed in claim 1 in which during the period while the relative humidity of the drying medium in the chamber is falling relatively rapidly, fresh drying medium is introduced at a rate of not more than 21% by weight of the mass flow rate of the drying medium.

13. A process as claimed in claim 11 in which the rate at which fresh drying medium is introduced is increased from the beginning of the period to the end of the period during which the relative humidity of the drying medium in the chamber is falling relatively rapidly.

14. A process as claimed in claim 1 in which no fresh drying medium is introduced into the recirculating drying medium until the relative humidity of the drying medium has reached its maximum value.

15. A process for dehydrating a product whereby a gaseous drying medium is heated and urged into contact with the product being dried, wherein the temperature of the drying medium contacting the product to be dehydrated is lower than the temperature at which damage to the cellular structure of the product would occur, and the temperature of the product to be dehydrated is increased in a controlled manner during the drying process, the process comprising at least one step in which the temperature of the drying medium is increased from a first temperature up to a temperature adjacent the maximum dehydration temperature, the increase of temperature of the drying medium being such that during the said at least one step a difference of temperature exists between the product and the drying medium, the temperature difference being in the range of 0.1° C. and 5° C.

16. A process as claimed in claim 15 in which the drying medium is initially maintained at the first temperature until the temperature within the product is approximately similar to the first temperature.

17. A process as claimed in claim 15 in which the first temperature is approximately 40° C.

18. A process as claimed in claim 15 in which the rate of increase in the temperature of the drying medium is such that the temperature of the drying medium reaches the maximum dehydration temperature approximately at the same time as the desired water content of the product has been attained.

19. A process as claimed in claim 15 in which the maximum dehydration temperature does not exceed 70° C.

20. A process as claimed in claim 15 in which the product is dried to a water content lower than 20%.

* * * * *